US012512187B2

(12) United States Patent
Vold et al.

(10) Patent No.: US 12,512,187 B2
(45) Date of Patent: Dec. 30, 2025

(54) SPARSE N-GRAM MODELING FOR PATIENT-ENTITY RELATION EXTRACTION

(71) Applicant: Tempus AI, Inc., Chicago, IL (US)

(72) Inventors: Andrew William Vold, Rosemount, MN (US); Simon YewChoo Chu, Mountain View, CA (US)

(73) Assignee: Tempus AI, Inc., Chicago, IL (US)

( * ) Notice: Subject to any disclaimer, the term of this patent is extended or adjusted under 35 U.S.C. 154(b) by 305 days.

(21) Appl. No.: 18/163,736

(22) Filed: Feb. 2, 2023

(65) Prior Publication Data
US 2024/0266009 A1    Aug. 8, 2024

(51) Int. Cl.
| | |
|---|---|
| *G16H 10/20* | (2018.01) |
| *G06F 40/117* | (2020.01) |
| *G06F 40/166* | (2020.01) |
| *G06F 40/295* | (2020.01) |
| *G06F 40/30* | (2020.01) |
| *G06N 20/00* | (2019.01) |
| *G16H 10/60* | (2018.01) |

(52) U.S. Cl.
CPC ........... *G16H 10/20* (2018.01); *G06F 40/117* (2020.01); *G06F 40/166* (2020.01); *G06F 40/295* (2020.01); *G06F 40/30* (2020.01); *G06N 20/00* (2019.01); *G16H 10/60* (2018.01)

(58) Field of Classification Search
CPC ........ G16H 10/20; G16H 10/60; G16H 50/20; G06F 40/117; G06F 40/166; G06F 40/295; G06F 40/30; G06N 20/00
See application file for complete search history.

(56) References Cited

U.S. PATENT DOCUMENTS

| | | | |
|---|---|---|---|
| 7,555,428 B1 * | 6/2009 | Franz .................... | G06F 40/284 704/7 |
| 11,423,072 B1 * | 8/2022 | Chen .................... | G06F 18/253 |

(Continued)

OTHER PUBLICATIONS

Entity extraction, ML Kit, Google Developer, https://developers.google.com/ml-kit/language/entity-extraction, pp. 3.

(Continued)

*Primary Examiner* — Darioush Agahi
(74) *Attorney, Agent, or Firm* — MORGAN, LEWIS & BOCKIUS LLP

(57) ABSTRACT

Methods, systems, and software are provided for determining a relationship between a subject and a health entity. An electronic health record (EHR) for the subject is split into sections by detecting delineating section headers, and sections are subdivided into text spans. Text spans are filtered by language pattern recognition into a set of text spans having an expression related to the health entity. The natural language context of the expression in each text span in the set is evaluated to obtain a corresponding scoring representation. Scoring representations are inputted into a model comprising a plurality of parameters. The model outputs, for each text span in the set, at least a prediction that the text span is associated with the health entity. Models for determining relationships between subjects and health entities and methods for training models to determine relationships between subjects and health entities are also provided.

17 Claims, 12 Drawing Sheets

(56) References Cited

U.S. PATENT DOCUMENTS

| | | | |
|---|---|---|---|
| 2005/0159654 A1* | 7/2005 | Rao | G16H 50/50 |
| | | | 707/E17.058 |
| 2012/0197876 A1* | 8/2012 | Morris | G16H 10/60 |
| | | | 707/723 |
| 2019/0005012 A1* | 1/2019 | Priestas | G06N 20/00 |
| 2019/0103193 A1* | 4/2019 | Padgett | G06F 16/245 |
| 2020/0126663 A1* | 4/2020 | Lucas | G06V 30/19013 |
| 2021/0295822 A1* | 9/2021 | Tomkins | G06F 16/3338 |
| 2022/0068493 A1* | 3/2022 | Potter | G16H 50/30 |
| 2023/0141853 A1* | 5/2023 | Vu | G06F 16/3329 |
| | | | 704/2 |
| 2023/0394587 A1* | 12/2023 | Snopek | G06Q 30/01 |
| 2024/0006073 A1* | 1/2024 | Holdmann | G16H 10/20 |
| 2024/0289552 A1* | 8/2024 | Tay | G06F 40/58 |

OTHER PUBLICATIONS

Bulus et al., "Comparison of String Matching Algorithms in Web Documents," UniTech 2017, pp. 5.

Coorevits et al., "Electronic health records: new opportunities for clinical research." J Intern Med. 2013;274(6), pp. 547-560.

Cowie et al., "Electronic health records to facilitate clinical research." Clin Res Cardiol. 2017; 106(1) pp. 1-9.

Xiao et al., "Opportunities and challenges in developing deep learning models using electronic health records data: a systematic review." J Am Med Inform Assoc. 2018; 25(10), pp. 1419-1428.

\* cited by examiner

SPARSE N-GRAM MODELING FOR PATIENT-ENTITY RELATION EXTRACTION

TECHNICAL FIELD

The present disclosure relates generally to systems and methods for extracting relationships between subjects and health entities in electronic health records, and particularly using models with sparse tensor architecture.

BACKGROUND

Precision oncology is the practice of tailoring cancer therapy to the unique genomic, epigenetic, and/or transcriptomic profile of an individual patient or tumor. This is in contrast to conventional methods for treating a cancer patient based merely on the type of cancer the patient is afflicted with, e.g., treating all breast cancer patients with a first therapy and all lung cancer patients with a second therapy. Precision oncology was borne out of many observations that different patients diagnosed with the same type of cancer responded very differently to common treatment regimes. Over time, researchers have identified genomic, epigenetic, and transcriptomic markers that facilitate some level of prediction as to how an individual patient, or cancer, will respond to a particular treatment modality.

The growing use of electronic health records (EHRs) in academic, clinical, and healthcare institutions provides promising avenues for the collection of individualized health information that can be used to facilitate precision medicine, such as personalized cancer therapies. Such EHRs can store vast amounts of patient-specific data over multiple healthcare visits, including large datasets from genetic sequencing and digital imaging examinations. Despite its potential as a valuable resource for clinical decision-making, the quality and interpretability of the data contained in EHRs can be inconsistent. For instance, EHRs can include clinical and research data stored across multiple systems in a variety of formats and structures, or recorded at varying levels of accuracy, completeness, and depth, depending on the source of intake. An analysis of 10 years of EHR data from a representative clinical data provider reported between 6% and 46% incompleteness for several study variables related to pancreatic cancer. Similar completeness issues were observed in EHR data related to clinical trial recruitment. See, for instance, Coorevits et al., "Electronic health records: new opportunities for clinical research." J Intern Med. 2013; 274(6):547-560, which is hereby incorporated herein by reference in its entirety. There is a need in the art for improved systems and methods for accessing information from EHRs, particularly for use in precision medicine.

SUMMARY

As described above, EHRs provide valuable resources for personalized data useful in biomedical research and healthcare provision. However, the ability to access and interpret the patient-specific data contained within such records, and to apply these to desired functions such as the design and implementation of precision medicine, is hindered by a number of challenges, including inefficient management, accession, integration, and interpretability of EHR data.

Given the above background, what is needed in the art are improved methods and systems for extracting personalized health information from electronic health records (EHRs). Particularly, methods and systems for determining whether a subject is associated with a particular health entity of interest (e.g., a positive or negative relationship between the subject and the health entity) using data obtained from an EHR are desired. The present disclosure solves this and other needs in the art by providing improvements to methods, systems, and software for determining relationships between subjects and health entities using text spans obtained from EHRs. For example, by obtaining feature sets (e.g., N-gram counts) for each text span and applying these feature sets to a trained model, the methods and systems described herein improve detection of subject-entity relationships in EHRs in a faster, more accurate, and less computationally burdensome manner. In some embodiments, the extraction of patient-entity relationships is useful for determining a patient's eligibility for a personalized treatment based on a given health entity, such as eligibility for enrollment in a clinical trial.

Methods for Determining a Relationship Between a Subject and a Health Entity.

Accordingly, one aspect of the present disclosure provides a method for determining a relationship between a first subject and a first health entity for use in clinical decision-making. In some implementations, the method is performed at a computer system having at least one processor and a memory storing at least one program including instructions for execution by the at least one processor. In some embodiments, the method includes receiving, for the first subject, a first electronic health record including a plurality of sections, where each respective section in the plurality of sections is delineated by a corresponding section header. For each respective section in the plurality of sections, the corresponding section header is detected, thereby splitting the first electronic health record into the plurality of sections. A plurality of text spans is obtained for the first electronic health record by subdividing each respective section, in the plurality of sections, into a corresponding one or more text spans. The plurality of text spans is filtered by language pattern recognition to identify a set of text spans, where each respective text span in the set of text spans comprises a respective expression related to the first health entity.

In some embodiments, for each respective text span in the set of text spans, a corresponding natural language context of the respective expression related to the first health entity is evaluated, thereby obtaining a respective scoring representation of the corresponding natural language context of the respective expression. For each respective text span in the set of text spans, the respective scoring representation for the respective text span is inputted into a model comprising a plurality of parameters. As output from the model, for each respective text span in the set of text spans, at least a corresponding first prediction that the respective text span is associated with the first health entity is received.

Model Architectures for Determining Subject-Health Entity Relationships.

Another aspect of the present disclosure provides a model for determining a relationship between a first subject and a first health entity for use in clinical decision-making. In some embodiments, the model includes a first layer including a plurality of parameters. The first layer (i) receives, as input, a first sparse tensor comprising, for each respective text span in a set of text spans, a respective scoring representation for the respective text span, and (ii) generates, as output, a tensor dot product obtained using the first sparse tensor and the plurality of parameters. In some embodiments, the plurality of parameters is formatted as a second sparse tensor, and the tensor dot product is formatted as a third sparse tensor. In some embodiments, the method further includes a softmax activation function that (i)

receives, as input, the tensor dot product obtained using the first sparse tensor and the plurality of parameters and (ii) generates, as output, for each respective text span in the set of text spans, at least a corresponding first prediction that the respective text span is associated with the first health entity. Training Models to Determine Subject-Health Entity Relationships.

Another aspect of the present disclosure provides a method for training a model to determine a relationship between a first subject and a first health entity in an electronic health record for use in clinical decision-making. In some embodiments, the method includes obtaining, for each respective training text span in a set of training text spans for a plurality of training electronic health records, (i) for each respective N-gram in a plurality of N-grams, a corresponding count of occurrences that the respective N-gram occurs in the respective training text span, and (ii) a corresponding label, in a plurality of labels for the respective training text span, that represents a truth status for at least a first relationship status in a plurality of relationship statuses. In some embodiments, each respective training text span in the corresponding set of training text spans comprises a respective expression related to the first health entity.

In some implementations, a training procedure is performed, including (i) inputting, into an untrained or partially trained model comprising a plurality of parameters, for each respective training text span in the set of training text spans, for each respective N-gram in the plurality of N-grams, the corresponding count of occurrences that the respective N-gram occurs in the respective training text span, thereby obtaining at least a corresponding first prediction that the respective training text span is associated with the first relationship status in the plurality of relationship statuses. The training procedure further includes (ii) determining a differentiable prediction performance score for the untrained or partially trained model using, for each respective training text span in the corresponding set of training text spans, a comparison between at least the first prediction and the corresponding label for the respective training text span. The training procedure further includes (iii) adjusting, in a backpropagation, one or more parameters in the plurality of parameters using a minimization of a loss function for the differentiable prediction performance score.

Yet another aspect of the present disclosure provides a computer system for determining a relationship between a first subject and a first health entity in an electronic health record, the computer system comprising one or more processors and memory addressable by the one or more processors, the memory storing at least one program for execution by the one or more processors, the at least one program comprising instructions for performing any of the methods disclosed above.

Still another aspect of the present disclosure provides a non-transitory computer readable storage medium, where the non-transitory computer readable storage medium stores instructions, which when executed by a computer system, cause the computer system to determine a relationship between a first subject and a first health entity in an electronic health record, comprising any of the methods disclosed above.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

DETAILED DESCRIPTION

Introduction

Figure 1A:
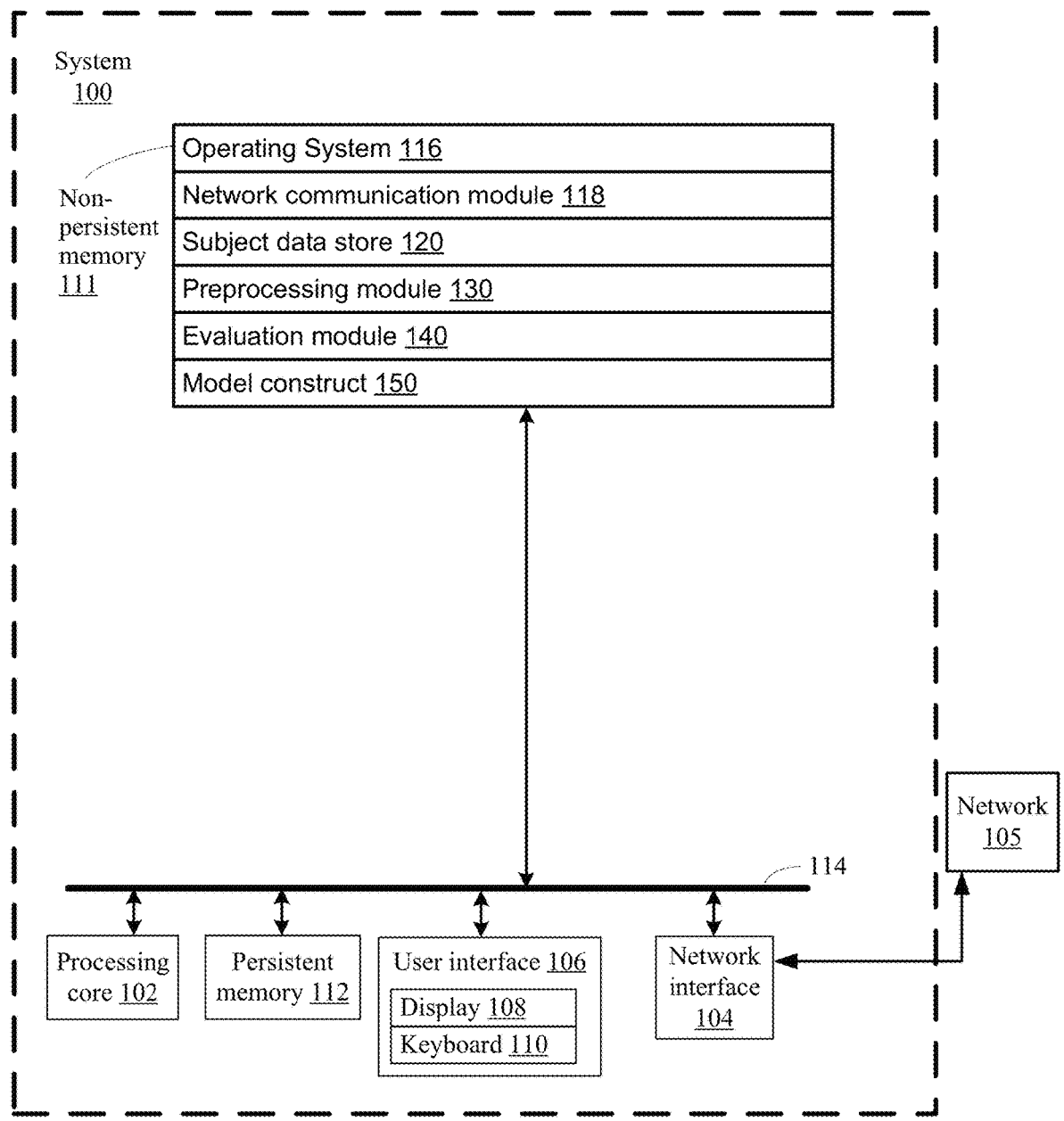
FIGS. 1A, 1B, and 1C collectively illustrate a block diagram of an example computing device for determining a relationship between a first subject and a first health entity, in accordance with some embodiments of the present disclosure.

Personalized medicine, such as precision oncology, allows for the tailoring of therapeutic regimens and other health-related activities to individual patients. This approach takes into account the observation that different patients with the same disease condition (e.g., cancer type) can have vastly different responses to shared treatments. Targeted therapies have shown significant improvements in patient outcomes, especially in terms of progression-free survival. See Radovich et al., 2016 *Oncotarget* 7, 56491-56500. Further, recent evidence reported from the IMPACT trial found that the three-year overall survival for patients given a molecularly matched therapy was more than twice that of non-matched patients (15% vs. 7%). See Bankhead, "IMPACT Trial: Support for Targeted Cancer Tx Approaches." *MedPage Today*. Jun. 5, 2018; and ASCO Post, "2018 ASCO: IMPACT Trial Matches Treatment to Genetic Changes in the Tumor to Improve Survival Across Multiple Cancer conditions." *The ASCO POST*. Jun. 6, 2018. Estimates of the proportion of patients for whom genetic testing changes the trajectory of their care vary widely, from approximately 10% to more than 50%. See Fernandes et al., 2017 *Clinics* 72, 588-594.

Electronic health records (EHRs) provide a useful resource for individualized health data, by combining huge amounts of patient-specific data collected during the provision of healthcare services. For instance, EHRs can include one or more of clinical, demographic, administrative, claims (e.g., medical and pharmacy), and patient-centered (e.g., vital statistics or quality-of-life information obtained from medical instruments or caregiver assessments) data. Examples of data types that can be included in EHRs include medication history (e.g., current prescriptions, concomitant medications, medication classes, medication codes, and/or ontological terms), disease conditions (e.g., pre-existing conditions, co-morbidities, symptoms, diagnoses, and/or prognoses), laboratory test results or clinical data (e.g., biomarkers, genomic variants, medical images, and/or sequencing data), and free-text observations and other notes (e.g., by a clinician). In some instances, EHRs include longitudinal data, such as information collected over multiple visits to a healthcare provider or over a period of time. See, for example, Coorevits et al., "Electronic health records: new opportunities for clinical research." J Intern Med. 2013; 274(6):547-560; Cowie et al., "Electronic health records to facilitate clinical research." Clin Res Cardiol. 2017; 106(1): 1-9; and Xiao et al., "Opportunities and challenges in developing deep learning models using electronic health records data: a systematic review." J Am Med Inform Assoc. 2018; 25(10): 1419-1428, each of which is hereby incorporated herein by reference in its entirety.

In some implementations, EHRs are useful for obtaining information for clinical trials, such as to evaluate study feasibility, coordinate subject recruitment and enrollment, and facilitate pre- and post-trial data collection. In particular, EHR data is useful for pre-screening patients for eligibility in clinical research (e.g., by age, gender, diagnosis, medications, biomarkers, and/or other demographic or health-related factors). Similarly, EHR data can be used to exclude ineligible patients, thus reducing overall screening burden for clinical trials, misallocation of trial resources, and the potentially harmful effects of enrolling an ineligible patient in a study. Other non-limiting applications for EHR data include observational studies, safety surveillance, clinical research, and/or regulatory purposes. See, for example, Cowie et al., "Electronic health records to facilitate clinical research." Clin Res Cardiol. 2017; 106(1): 1-9, which is hereby incorporated herein by reference in its entirety.

Despite the opportunities outlined above, the extraction of relevant data from EHRs is hindered by various complexities. For instance, EHRs frequently contain free-text narratives (e.g., letters, reports, observational comments, and/or progress notes), sometimes transcribed from a dictation or recording, as well as any one or more of laboratory results, continuous monitoring data such as electrocardiography and electroencephalography, digital medical images, and codes for the ontological or administrative classification of medical activities. A unified structure for data capture and maintenance is lacking, making it difficult to identify a universal set of keywords or search terms for retrieving the information of interest from within different records. Data extraction from EHRs is further stymied by inconsistent completeness, accuracy, or concordance of data, heterogeneous and sometimes incompatible systems and formats, and little to no validation or quality control. For instance, as described above, an example analysis of 10 years of EHR data from a representative clinical data provider reported between 6% and 46% incompleteness for several variables related to pancreatic cancer, while similar findings were observed in EHR data related to clinical trial recruitment. See, for example, Coorevits et al., "Electronic health records: new opportunities for clinical research." J Intern Med. 2013; 274(6):547-560; and Cowie et al., "Electronic health records to facilitate clinical research." Clin Res Cardiol. 2017; 106(1): 1-9, each of which is hereby incorporated herein by reference in its entirety. Even with cleaned and harmonized data, challenges remain with respect to the interpretation of extracted EHR information for clinical purposes. For example, in some implementations, EHRs generated for the purposes of healthcare provision and hospital billing do not reflect the criteria needed for determining diagnoses or clinical trial enrollment. See, for example, Glicksberg et al, "The next generation of precision medicine: observational studies, electronic health records, biobanks and continuous monitoring." Hum Mol Genet. 2018; 27(R1):R56-R62, which is hereby incorporated herein by reference in its entirety. Furthermore, a particular patient record can contain numerous mentions of a given health entity of interest, the nature of which can change over time (e.g., where a patient's medication history includes one or more of prescription, refusal, initiation, continuation, cessation, and/or adjustment of a particular medication, it can be unclear as to the patient's status with respect to the particular medication).

Conventional methods for ingesting EHRs for data extraction include deep learning models trained to perform a number of analytical tasks, such as phenotyping diseases, predicting clinical events, concept embedding, and data augmentation, as well as natural language processing (NLP) tools for named entity recognition (NER). However, the performance of these conventional models suffer from various shortcomings of EHR-based data, such as irregularity, temporality, heterogeneity, and lack of labels. For instance, the sampling of a particular health event can occur on an irregular basis, due to variations in a patient's frequency of healthcare visits, changes in standard care recommendations, or rarity of the particular event. Such irregularity can result in inconsistent data densities that negatively impact model performance. Additionally, temporality of data, in which certain long-term associations and inferences are represented in the record within a global context over a period of time, are in some implementations not readily recognized by the model and as such can be overlooked. Moreover, as discussed above, EHR data often includes highly heterogeneous data arising from multiple modalities including laboratory results, free-text notes, monitoring data, medical images, and medical codes. Generally, such data requires multi-task learning to achieve accurate interpretation and analysis, increasing the complexity of the model architecture and the computational requirements to train and run the model. See, for example, Xiao et al., "Opportunities and challenges in developing deep learning models using electronic health records data: a systematic review." J Am Med Inform Assoc. 2018; 25(10): 1419-1428, which is hereby incorporated herein by reference in its entirety.

Conventional methods for EHR data analysis is further limited by the lack of labels in many EHR databases. Labels impart considerable benefit in model training, by providing "ground truth" indications for clinical outcomes or phenotypes that can be used to strengthen a model's capability to accurately generate a desired output. Such labels are often not consistently recorded in EHR data and thus are typically unavailable for model training. Manual labeling of EHRs requires considerable resources and expense, as it relies on experts trained to read, comprehend, and accurately classify the information in each record according to each desired analytic goal. Additionally, it is exceedingly laborious and time-intensive, particularly for large databases of training EHRs (as described below, EHR databases can contain millions, tens of millions, or hundreds of millions of individual records). While some conventional approaches utilize supervised learning based on the detection of medical codes (e.g., diagnosis, procedure, or medication codes) to obtain labels for EHRs, such methods are not readily generalizable to all records, such as those that do not conform to specific institutional or organizational coding standards. See, for example, Xiao et al., "Opportunities and challenges in developing deep learning models using electronic health records data: a systematic review." J Am Med Inform Assoc. 2018; 25(10): 1419-1428, which is hereby incorporated herein by reference in its entirety.

Moreover, deep learning models demand a high computational price, due to the relatively higher complexity of their architectures. This computational burden is exacerbated by the vast amount of EHR data available across numerous national and international systems. For instance, example EHR databases can include patient cohorts in the thousands, hundreds of thousands, millions, tens of millions, or hundreds of millions. In some implementations, any one or more of these individual records also contains a huge amount of data. Performing classification on the entire patient record is nearly impossible because of its length, depth of information, and entity dynamics. As an illustrative example, a single magnetic resonance imaging (MRI) scan has been reported to contain approximately $1 \times 10^8$ voxels, while a clinical grade whole genome sequencing run at 30× coverage is reported to include 15 gigabytes of data. As another illustrative example, the average patient accumulates 1000 health events over 3 years; an accurate evaluation of an EHR for a single patient of 50 years old would therefore require ingestion and interpretation of over 15,000 health events, on average, with each respective health event potentially comprising hundreds of millions of individual elements for analysis. In some implementations, even larger cohort sizes are relied upon to accurately represent (e.g., for model training) rare disease conditions, outcomes, or side effects of interest. See, for example, Hemingway et al., "Big data from electronic health records for early and late translational cardiovascular research: challenges and potential." Eur Heart J. 2018; 39(16): 1481-1495, which is hereby incorporated herein by reference in its entirety.

There is a need in the art to improve the quality of data ingestion and label generation, increase the generalizability of EHR data analysis, and to reduce the computational complexity and resources required by currently available techniques.

Accordingly, the present disclosure provides improved systems and methods for extraction of relationships between subjects (e.g., patients) and health-related entities in EHRs. In some embodiments, health-related entities include any entity of interest that is related to a subject's health, such as any event, characteristic, or criterion that can be used to tailor personalized therapies or determine eligibility for clinical trial enrollment. For instance, non-limiting examples of health entities include medications, biomarkers, and disease conditions. The disclosed systems and methods use a data handling and modeling approach that includes active learning of a sparse model architecture to iteratively train on labeled data. This approach yields strong performance for subject-entity relation extraction beyond the ability of conventional methods, as illustrated in Example 1.

Advantageously, the systems and methods disclosed herein overcome the issues of the prior art by providing labels that address the difficulties in obtaining and generating labels for EHRs or portions thereof, for model training. Moreover, the systems and methods provide a simple sparse tensor model architecture that reduces the time and computational resources needed for processing large EHR datasets; in particular, the model architecture allows for input of the entire training dataset in a single batch, considerably reducing training time and resources.

In addition to providing improved determination of subject-entity relationships, the systems and methods disclosed herein also enhance the accuracy and ease of developing precision medicine for patients by allowing for faster, more accurate, and more efficient extraction of target entity data for use in focused therapeutic regiments. Moreover, the systems and methods advantageously lower the barriers to clinical research, by reducing the overall screening burden of clinical trial enrollment. Low enrollment in clinical trials is an increasing problem in the United States, as reported in Logan et al., "An analysis of factors affecting successful clinical trial enrollment in the context of three prospective randomized control trials." Int J Radiat Oncol Biol Phys. 2017; 97(4):770-777, which is hereby incorporated herein by reference in its entirety. For instance, although clinical trial data is considered to be highly valuable in clinical research and constitutes a driving factor in advancing changes in the field of oncology, as little as 2-3% of oncology patients are estimated to participate in clinical trials. Yet another benefit can be found in the reuse of information contained in EHRs, which is generally collected in the course of routine clinical care. By relying on previously obtained data to screen for clinical trial eligibility, the presently disclosed systems and methods reduce the number of trial-specific clinical visits and assessments, which can help with subject retention, reduce the potential for errors in manual data transcription, and reduce costs and logistical issues involved in general personnel management and scheduling. See, for example, Cowie et al., "Electronic health records to facilitate clinical research." Clin Res Cardiol. 2017; 106(1): 1-9, which is hereby incorporated herein by reference in its entirety.

Example Implementation.

An illustrative implementation of methods provided herein will now be described.

Data Preprocessing

Briefly, to account for the complexity and size of the patient record, in some embodiments, the data is strategically split to produce more concise, focused text spans. For instance, in some implementations, the data to be analyzed is one or more patient EHRs (e.g., in a large collection of patient EHRs), optionally in the form of raw optical character recognition (OCR) text. Such text is often incredibly long, noisy, and without structure. In some embodiments, there are many concepts covered in each page of the records, such that modeling patient-entity relationships is challenging. Due to these difficulties, methods include filtering noise and subdividing the text into smaller, more concise passages. In some implementations, there exist several patterns in the data which can be exploited to split the data.

For instance, in some embodiments, patient EHRs contain a header-body pair document structure. Thus, in some such embodiments, whenever a new title is introduced, a new topic is also introduced, thereby increasing the conciseness of the spans of text to be analyzed. In addition to the header-body pairs, in some implementations, the body text is further be broken down into sentences, such as by using a simple regular expression sentence splitter. These sentences can then be used to obtain features (e.g., tokenized into N-grams) that are used as inputs into a trained model.

Sparse Model Architecture

In some implementations, the architecture of the trained model is advantageously simple. In an example embodiment, the model architecture consists of a sparse learnable layer of parameters with a forward pass consisting of a sparse tensor dot product between the input features (e.g., N-gram counts) for each particular text span, where the input features and parameters are each stored as respective sparse tensors. In such embodiment, logits are generated from the forward pass (e.g., log-odds of the probabilities generated by the dot product), which are then passed through a softmax activation to produce output probabilities. In some embodiments, the input is in the form of a sparse tensor including, for each respective text span in a plurality of text spans, for each respective feature in a plurality of features (e.g., N-grams), a corresponding feature value or a representation thereof (e.g., a count of the respective N-gram in the respective text span). In some embodiments, the layer of parameters is in the form of a sparse tensor including, for each respective feature in the plurality of features (e.g., N-grams), for each respective relationship status in a plurality of relationship statuses (e.g., positive, negative, or null, for a respective health entity), a corresponding value (e.g., weight) that indicates a strength of association between the respective feature and the respective relationship status. Thus, in some such embodiments, the forward pass generates a sparse tensor dot product of the input tensor and the parameter tensor, including a corresponding value for each respective text span in the plurality of text span, for each respective relationship status in the plurality of relationship statuses.

In another example embodiment, prior to training, the model is initialized using a plurality of initialization parameters. For instance, in some implementations, the manner in which models are initialized greatly influences learning quality. Conventional methods using neural networks utilize randomized initialization by sampling from weighted probability distributions. However, the presently disclosed methods utilize models that are initialized with parameters that impart an initial strength of association between each feature and each relationship status. Advantageously, such initialization drastically reduces the number of gradient descent steps needed to reach the global minimum of the loss function during training, thus subsequently reducing the time and computational resources needed for training the model. In some embodiments, the initialization parameters are determined using log-likelihood differences calculated using, for each respective feature in the plurality of features, for each respective relationship status in the plurality of relationship statuses, the total number of occurrences of the respective feature across a plurality of training EHRs and the conditional number of cooccurrences of the respective feature with the respective relationship status, or an indication thereof (e.g., a signal term for the respective relationship status). Without being held to one theory of operation, such initialization is performed based on the intuition that features (e.g., N-grams) that are signal-bearing for a particular class (e.g., have a high predictive capacity for classification) and stand out from the general corpus will have high values, leading to a larger value after the forward pass.

Obtaining and/or Assigning Labels

As described above, robust model training often includes the use of "ground truth" labels against which the model can compare its generated predictions. However, in the patient OCR landscape, such ground truth labels are difficult, if not impossible, to procure. For this reason, in some implementations, methods disclosed herein include generating artificial labels for each text span used in the training by detecting highly signal bearing verbiage (e.g., "signal terms") in the particular text span. Consider an illustrative example within the context of patient-medication relationship modeling; non-limiting examples of label verbiage (e.g., signal terms) can include one or more of "patient took," "patient is on," and "patient was prescribed." Often, in some embodiments, such artificial labels alone have a certain amount of noise. For example, the signal bearing word, "prescribed" can lose its reliability when preceded by "was not." As a result of the presence of disqualifying terms, in some implementations, methods disclosed herein include the use of a set of disqualifier terms that nullifies a label when one of its members is present.

Model Training

In some implementations, the presence of labels obtained and/or assigned in accordance with the methods disclosed herein allows for the use of gradient descent optimization of the model. Advantageously, due to the memory efficiency of the sparse model architecture, an enormous amount of data can be fit into a single batch (e.g., for training). This has additional advantages in that, in some implementations, it allows for the use of macroscopic metrics and large learning rates, further increasing the speed and efficiency of training and reducing the time and computational resources required.

Typical neural network classifiers are trained by measuring the cross-entropy loss of a miniature batch of data. Though this sort of training commonly yields respectable classification performance, it often yields a majority class-centric model. Traditional approaches attempt to circumvent this problem, for example, by applying class weights to the loss function and/or using different sampling methods. These approaches, however, introduce more hyperparameters that need to be tuned to yield improved generalized performance. There is a need in the art for training methods that robustly handle class imbalance without the tuning of hyperparameters.

Accordingly, in some implementations, methods disclosed herein achieve balanced training without hyperparameters by minimizing an objective that penalizes overfitting to a majority class, such as an F1 score. However, F1 scores are not convex (e.g., differentiable) and thus cannot be minimized through gradient descent. To account for this, a numerical approximation to the F1 score is used; this approximation, termed soft F1 loss, can be minimized. Advantageously, soft F1 loss is a reliable training objective in the context of full batch training, where the population characteristics are assumed. In some implementations, and without being limited to any one theory of operation, mini batch training does not meet this assumption due to statistical differences between the mini batch characteristics and the true population characteristics.

Active Learning Loop

Once the model has been sufficiently trained, in some embodiments, the adjusted parameters (e.g., adjusted during training via backpropagation using gradient descent) can be used to identify signal bearing (e.g., signal), noisy (e.g., disqualifier), and/or low-value (e.g., masking) terms. For instance, in some implementations, features (e.g., N-grams) associated with high value parameters for a particular class (e.g., a respective relationship status) have the interpretation of being important for determining the particular class. For this reason, in some embodiments, methods disclosed herein include scanning the highest parameter values for each class (e.g., each relationship status in the plurality of relationship statuses) and determining if they qualify as label verbiage (e.g., signal terms), if they are noise (e.g., disqualifier terms), or if they are of no significance (e.g., masking terms). With this information, in some embodiments, methods include updating the signal terms and/or disqualifier terms lists, and/or creating a list of masking terms that has the purpose of removing insignificant terms from the vocabulary. For example, in some embodiments, masking terms are applied to each respective text span in the plurality of text spans, such that any term in the list of masking terms is removed or hidden from the respective text span. In some embodiments, after updating the lists, the process of obtaining and/or assigning labels, model training, and/or active learning can be repeated, for a number of iterations. For instance, in some implementations, the process is repeated until the model achieves a threshold performance.

Feature Storage and Operations

In some implementations, the features used as input to the trained model are N-gram counts. An illustrative example of N-gram storage and operations will now be described. In some embodiments, in order to be able to use and model the N-grams, a mapping is created that maps a particular N-gram to an index. As N grows, the size of the mapping grows substantially. This leads to increased memory demand and latency of operations. One method of determining N-gram counts includes simple linear search; however, this approach is neither memory nor time efficient. For this reason, in some implementations, a hierarchical N-gram tree is created that recursively processes the text spans and stores the counts and locations of the N-grams. In some implementations, as described above, methods include storing the total and conditional counts of the N-grams in order to calculate log-likelihood differences between class dependent N-gram occurrences and total corpus counts for use as initialization parameters.

The methods and systems disclosed herein advantageously utilize model architectures that are easily interpretable and allow for generalization of labels to output predictions indicating subject-level health entity relationships (e.g., positive or negative for a respective health entity). In some embodiments, such model architectures are fast and lightweight, allowing for rapid iteration with low computational demand. The use of N-gram vectorization allows for the interrogation of EHRs without span length constraints, thus improving upon conventional methods such as transformer-based natural language processing models (see, e.g., Devlin et al., 2018, "BERT: Pre-training of Deep Bidirectional Transformers for Language Understanding," arXiv: 1810.04805v2). Moreover, the systems and methods described herein are widely applicable to classification problems as well as relationship extraction problems.

As described above, the methods and systems disclosed herein further utilize a label training process, which can advantageously be performed without the need for "gold-labeled" data (e.g., text spans that are annotated with ground truth relationship status for a respective health entity). Furthermore, the training utilizes soft-F1 loss for calculating loss minimization and adjusting parameters, leading to better results compared to other metrics that have limited utility as loss functions (e.g., F1 score) and/or limited utility as evaluation metrics. In addition, the active learning process increases the robustness of the model's performance and is easy for a user to perform.

Definitions

The terminology used in the present disclosure is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "including," "includes," "having," "has," "with," or variants thereof are used in either the detailed description and/or the claims, such terms are intended to be inclusive in a manner similar to the term "comprising."

As used herein, the term "if" can be construed to mean "when" or "upon" or "in response to determining" or "in response to detecting," depending on the context. Similarly, the phrase "if it is determined" or "if [a stated condition or event] is detected" can be construed to mean "upon determining" or "in response to determining" or "upon detecting [the stated condition or event]" or "in response to detecting [the stated condition or event]," depending on the context.

It will also be understood that, although the terms first, second, etc. are used herein to describe various elements, these elements should not be limited by these terms. These terms are only used to distinguish one element from another. For example, a first subject could be termed a second subject, and, similarly, a second subject could be termed a first subject, without departing from the scope of the present disclosure. The first subject and the second subject are both subjects, but they are not the same subject. Furthermore, the terms "subject," "user," and "patient" are used interchangeably herein.

As used herein, the term "subject" refers to any living or non-living human. In some embodiments, a subject is a male or female of any stage (e.g., a man, a woman or a child).

As used herein, the term "health entity" refers to a medical condition, a clinical characteristic, a biomarker, or a medical therapy. Non-limiting examples of medical conditions include disease conditions (e.g., disease types, disease subtypes, and/or symptoms), preconditions, comorbidities, medical diagnoses, and/or medical prognoses. In some embodiments, a health entity is a cancer type or a cancer stage. Non-limiting examples of clinical characterizations include clinical trial criteria (e.g., information about clinical trials for which the subject is eligible), therapies that are specific to the subject's disease or disorder, possible therapeutic adverse effects associated with the specific characteristics of the subject's disease or disorder (e.g., the patient's genetic variations, epigenetic abnormalities, associated oncogenic pathogenic infections, pathology abnormalities, or other characteristics of the subject's sample and/or clinical records), subject information and analysis metrics (e.g., diagnosis, subject demographic and/or institution, matched therapies, matched clinical trials, specimen information, details on reported variants, subject clinical history, and/or test results. In some embodiments, a health entity is a selection criterion for enrollment in a clinical trial. Non-limiting examples of biomarkers include genetic markers or genetic variants (e.g., single nucleotide variants (SNVs), multi-nucleotide variants (MNVs), insertion or deletion of nucleotides (indels), DNA rearrangement, copy number variations (CNVs), partial or complete change in cell ploidy, and/or altered DNA methylation pattern), pathogenic variants (e.g., with therapeutic, diagnostic, and/or prognostic significance), non-actionable pathogenic variants, variants of uncertain significance, translocations (e.g., based on features of known gene fusions, relevant breakpoints, and/or biological relevance), germline alterations, genomic loci, and/or genes (e.g., genes recommended by the American College of Medical Genetics and Genomics (ACMG) and/or genes associated with cancer predisposition or drug resistance). Non-limiting examples of medical therapies include medications (e.g., cancer medications), therapeutic regimens, and/or treatment plans. For instance, in some embodiments, a health entity is a currently or previously prescribed medication. In some embodiments, a health entity refers to a medication name, a medication class, a medication code, and/or an ontological term associated with or assigned to the subject.

As used herein, the term "expression related to a health entity" refers to a word or phrase that suggests a subject is affected by, or is not affected by, the health entity. That is, the presence of an expression related to a health entity in a patient's electronic medical record makes it more likely, or less likely, that the patient is affected by the health entity.

As used herein, the term "text span" refers to any alphanumeric string of characters and/or numbers, including one or more characters, words, sentences, paragraphs, sections, headings, pages, documents, and/or any combination or portion thereof. In some implementations, a text span is all or a portion of a source text, such as an electronic health record for a subject. In some embodiments, a text span refers to an unmodified (e.g., uninterrupted and/or contiguous) sequence of characters and/or numbers as originally provided in the source text. Alternatively, in some embodiments, a text span is modified from its original source text, such as by truncating the text span, concatenating two or more text spans, and/or removing one or more characters (e.g., words, sentences, etc.) from the text span.

As used herein, the term "mutation" or "variant" refers to a detectable change in the genetic material of one or more cells. In a particular example, one or more mutations can be found in, and can identify, cancer cells (e.g., driver and passenger mutations). A mutation can be transmitted from a parent cell to a daughter cell. A person having skill in the art will appreciate that a genetic mutation (e.g., a driver mutation) in a parent cell can induce additional, different mutations (e.g., passenger mutations) in a daughter cell. A mutation generally occurs in a nucleic acid. In a particular example, a mutation can be a detectable change in one or more deoxyribonucleic acids or fragments thereof. A mutation generally refers to nucleotides that are added, deleted, substituted for, inverted, or transposed to a new position in a nucleic acid. In some embodiments, a variant refers to changes in the primary genome sequence at single or multiple nucleotide positions, e.g., a single nucleotide variant (SNV), a multi-nucleotide variant (MNV), an indel (e.g., an insertion or deletion of nucleotides), a DNA rearrangement (e.g., an inversion or translocation of a portion of a chromosome or chromosomes), a variation in the copy number of a locus (e.g., an exon, gene or a large span of a chromosome) (CNV), a partial or complete change in the ploidy of the cell, as well as in changes in the epigenetic information of a genome, such as altered DNA methylation patterns. A mutation can be a spontaneous mutation or an experimentally induced mutation. A mutation in the sequence of a particular tissue is an example of a "tissue-specific allele." For example, a tumor can have a mutation that results in an allele at a locus that does not occur in normal cells. Another example of a "tissue-specific allele" is a fetal-specific allele that occurs in the fetal tissue, but not the maternal tissue. As used herein, the term "single nucleotide variant" or "SNV" refers to a substitution of one nucleotide to a different nucleotide at a position (e.g., site) of a nucleotide sequence, e.g., a sequence read from an individual. A substitution from a first nucleobase X to a second nucleobase Y, in some implementations, is denoted as "X>Y." For example, a cytosine to thymine SNV, in some embodiments, is denoted as "C>T."

As used herein, the term "cancer," "cancerous tissue," or "tumor" refers to an abnormal mass of tissue in which the growth of the mass surpasses and is not coordinated with the growth of normal tissue. A cancer or tumor can be defined as "benign" or "malignant" depending on the following characteristics: degree of cellular differentiation including morphology and functionality, rate of growth, local invasion and metastasis. A "benign" tumor can be well differentiated, have characteristically slower growth than a malignant tumor and remain localized to the site of origin. In addition, in some cases a benign tumor does not have the capacity to infiltrate, invade or metastasize to distant sites. A "malignant" tumor can be poorly differentiated (anaplasia), have characteristically rapid growth accompanied by progressive infiltration, invasion, and destruction of the surrounding tissue. Furthermore, a malignant tumor can have the capacity to metastasize to distant sites. Accordingly, a cancer cell is a cell found within the abnormal mass of tissue whose growth is not coordinated with the growth of normal tissue. Accordingly, a "tumor sample" refers to a biological sample obtained or derived from a tumor of a subject, as described herein. A cancerous tissue can refer to blood cells if the cancer is a hematological (blood) cancer.

As used herein, the term "classification" refers to any number(s) or other characters(s) that are associated with a particular property of a sample or input (e.g., an electronic health record or a portion thereof). For example, in some embodiments, the term "classification" refers to an association with a respective relationship status in a plurality of relationship statuses (e.g., positive, negative, or null), such as an association of an electronic health record or portion thereof (e.g., a respective text span in a plurality of text spans) with the respective relationship status. In some embodiments, the term "classification" refers to a relationship status of a subject with a health entity. For instance, in some implementations, a subject is determined to be related (e.g., positive) or not related (e.g., negative) to the health entity. The classification can be binary (e.g., positive or negative) or have more levels of classification (e.g., a scale from 1 to 10 or 0 to 1). The terms "cutoff" and "threshold" can refer to predetermined numbers used in an operation. For example, a cutoff size can refer to a size above which fragments are excluded. A threshold value can be a value above or below which a particular classification applies. Either of these terms can be used in either of these contexts.

As used interchangeably herein, the term "classifier" or "model" refers to a machine learning model or algorithm.

In some embodiments, a model includes an unsupervised learning algorithm. One example of an unsupervised learning algorithm is cluster analysis. In some embodiments, a model includes supervised machine learning. Nonlimiting examples of supervised learning algorithms include, but are not limited to, logistic regression, neural networks, support vector machines, Naive Bayes algorithms, nearest neighbor algorithms, random forest algorithms, decision tree algorithms, boosted trees algorithms, multinomial logistic regression algorithms, linear models, linear regression, Gradient Boosting, mixture models, hidden Markov models, Gaussian NB algorithms, linear discriminant analysis, or any combinations thereof. In some embodiments, a model is a multinomial classifier algorithm. In some embodiments, a model is a 2-stage stochastic gradient descent (SGD) model.

In some embodiments, a model is a deep neural network (e.g., a deep-and-wide sample-level model).

Neural networks. In some embodiments, the model is a neural network (e.g., a convolutional neural network and/or a residual neural network). Neural network algorithms, also known as artificial neural networks (ANNs), include convolutional and/or residual neural network algorithms (deep learning algorithms). In some embodiments, neural networks are machine learning algorithms that are trained to map an input dataset to an output dataset, where the neural network includes an interconnected group of nodes organized into multiple layers of nodes. For example, in some embodiments, the neural network architecture includes at least an input layer, one or more hidden layers, and an output layer. In some embodiments, the neural network includes any total number of layers, and any number of hidden layers, where the hidden layers function as trainable feature extractors that allow mapping of a set of input data to an output value or set of output values. In some embodiments, a deep learning algorithm comprises a neural network including a plurality of hidden layers, e.g., two or more hidden layers. In some instances, each layer of the neural network includes a number of nodes (or "neurons"). In some embodiments, a node receives input that comes either directly from the input data or the output of nodes in previous layers, and performs a specific operation, e.g., a summation operation. In some embodiments, a connection from an input to a node is associated with a parameter (e.g., a weight and/or weighting factor). In some embodiments, the node sums up the products of all pairs of inputs, $x_i$, and their associated parameters. In some embodiments, the weighted sum is offset with a bias, b. In some embodiments, the output of a node or neuron is gated using a threshold or activation function, f, which, in some instances, is a linear or non-linear function. In some embodiments, the activation function is, for example, a rectified linear unit (ReLU) activation function, a Leaky ReLU activation function, or other function such as a saturating hyperbolic tangent, identity, binary step, logistic, arcTan, softsign, parametric rectified linear unit, exponential linear unit, softPlus, bent identity, softExponential, Sinusoid, Sine, Gaussian, or sigmoid function, or any combination thereof.

In some implementations, the weighting factors, bias values, and threshold values, or other computational parameters of the neural network, are "taught" or "learned" in a training phase using one or more sets of training data. For example, in some implementations, the parameters are trained using the input data from a training dataset and a gradient descent or backward propagation method so that the output value(s) that the ANN computes are consistent with the examples included in the training dataset. In some embodiments, the parameters are obtained from a back propagation neural network training process.

Any of a variety of neural networks are suitable for use in accordance with the present disclosure. Examples include, but are not limited to, feedforward neural networks, radial basis function networks, recurrent neural networks, residual neural networks, convolutional neural networks, residual convolutional neural networks, and the like, or any combination thereof. In some embodiments, the machine learning makes use of a pre-trained and/or transfer-learned ANN or deep learning architecture. In some implementations, convolutional and/or residual neural networks are used, in accordance with the present disclosure.

For instance, a deep neural network model includes an input layer, a plurality of individually parameterized (e.g., weighted) convolutional layers, and an output scorer. The parameters (e.g., weights) of each of the convolutional layers as well as the input layer contribute to the plurality of parameters (e.g., weights) associated with the deep neural network model. In some embodiments, at least 100 parameters, at least 1000 parameters, at least 2000 parameters or at least 5000 parameters are associated with the deep neural network model. As such, deep neural network models require a computer to be used because they cannot be mentally solved. In other words, given an input to the model, the model output needs to be determined using a computer rather than mentally in such embodiments. See, for example, Krizhevsky et al., 2012, "Imagenet classification with deep convolutional neural networks," in Advances in Neural Information Processing Systems 2, Pereira, Burges, Bottou, Weinberger, eds., pp. 1097-1105, Curran Associates, Inc.; Zeiler, 2012 "ADADELTA: an adaptive learning rate method," CoRR, vol. abs/1212.5701; and Rumelhart et al., 1988, "Neurocomputing: Foundations of research," ch. Learning Representations by Back-propagating Errors, pp. 696-699, Cambridge, MA, USA: MIT Press, each of which is hereby incorporated by reference.

Neural network algorithms, including convolutional neural network algorithms, suitable for use as models are disclosed in, for example, Vincent et al., 2010, "Stacked denoising autoencoders: Learning useful representations in a deep network with a local denoising criterion," J Mach Learn Res 11, pp. 3371-3408; Larochelle et al., 2009, "Exploring strategies for training deep neural networks," J Mach Learn Res 10, pp. 1-40; and Hassoun, 1995, Fundamentals of Artificial Neural Networks, Massachusetts Institute of Technology, each of which is hereby incorporated by reference. Additional example neural networks suitable for use as models are disclosed in Duda et al., 2001, *Pattern Classification*, Second Edition, John Wiley & Sons, Inc., New York; and Hastie et al., 2001, *The Elements of Statistical Learning*, Springer-Verlag, New York, each of which is hereby incorporated by reference in its entirety. Additional example neural networks suitable for use as models are also described in Draghici, 2003, *Data Analysis Tools for DNA Microarrays*, Chapman & Hall/CRC; and Mount, 2001, *Bioinformatics: sequence and genome analysis*, Cold Spring Harbor Laboratory Press, Cold Spring Harbor, New York, each of which is hereby incorporated by reference in its entirety.

Support vector machines. In some embodiments, the model is a support vector machine (SVM). SVM algorithms suitable for use as models are described in, for example, Cristianini and Shawe-Taylor, 2000, "An Introduction to Support Vector Machines," Cambridge University Press, Cambridge; Boser et al., 1992, "A training algorithm for optimal margin classifiers," in Proceedings of the 5th Annual ACM Workshop on Computational Learning Theory, ACM Press, Pittsburgh, Pa., pp. 142-152; Vapnik, 1998, Statistical Learning Theory, Wiley, New York; Mount, 2001, Bioinformatics: sequence and genome analysis, Cold Spring Harbor Laboratory Press, Cold Spring Harbor, N.Y.; Duda, Pattern Classification, Second Edition, 2001, John Wiley & Sons, Inc., pp. 259, 262-265; and Hastie, 2001, The Elements of Statistical Learning, Springer, New York; and Furey et al., 2000, Bioinformatics 16, 906-914, each of which is hereby incorporated by reference in its entirety. When used for classification, SVMs separate a given set of binary labeled data with a hyper-plane that is maximally distant from the labeled data. For certain cases in which no linear separation is possible, SVMs work in combination with the technique of 'kernels', which automatically realizes a non-linear mapping to a feature space. The hyper-plane found by the SVM in feature space corresponds, in some instances, to a non-linear decision boundary in the input space. In some embodiments, the plurality of parameters (e.g., weights) associated with the SVM define the hyper-plane. In some embodiments, the hyper-plane is defined by at least 10, at least 20, at least 50, or at least 100 parameters and the SVM model requires a computer to calculate because it cannot be mentally solved.

Naïve Bayes algorithms. In some embodiments, the model is a Naive Bayes algorithm. Naïve Bayes models suitable for use as models are disclosed, for example, in Ng et al., 2002, "On discriminative vs. generative classifiers: A comparison of logistic regression and naive Bayes," Advances in Neural Information Processing Systems, 14, which is hereby incorporated by reference. A Naive Bayes model is any model in a family of "probabilistic models" based on applying Bayes' theorem with strong (naïve) independence assumptions between the features. In some embodiments, they are coupled with Kernel density estimation. See, for example, Hastie et al., 2001, *The elements of statistical learning: data mining, inference, and prediction*, eds. Tibshirani and Friedman, Springer, New York, which is hereby incorporated by reference.

Nearest neighbor algorithms. In some embodiments, a model is a nearest neighbor algorithm. In some implementations, nearest neighbor models are memory-based and include no model to be fit. For nearest neighbors, given a query point $x_0$ (a test subject), the k training points $x_{(r)}$, r, . . . , k (here the training subjects) closest in distance to $x_0$ are identified and then the point $x_0$ is classified using the k nearest neighbors. In some embodiments, Euclidean distance in feature space is used to determine distance as $d_{(i)}=\|x_{(i)}-x_{(0)}\|$. Typically, when the nearest neighbor algorithm is used, the abundance data used to compute the linear discriminant is standardized to have mean zero and variance 1. In some embodiments, the nearest neighbor rule is refined to address issues of unequal class priors, differential misclassification costs, and feature selection. Many of these refinements involve some form of weighted voting for the neighbors. For more information on nearest neighbor analysis, see Duda, *Pattern Classification*, Second Edition, 2001, John Wiley & Sons, Inc; and Hastie, 2001, The Elements of Statistical Learning, Springer, New York, each of which is hereby incorporated by reference.

A k-nearest neighbor model is a non-parametric machine learning method in which the input consists of the k closest training examples in feature space. The output is a class membership. An object is classified by a plurality vote of its neighbors, with the object being assigned to the class most common among its k nearest neighbors (k is a positive integer, typically small). If k=1, then the object is simply assigned to the class of that single nearest neighbor. See, Duda et al., 2001, *Pattern Classification*, Second Edition, John Wiley & Sons, which is hereby incorporated by reference. In some embodiments, the number of distance calculations needed to solve the k-nearest neighbor model is such that a computer is used to solve the model for a given input because it cannot be mentally performed.

Random forest, decision tree, and boosted tree algorithms. In some embodiments, the model is a decision tree. Decision trees suitable for use as models are described generally by Duda, 2001, Pattern Classification, John Wiley & Sons, Inc., New York, pp. 395-396, which is hereby incorporated by reference. Tree-based methods partition the feature space into a set of rectangles, and then fit a model (like a constant) in each one. In some embodiments, the decision tree is random forest regression. For example, one specific algorithm is a classification and regression tree (CART). Other specific decision tree algorithms include, but are not limited to, ID3, C4.5, MART, and Random Forests. CART, ID3, and C4.5 are described in Duda, 2001, Pattern Classification, John Wiley & Sons, Inc., New York, pp. 396-408 and pp. 411-412, which is hereby incorporated by reference. CART, MART, and C4.5 are described in Hastie et al., 2001, The Elements of Statistical Learning, Springer-Verlag, New York, Chapter 9, which is hereby incorporated by reference in its entirety. Random Forests are described in Breiman, 1999, "Random Forests—Random Features," Technical Report 567, Statistics Department, U.C. Berkeley, September 1999, which is hereby incorporated by reference in its entirety. In some embodiments, the decision tree model includes at least 10, at least 20, at least 50, or at least 100 parameters (e.g., weights and/or decisions) and requires a computer to calculate because it cannot be mentally solved.

Regression. In some embodiments, the model uses a regression algorithm. In some embodiments, a regression algorithm is any type of regression. For example, in some embodiments, the regression algorithm is logistic regression. In some embodiments, the regression algorithm is logistic regression with lasso, L2 or elastic net regularization. In some embodiments, those extracted features that have a corresponding regression coefficient that fails to satisfy a threshold value are pruned (removed from) consideration. In some embodiments, a generalization of the logistic regression model that handles multicategory responses is used as the model. Logistic regression algorithms are disclosed in Agresti, An Introduction to Categorical Data Analysis, 1996, Chapter 5, pp. 103-144, John Wiley & Son, New York, which is hereby incorporated by reference. In some embodiments, the model makes use of a regression model disclosed in Hastie et al., 2001, *The Elements of Statistical Learning*, Springer-Verlag, New York. In some embodiments, the logistic regression model includes at least 10, at least 20, at least 50, at least 100, or at least 1000 parameters (e.g., weights) and requires a computer to calculate because it cannot be mentally solved.

Linear discriminant analysis algorithms. In some embodiments, linear discriminant analysis (LDA), normal discriminant analysis (NDA), or discriminant function analysis is a generalization of Fisher's linear discriminant, a method used in statistics, pattern recognition, and machine learning to find a linear combination of features that characterizes or separates two or more classes of objects or events. In some embodiments, the resulting combination is used as the model (linear model) in some embodiments of the present disclosure.

Mixture model and Hidden Markov model. In some embodiments, the model is a mixture model, such as that described in Mclachlan et al., Bioinformatics 18(3):413-422, 2002. In some embodiments, in particular, those embodiments including a temporal component, the model is a hidden Markov model such as described by Schliep et al., 2003, Bioinformatics 19(1):1255-i263.

Clustering. In some embodiments, the model is an unsupervised clustering model. In some embodiments, the model is a supervised clustering model. Clustering algorithms suitable for use as models are described, for example, at pages 211-256 of Duda and Hart, Pattern Classification and Scene Analysis, 1973, John Wiley & Sons, Inc., New York, (hereinafter "Duda 1973") which is hereby incorporated by reference in its entirety. As an illustrative example, in some embodiments, the clustering problem is described as one of finding natural groupings in a dataset. To identify natural groupings, two issues are addressed. First, a way to measure similarity (or dissimilarity) between two samples is determined. This metric (e.g., similarity measure) is used to ensure that the samples in one cluster are more like one another than they are to samples in other clusters. Second, a mechanism for partitioning the data into clusters using the similarity measure is determined. One way to begin a clustering investigation is to define a distance function and to compute the matrix of distances between all pairs of samples in the training set. If distance is a good measure of similarity, then the distance between reference entities in the same cluster is significantly less than the distance between the reference entities in different clusters. However, in some implementations, clustering does not use a distance metric. For example, in some embodiments, a nonmetric similarity function s(x, x') is used to compare two vectors x and x'. In some such embodiments, s(x, x') is a symmetric function whose value is large when x and x' are somehow "similar." Once a method for measuring "similarity" or "dissimilarity" between points in a dataset has been selected, clustering uses a criterion function that measures the clustering quality of any partition of the data. Partitions of the dataset that extremize the criterion function are used to cluster the data. Particular exemplary clustering techniques contemplated for use in the present disclosure include, but are not limited to, hierarchical clustering (agglomerative clustering using a nearest-neighbor algorithm, farthest-neighbor algorithm, the average linkage algorithm, the centroid algorithm, or the sum-of-squares algorithm), k-means clustering, fuzzy k-means clustering algorithm, and Jarvis-Patrick clustering. In some embodiments, the clustering includes unsupervised clustering (e.g., with no preconceived number of clusters and/or no predetermination of cluster assignments).

Ensembles of models and boosting. In some embodiments, an ensemble (two or more) of models is used. In some embodiments, a boosting technique such as AdaBoost is used in conjunction with many other types of learning algorithms to improve the performance of the model. In this approach, the output of any of the models disclosed herein, or their equivalents, is combined into a weighted sum that represents the final output of the boosted model. In some embodiments, the plurality of outputs from the models is combined using any measure of central tendency known in the art, including but not limited to a mean, median, mode, a weighted mean, weighted median, weighted mode, etc. In some embodiments, the plurality of outputs is combined using a voting method. In some embodiments, a respective model in the ensemble of models is weighted or unweighted.

As used herein, the term "parameter" refers to any coefficient or, similarly, any value of an internal or external element (e.g., a weight and/or a hyperparameter) in an algorithm, model, regressor, and/or classifier that can affect (e.g., modify, tailor, and/or adjust) one or more inputs, outputs, and/or functions in the algorithm, model, regressor and/or classifier. For example, in some embodiments, a parameter refers to any coefficient, weight, and/or hyperparameter that can be used to control, modify, tailor, and/or adjust the behavior, learning, and/or performance of an algorithm, model, regressor, and/or classifier. In some instances, a parameter is used to increase or decrease the influence of an input (e.g., a feature) to an algorithm, model, regressor, and/or classifier. As a nonlimiting example, in some embodiments, a parameter is used to increase or decrease the influence of a node (e.g., of a neural network), where the node includes one or more activation functions. Assignment of parameters to specific inputs, outputs, and/or functions is not limited to any one paradigm for a given algorithm, model, regressor, and/or classifier but can be used in any suitable algorithm, model, regressor, and/or classifier architecture for a desired performance. In some embodiments, a parameter has a fixed value. In some embodiments, a value of a parameter is manually and/or automatically adjustable. In some embodiments, a value of a parameter is modified by a validation and/or training process for an algorithm, model, regressor, and/or classifier (e.g., by error minimization and/or backpropagation methods). In some embodiments, an algorithm, model, regressor, and/or classifier of the present disclosure includes a plurality of parameters. In some embodiments, the plurality of parameters is n parameters, where: $n \geq 2$; $n \geq 5$; $n \geq 10$; $n \geq 25$; $n \geq 40$; $n \geq 50$; $n \geq 75$; $n \geq 100$; $n \geq 125$; $n \geq 150$; $n \geq 200$; $n \geq 225$; $n \geq 250$; $n \geq 350$; $n \geq 500$; $n \geq 600$; $n \geq 750$; $n \geq 1,000$; $n \geq 2,000$; $n \geq 4,000$; $n \geq 5,000$; $n \geq 7,500$; $n \geq 10,000$; $n \geq 20,000$; $n \geq 40,000$; $n \geq 75,000$; $n \geq 100,000$; $n \geq 200,000$; $n \geq 500,000$, $n \geq 1 \times 10^6$, $n \geq 5 \times 10^6$, or $n \geq 1 \times 10^7$. As such, the algorithms, models, regressors, and/or classifiers of the present disclosure cannot be mentally performed. In some embodiments n is between 10,000 and $1 \times 10^7$, between 100,000 and $5 \times 10^6$, or between 500,000 and $1 \times 10^6$. In some embodiments, the algorithms, models, regressors, and/or classifier of the present disclosure operate in a k-dimensional space, where k is a positive integer of 5 or greater (e.g., 5, 6, 7, 8, 9, 10, etc.). As such, the algorithms, models, regressors, and/or classifiers of the present disclosure cannot be mentally performed.

As used herein, the term "untrained model" (e.g., "untrained classifier" and/or "untrained neural network") refers to a machine learning model or algorithm, such as a classifier or a neural network, that has not been trained on a target dataset. In some embodiments, "training a model" (e.g., "training a neural network") refers to the process of training an untrained or partially trained model (e.g., "an untrained or partially trained neural network"). Moreover, it will be appreciated that the term "untrained model" does not exclude the possibility that transfer learning techniques are used in such training of the untrained or partially trained model. For instance, Fernandes et al., 2017, "Transfer Learning with Partial Observability Applied to Cervical Cancer Screening," Pattern Recognition and Image Analysis: $8^{th}$ Iberian Conference Proceedings, 243-250, which is hereby incorporated by reference, provides non-limiting examples of such transfer learning. In instances where transfer learning is used, the untrained model described above is provided with additional data over and beyond that of the primary training dataset. Typically, this additional data is in the form of parameters (e.g., coefficients, weights, and/or hyperparameters) that were learned from another, auxiliary training dataset. Moreover, while a description of a single auxiliary training dataset has been disclosed, it will be appreciated that there is no limit on the number of auxiliary training datasets that can be used to complement the primary training dataset in training the untrained model in the present disclosure. For instance, in some embodiments, two or more auxiliary training datasets, three or more auxiliary training datasets, four or more auxiliary training datasets or five or more auxiliary training datasets are used to complement the primary training dataset through transfer learning, where each such auxiliary dataset is different than the primary training dataset. Any manner of transfer learning is used, in some such embodiments. For instance, consider the case where there is a first auxiliary training dataset and a second auxiliary training dataset in addition to the primary training dataset. In such a case, the parameters learned from the first auxiliary training dataset (by application of a first model to the first auxiliary training dataset) are applied to the second auxiliary training dataset using transfer learning techniques (e.g., a second model that is the same or different from the first model), which in turn results in a trained intermediate model whose parameters are then applied to the primary training dataset and this, in conjunction with the primary training dataset itself, is applied to the untrained model. Alternatively, in another example embodiment, a first set of parameters learned from the first auxiliary training dataset (by application of a first model to the first auxiliary training dataset) and a second set of parameters learned from the second auxiliary training dataset (by application of a second model that is the same or different from the first model to the second auxiliary training dataset) are each individually applied to a separate instance of the primary training dataset (e.g., by separate independent matrix multiplications) and both such applications of the parameters to separate instances of the primary training dataset in conjunction with the primary training dataset itself (or some reduced form of the primary training dataset such as principal components or regression coefficients learned from the primary training set) are then applied to the untrained model in order to train the untrained model.

Several aspects are described herein with reference to example applications for illustration. It should be understood that numerous specific details, relationships, and methods are set forth to provide a full understanding of the features described herein. One having ordinary skill in the relevant art, however, will readily recognize that the features described herein can be practiced without one or more of the specific details or with other methods. The features described herein are not limited by the illustrated ordering of acts or events, as some acts can occur in different orders and/or concurrently with other acts or events. Furthermore, not all illustrated acts or events are required to implement a methodology in accordance with the features described herein.

Reference is made herein to embodiments, examples of which are illustrated in the accompanying drawings. In the present disclosure, numerous specific details are set forth in order to provide a thorough understanding of the present disclosure. However, it will be apparent to one of ordinary skill in the art that the present disclosure can be practiced without these specific details. In other instances, well-known methods, procedures, components, circuits, and networks have not been described in detail so as not to unnecessarily obscure aspects of the embodiments.

Example System Embodiments.

Figure 1B:
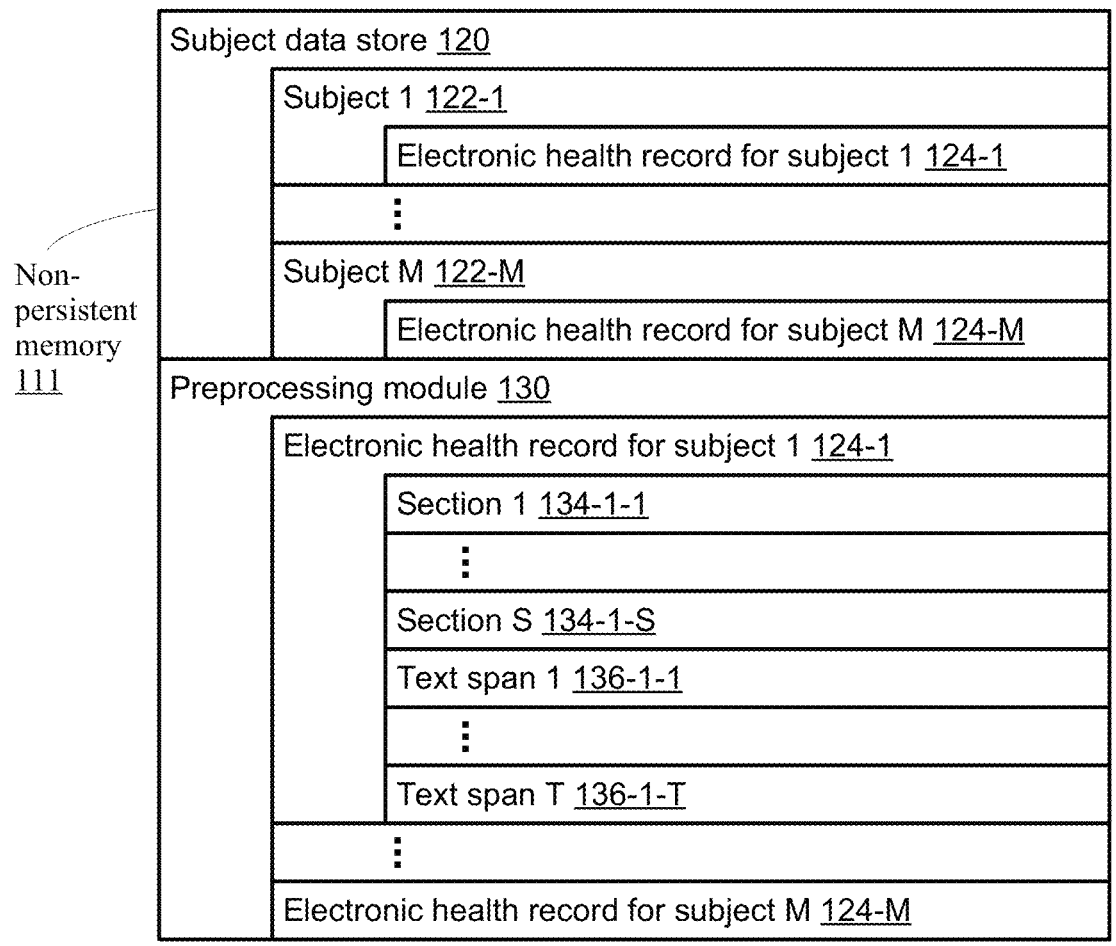
Figure 1C:
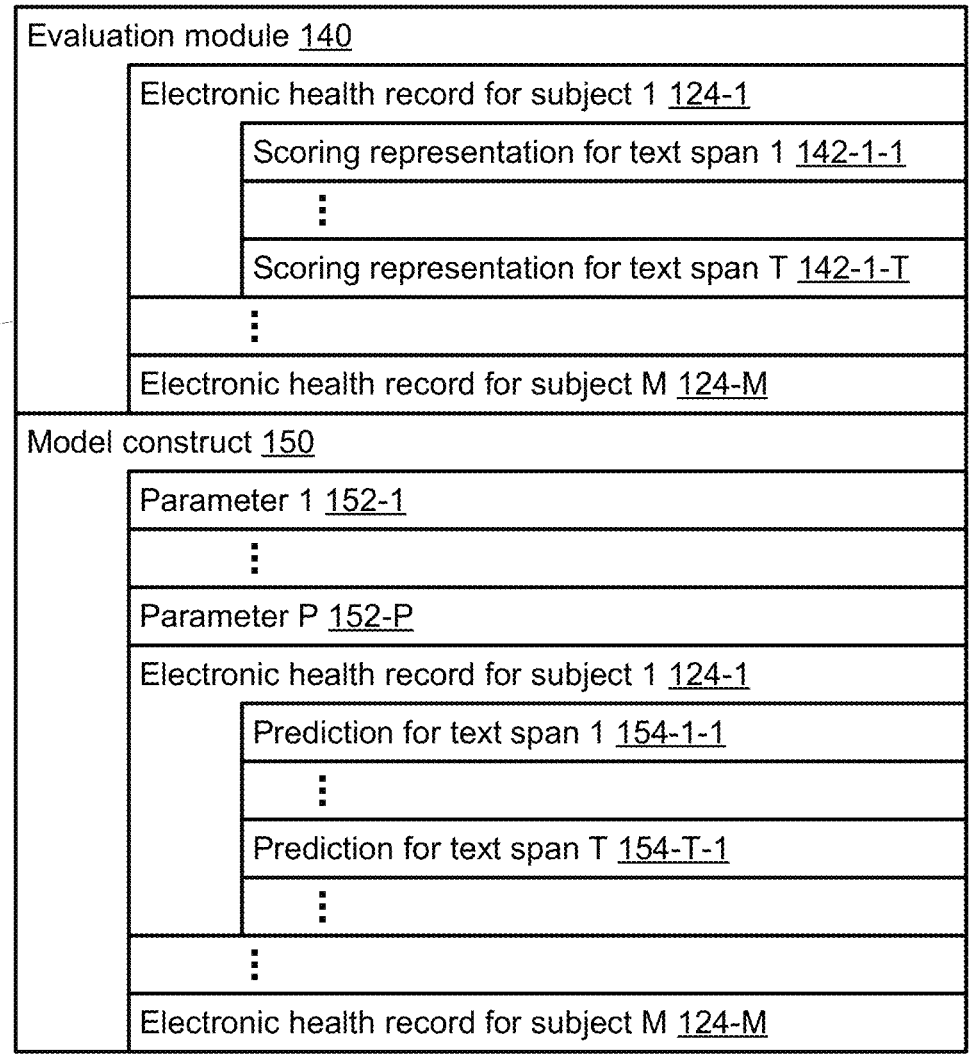

Now that an overview of some aspects of the present disclosure and some definitions used in the present disclosure have been provided, details of an exemplary system for providing clinical support for personalized therapy for various diseases and disorders (e.g., cardiovascular conditions, neurological conditions, cancers, etc.) are now described in conjunction with FIGS. 1A-C. FIGS. 1A-C collectively illustrate the topology of an example system for providing clinical support for personalized therapy, in accordance with some embodiments of the present disclosure. Advantageously, the example system illustrated in FIGS. 1A-C improves upon conventional methods for providing clinical support for personalized therapy by improving extraction of a relationship between a first subject and a first health entity from a first electronic health record of the first subject, and particularly by determining and inputting features obtained for a set of text spans in the first electronic health record to a trained model. In some embodiments, the trained model includes a plurality of parameters that reflects a plurality of initialization parameters, where the plurality of initialization parameters includes measures of co-occurrence between features and one or more relationship statuses in a plurality of relationship statuses.

FIGS. 1A-C collectively illustrate a block diagram illustrating a system in accordance with some implementations. The device 100 in some implementations includes one or more processing units CPU(s) 102 (also referred to as processors), one or more network interfaces 104, a user interface 106, e.g., including a display 108 and/or an input 110 (e.g., a mouse, touchpad, keyboard, etc.), a non-persistent memory 111, a persistent memory 112, and one or more communication buses 114 for interconnecting these components. The one or more communication buses 114 optionally include circuitry (sometimes called a chipset) that interconnects and controls communications between system components. The non-persistent memory 111 typically includes high-speed random access memory, such as DRAM, SRAM, DDR RAM, ROM, EEPROM, flash memory, whereas the persistent memory 112 typically includes CD-ROM, digital versatile disks (DVD) or other optical storage, magnetic cassettes, magnetic tape, magnetic disk storage or other magnetic storage devices, magnetic disk storage devices, optical disk storage devices, flash memory devices, or other non-volatile solid state storage devices. The persistent memory 112 optionally includes one or more storage devices remotely located from the CPU(s) 102. The persistent memory 112, and the non-volatile memory device(s) within the non-persistent memory 112, comprise non-transitory computer readable storage medium. In some implementations, the non-persistent memory 111 or alternatively the non-transitory computer readable storage medium stores the following programs, modules and data structures, or a subset thereof, sometimes in conjunction with the persistent memory 112:

- an operating system 116, which includes procedures for handling various basic system services and for performing hardware dependent tasks;
- a network communication module (or instructions) 118 for connecting the system 100 with other devices and/or a communication network 105;
- a subject data store 120 that optionally stores at least a first electronic health record 124 (e.g., 124-1, . . . 124-M) for at least a corresponding first subject 122 (e.g., 122-1, . . . 122-M);
- a preprocessing module 130 that optionally:
  - detects, for at least the first electronic health record 124, for each respective section in a plurality of sections 134 (e.g., 134-1-1, . . . 134-1-S), a corresponding section header, thereby splitting the first electronic health record into the plurality of sections,
  - subdivides each respective section 134 into a corresponding one or more text spans, thereby obtaining a plurality of text spans 136 (e.g., 136-1-1, . . . 136-1-T) for the first electronic health record, and
  - filters the plurality of text spans 136 by language pattern recognition to identify a set of text spans, where each respective text span in the set of text spans comprises a respective expression related to a first health entity;
- an evaluation module 140 that optionally evaluates, for each respective text span 136 in the set of text spans, the corresponding natural language context of the respective expression related to the first health entity, thereby obtaining a respective scoring representation 142 (e.g., 142-1-1, . . . 142-1-T) of the corresponding natural language context of the respective expression; and a model construct 150 that optionally:
includes a plurality of parameters 152 (e.g., 152-1, . . . 152-P),
receives, as input, for each respective text span 136 in the set of text spans, the respective scoring representation 142, and
generates, as output, for each respective text span 136 in the set of text spans, at least a corresponding first prediction 154 (e.g., 154-1-1, . . . 154-T−1) that the respective text span is associated with the first health entity.

Although FIGS. 1A-C depict various components of a "system 100," the figures are intended more as a functional description of the various features that, in some embodiments, are present in computer systems than as a structural schematic of the implementations described herein. In practice, in some implementations, items shown separately are combined and some items are separated. Moreover, although FIGS. 1A-C depict certain data and modules in non-persistent memory 111, in some embodiments, some or all of these data and modules are in persistent memory 112. For example, in various implementations, one or more of the above identified elements are stored in one or more of the previously mentioned memory devices and correspond to a set of instructions for performing a function described above. The above identified modules, data, or programs (e.g., sets of instructions) need not be implemented as separate software programs, procedures, datasets, or modules, and thus various subsets of these modules and data, in some embodiments, are combined or otherwise re-arranged in various implementations.

In some implementations, the non-persistent memory 111 optionally stores a subset of the modules and data structures identified above. Furthermore, in some embodiments, the memory stores additional modules and data structures not described above. In some embodiments, one or more of the above-identified elements is stored in a computer system, other than that of system 100, that is addressable by system 100 so that system 100 retrieves all or a portion of such data when needed.

For purposes of illustration in FIG. 1A, system 100 is represented as a single computer that includes all of the functionality for providing clinical support for personalized therapy. However, while a single machine is illustrated, the term "system" shall also be taken to include any collection of machines that individually or jointly execute a set (or multiple sets) of instructions to perform any one or more of the methodologies discussed herein.

For example, in some embodiments, system 100 includes one or more computers. In some embodiments, the functionality for providing clinical support for personalized therapy is spread across any number of networked computers and/or resides on each of several networked computers and/or is hosted on one or more virtual machines at a remote location accessible across the communications network 105. For example, different portions of the various modules and data stores illustrated in FIGS. 1A-C can be stored and/or executed on the various instances of a processing device and/or processing server/database in the distributed diagnostic environment 210 illustrated in FIG. 2 (e.g., processing devices 224, 234, 244, and 254, processing server 262, and database 264).

In some embodiments, the system operates in the capacity of a server or a client machine in a client-server network environment, as a peer machine in a peer-to-peer (or distributed) network environment, or as a server or a client machine in a cloud computing infrastructure or environment. In some embodiments, the system is a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine.

In another implementation, the system comprises a virtual machine that includes a module for executing instructions for performing any one or more of the methodologies disclosed herein. In computing, a virtual machine (VM) is an emulation of a computer system that is based on computer architectures and provides functionality of a physical computer. Some such implementations involve specialized hardware, software, or a combination of hardware and software.

One of skill in the art will appreciate that any of a wide array of different computer topologies are used for the application and all such topologies are within the scope of the present disclosure.

In some embodiments, system 100 further includes a clinical trials module that evaluates one or more predictions 154 to determine whether the subject 122 is eligible for inclusion in a clinical trial for treatment of a disease or disorder, e.g., a clinical trial that is currently recruiting patients, a clinical trial that has not yet begun recruiting patients, and/or an ongoing clinical trial that may recruit additional patients in the future. In some embodiments, a clinical trial module evaluates one or more predictions 154 to determine whether the results of a clinical trial are relevant for the subject 122, e.g., the results of an ongoing clinical trial and/or the results of a completed clinical trial. For instance, in some embodiments, system 100 queries a database, e.g., a look-up-table ("LUT") of clinical trials, e.g., active and/or completed clinical trials, and compares the one or more predictions 154 with inclusion criteria for the clinical trials, stored in the database, to identify clinical trials with inclusion criteria that closely match and/or exactly match the one or more predictions 154. In some embodiments, a record of matching clinical trials, e.g., those clinical trials that the subject 122 is likely eligible for and/or that inform personalized treatment decisions for the subject, are further stored in system 100 and/or subject data store 120.

In some embodiments, system 100 includes a model training module that includes instructions for training one or more untrained or partially trained models based on feature data from a training dataset. In some embodiments, system 100 also includes a database of training data (e.g., a plurality of training electronic health records) for use in training the one or more models. In other embodiments, the model training module accesses a remote storage device hosting training data. In some embodiments, the training data includes a set of training features, including but not limited to, various types of scoring representations 142 and/or text spans 136 illustrated in FIGS. 1A-C. In some embodiments, the model training module uses subject data, e.g., when subject data store 120 also stores a record of treatments administered to the subject 122 and subject outcomes following therapy.

In some embodiments, each of the one or more data stores and/or modules are communicatively coupled to a data bus to transfer data between each data store or module for processing and/or storage. In some alternative embodiments, each of the one or more data stores and/or modules are communicatively coupled to each other for independent communication without sharing the data bus.

Further details on systems and exemplary embodiments of modules and feature collections are discussed in PCT Application PCT/US19/69149, titled "A METHOD AND PROCESS FOR PREDICTING AND ANALYZING PATIENT COHORT RESPONSE, PROGRESSION, AND SURVIVAL," filed Dec. 31, 2019, the content of which is incorporated herein by reference, in its entirety, for all purposes.

Example Embodiments for Determining Subject-Entity Relationships.

Now that details of a system 100 for providing clinical support for personalized medicine (e.g., personalized cancer therapy) have been disclosed, e.g., with improved determination of subject-health entity relationships in electronic health records, details regarding processes and features of the system, in accordance with various embodiments of the present disclosure, are provided below. Specifically, example processes are described below with reference to FIGS. 3A-D. In some embodiments, such processes and features of the system are carried out by modules 118, 120, 130, 140, and/or 150, as illustrated in FIGS. 1A-C. Referring to these methods, in some embodiments, the systems described herein (e.g., system 100) include instructions for determining subject-health entity relationships that are improved compared to conventional methods for subject-health entity relationship extraction.

In one aspect, the disclosure provides a method 300 for determining a relationship between a first subject 122 and a first health entity for use in clinical decision-making. In some embodiments, the method is performed at a computer system including at least one processor and a memory storing at least one program having instructions for execution by the at least one processor.

Subjects and Health Entities

Referring to Block 302, in some embodiments, the first health entity is a medication. In some embodiments, the first health entity is a medication name, a medication type, and/or a medication code. For example, in some implementations, the relationship between the first subject and the first health entity indicates that the first subject is taking the medication. In some implementations, the relationship between the first subject and the first health entity indicates that the first subject has been prescribed the medication. In some implementations, the relationship between the first subject and the first health entity indicates that the first subject has refused the medication. Various subject-medication relationships are contemplated for use in the present disclosure, including but not limited to taking a medication, being prescribed a medication, refusing a medication, ceasing administration of a medication, modifying or adjusting a dosage of a medication, having a risk factor related to a medication, and/or having a recommendation to take or not take a medication. Other subject-medication relationships are possible, as will be apparent to one skilled in the art.

In some embodiments, the medication is for a health condition, such as a disease or disorder. In some embodiments, the medication is a medication for a cancer condition. In some such embodiments, the cancer condition is any of the cancers or cancer subtypes disclosed below.

In some implementations, the medication is a targeted therapy for bladder cancer (e.g., atezolizumab (Tecentriq), avelumab (Bavencio), enfortumab vedotin-ejfv (Padcev), erdafitinib (Balversa), nivolumab (Opdivo), pembrolizumab (Keytruda), and/or sacituzumab govitecan-hziy (Trodelvy)). In some implementations, the medication is a targeted therapy for brain cancer (e.g., belzutifan (Welireg), bevacizumab (Avastin), and/or everolimus (Afinitor)). In some implementations, the medication is a targeted therapy for breast cancer (e.g., abemaciclib (Verzenio), ado-trastuzumab emtansine (Kadcyla), alpelisib (Piqray), anastrozole (Arimidex), everolimus (Afinitor), exemestane (Aromasin), fam-trastuzumab deruxtecan-nxki (Enhertu), fulvestrant (Faslodex), lapatinib ditosylate (Tykerb), letrozole (Femara), margetuximab-cmkb (Margenza), neratinib maleate (Nerlynx), olaparib (Lynparza), palbociclib (Ibrance), pembrolizumab (Keytruda), pertuzumab (Perjeta), pertuzumab, trastuzumab, and hyaluronidase-zzxf (Phesgo), ribociclib (Kisqali), sacituzumab govitecan-hziy (Trodelvy), talazoparib tosylate (Talzenna), tamoxifen citrate (Soltamox), toremifene (Fareston), trastuzumab (Herceptin), and/or tucatinib (Tukysa)).

In some implementations, the medication is a targeted therapy for cervical cancer (e.g., bevacizumab (Avastin), pembrolizumab (Keytruda), and/or tisotumab vedotin-tftv (Tivdak)). In some implementations, the medication is a targeted therapy for colorectal cancer (e.g., bevacizumab (Avastin), cetuximab (Erbitux), encorafenib (Braftovi), ipilimumab (Yervoy), nivolumab (Opdivo), panitumumab (Vectibix), pembrolizumab (Keytruda), ramucirumab (Cyramza), regorafenib (Stivarga), and/or ziv-aflibercept (Zaltrap)). In some implementations, the medication is a targeted therapy for dermatofibrosarcoma protuberans (e.g., imatinib mesylate (Gleevec)). In some implementations, the medication is a targeted therapy for endocrine and neuroendocrine tumors (e.g., avelumab (Bavencio), iobenguane I 131 (Azedra), lanreotide acetate (Somatuline Depot), and/or lutetium Lu 177-dotatate (Lutathera)). In some implementations, the medication is a targeted therapy for endometrial cancer (e.g., dostarlimab-gxly (Jemperli), lenvatinib mesylate (Lenvima), and/or pembrolizumab (Keytruda)).

In some implementations, the medication is a targeted therapy for esophageal cancer (e.g., fam-trastuzumab deruxtecan-nxki (Enhertu), ipilimumab (Yervoy), nivolumab (Opdivo), pembrolizumab (Keytruda), ramucirumab (Cyramza), and/or trastuzumab (Herceptin)). In some implementations, the medication is a targeted therapy for head and neck cancer (e.g., cetuximab (Erbitux), nivolumab (Opdivo), and/or pembrolizumab (Keytruda)). In some implementations, the medication is a targeted therapy for gastrointestinal stromal tumor (e.g., avapritinib (Ayvakit), imatinib mesylate (Gleevec), regorafenib (Stivarga), ripretinib (Qinlock), and/or sunitinib malate (Sutent)). In some implementations, the medication is a targeted therapy for giant cell tumor (e.g., denosumab (Xgeva), and/or pexidartinib hydrochloride (Turalio)). In some implementations, the medication is a targeted therapy for kidney cancer (e.g., avelumab (Bavencio), axitinib (Inlyta), belzutifan (Welireg), bevacizumab (Avastin), cabozantinib-s-malate (Cabometyx), everolimus (Afinitor), ipilimumab (Yervoy), lenvatinib mesylate (Lenvima), nivolumab (Opdivo), pazopanib hydrochloride (Votrient), pembrolizumab (Keytruda), sorafenib tosylate (Nexavar), sunitinib malate (Sutent), temsirolimus (Torisel), and/or tivozanib hydrochloride (Fotivda)).

In some implementations, the medication is a targeted therapy for leukemia (e.g., acalabrutinib (Calquence), alemtuzumab (Campath), asciminib hydrochloride (Scemblix), avapritinib (Ayvakit), blinatumomab (Blincyto), bosutinib (Bosulif), brexucabtagene autoleucel (Tecartus), dasatinib (Sprycel), duvelisib (Copiktra), enasidenib mesylate (Idhifa), gemtuzumab ozogamicin (Mylotarg), gilteritinib fumarate (Xospata), glasdegib maleate (Daurismo), ibrutinib (Imbruvica), idelalisib (Zydelig), imatinib mesylate (Gleevec), inotuzumab ozogamicin (Besponsa), ivosidenib (Tibsovo), midostaurin (Rydapt), moxetumomab pasudotoxtdfk (Lumoxiti), nilotinib (Tasigna), obinutuzumab (Gazyva), ofatumumab (Arzerra), pemigatinib (Pemazyre), ponatinib hydrochloride (Iclusig), rituximab (Rituxan), rituximab and hyaluronidase human (Rituxan Hycela), tagraxofusp-erzs (Elzonris), tisagenlecleucel (Kymriah), tretinoin (Vesanoid), and/or venetoclax (Venclexta)). In some implementations, the medication is a targeted therapy for liver and bile duct cancer (e.g., atezolizumab (Tecentriq), bevacizumab (Avastin), cabozantinib-s-malate (Cabometyx), durvalumab (Imfinzi), futibatinib (Lytgobi), infigratinib phosphate (Truseltiq), ipilimumab (Yervoy), ivosidenib (Tibsovo), lenvatinib mesylate (Lenvima), nivolumab (Opdivo), pembrolizumab (Keytruda), pemigatinib (Pemazyre), ramucirumab (Cyramza), regorafenib (Stivarga), and/or sorafenib tosylate (Nexavar)).

In some implementations, the medication is a targeted therapy for lung cancer (e.g., afatinib dimaleate (Gilotrif), alectinib (Alecensa), amivantamab-vmjw (Rybrevant), atezolizumab (Tecentriq), bevacizumab (Avastin), brigatinib (Alunbrig), capmatinib hydrochloride (Tabrecta), cemiplimab-rwlc (Libtayo), ceritinib (Zykadia), crizotinib (Xalkori), dabrafenib mesylate (Tafinlar), dacomitinib (Vizimpro), durvalumab (Imfinzi), entrectinib (Rozlytrek), erlotinib hydrochloride (Tarceva), fam-trastuzumab deruxtecan-nxki (Enhertu), gefitinib (Iressa), ipilimumab (Yervoy), lorlatinib (Lorbrena), mobocertinib succinate (Exkivity), necitumumab (Portrazza), nivolumab (Opdivo), osimertinib mesylate (Tagrisso), pembrolizumab (Keytruda), pralsetinib (Gavreto), ramucirumab (Cyramza), selpercatinib (Retevmo), sotorasib (Lumakras), tepotinib hydrochloride (Tepmetko), and/or trametinib dimethyl sulfoxide (Mekinist)).

In some implementations, the medication is a targeted therapy for lymphoma (e.g., acalabrutinib (Calquence), axicabtagene ciloleucel (Yescarta), belinostat (Beleodaq), bexarotene (Targretin), bortezomib (Velcade), brentuximab vedotin (Adcetris), brexucabtagene autoleucel (Tecartus), copanlisib hydrochloride (Aliqopa), crizotinib (Xalkori), denileukin diftitox (Ontak), duvelisib (Copiktra), ibritumomab tiuxetan (Zevalin), ibrutinib (Imbruvica), lisocabtagene maraleucel (Breyanzi), loncastuximab tesirine-lpyl (Zynlonta), mogamulizumab-kpkc (Poteligeo), nivolumab (Opdivo), obinutuzumab (Gazyva), pembrolizumab (Keytruda), pemigatinib (Pemazyre), polatuzumab vedotin-piiq (Polivy), pralatrexate (Folotyn), rituximab (Rituxan), rituximab and hyaluronidase human (Rituxan Hycela), romidepsin (Istodax), selinexor (Xpovio), siltuximab (Sylvant), tafasitamab-cxix (Monjuvi), tazemetostat hydrobromide (Tazverik), tisagenlecleucel (Kymriah), venetoclax (Venclexta), vorinostat (Zolinza), and/or zanubrutinib (Brukinsa)).

In some implementations, the medication is a targeted therapy for malignant mesothelioma (e.g., ipilimumab (Yervoy) and/or nivolumab (Opdivo)). In some implementations, the medication is a targeted therapy for multiple myeloma (e.g., belantamab mafodotin-blmf (Blenrep), bortezomib (Velcade), carfilzomib (Kyprolis), ciltacabtagene autoleucel (Carvykti), daratumumab (Darzalex), daratumumab and hyaluronidase-fihj (Darzalex Faspro), elotuzumab (Empliciti), idecabtagene vicleucel (Abecma), isatuximab-irfc (Sarclisa), ixazomib citrate (Ninlaro), and/orselinexor (Xpovio)). In some embodiments, the medication is a targeted therapy for myelodysplastic and myeloproliferative disorders (e.g., fedratinib hydrochloride (Inrebic), imatinib mesylate (Gleevec), pacritinib citrate (Vonjo), pemigatinib (Pemazyre), and/or ruxolitinib phosphate (Jakafi)). In some embodiments, the medication is a targeted therapy for neuroblastoma (e.g., dinutuximab (Unituxin), and/or naxitamab-gqgk (Danyelza)). In some embodiments, the medication is a targeted therapy for ovarian epithelial, fallopian tube, and primary peritoneal cancers (e.g., bevacizumab (Avastin), niraparib tosylate monohydrate (Zejula), olaparib (Lynparza), and/or rucaparib camsylate (Rubraca)).

In some embodiments, the medication is a targeted therapy for pancreatic cancer (e.g., belzutifan (Welireg), erlotinib hydrochloride (Tarceva), everolimus (Afinitor), olaparib (Lynparza), and/or sunitinib malate (Sutent)). In some embodiments, the medication is a targeted therapy for plexiform neurofibroma (e.g., selumetinib sulfate (Koselugo)). In some embodiments, the medication is a targeted therapy for prostate cancer (e.g., abiraterone acetate (Zytiga), apalutamide (Erleada), cabazitaxel (Jevtana), darolutamide (Nubeqa), enzalutamide (Xtandi), lutetium Lu 177 vipivotide tetraxetan (Pluvicto), olaparib (Lynparza), radium 223 dichloride (Xofigo), and/or rucaparib camsylate (Rubraca)). In some embodiments, the medication is a targeted therapy for skin cancer (e.g., alitretinoin (Panretin), atezolizumab (Tecentriq), avelumab (Bavencio), binimetinib (Mektovi), cemiplimab-rwlc (Libtayo), cobimetinib fumarate (Cotellic), dabrafenib mesylate (Tafinlar), encorafenib (Braftovi), ipilimumab (Yervoy), nivolumab (Opdivo), nivolumab and relatlimab-rmbw (Opdualag), pembrolizumab (Keytruda), sonidegib (Odomzo), tebentafusp-tebn (Kimmtrak), trametinib dimethyl sulfoxide (Mekinist), vismodegib (Erivedge), and/or vemurafenib (Zelboraf)). In some embodiments, the medication is a targeted therapy for soft tissue sarcoma (e.g., alitretinoin (Panretin), crizotinib (Xalkori), pazopanib hydrochloride (Votrient), sirolimus protein-bound particles (Fyarro), and/or tazemetostat hydrobromide (Tazverik)).

In some embodiments, the medication is a targeted therapy for solid tumors anywhere in the body (e.g., dabrafenib mesylate (Tafinlar), dostarlimab-gxly (Jemperli), entrectinib (Rozlytrek), larotrectinib sulfate (Vitrakvi), pembrolizumab (Keytruda), selpercatinib (Retevmo), and/or trametinib dimethyl sulfoxide (Mekinist)). In some embodiments, the medication is a targeted therapy for stomach (gastric) cancer (e.g., fam-trastuzumab deruxtecan-nxki (Enhertu), nivolumab (Opdivo), pembrolizumab (Keytruda), ramucirumab (Cyramza), and/or trastuzumab (Herceptin)). In some embodiments, the medication is a targeted therapy for systemic mastocytosis (e.g., avapritinib (Ayvakit), imatinib mesylate (Gleevec), and/or midostaurin (Rydapt)). In some embodiments, the medication is a targeted therapy for thyroid cancer (e.g., cabozantinib-s-malate (Cometriq), dabrafenib mesylate (Tafinlar), lenvatinib mesylate (Lenvima), pralsetinib (Gavreto), selpercatinib (Retevmo), sorafenib tosylate (Nexavar), trametinib dimethyl sulfoxide (Mekinist), and/or vandetanib (Caprelsa)).

Additional medications for use as health entities are possible and are contemplated for use in the present disclosure, as will be apparent to one skilled in the art. See, for example, National Cancer Institute, "List of Targeted Therapy Drugs Approved for Specific Types of Cancer," updated Oct. 31, 2022, available on the Internet at cancer.gov/about-cancer/treatment/types/targeted-therapies/approved-drug-list, which is hereby incorporated herein by reference in its entirety.

In some embodiments, the medication is selected from one or more medication databases. For instance, in some implementations, the medication is selected from the Translational Medicine Ontology (TMO). See, for example, Luciano et al., "The Translational Medicine Ontology and Knowledge Base: driving personalized medicine by bridging the gap between bench and bedside," Journal of Biomedical Semantics, 2011; 2(2):S1, which is hereby incorporated herein by reference in its entirety. In some implementations, the medication is selected from the National Cancer Institute Thesaurus (NCIt). See, for example, "NCIthesaurus," Version 22.11d (Release date: 2022 Nov. 28), available on the Internet at ncithesaurus.nci.nih.gov/ncitbrowser, which is hereby incorporated herein by reference in its entirety. Suitable examples of medication databases contemplated for use in the present disclosure further include, but are not limited to, CHM: CheMBL; DrugB: Drug-Bank; ODB: Ontario database; THIN: The Health Improvement Network; TCM: Traditional Chinese Medicine; TBDB: Tuberculosis Database; TTD: Therapeutic Target database; PDTD: Potential Drug-Target Database; TDR: Tropical Diseases Research; HIVRT: HIV Drug Resistance Database; TCMSP: Traditional Chinese Medicine Platform; SCYP: Super Cytochrome P450; DHUB: Drug Repurposing Hub; DSDB: Drug Signatures Database; PROM: Promiscuous; DRAR: Drug Repurposing Adverse Reaction; DMAP: Drug-Protein connectivity MAP; CMAP: Complement Map database; DMC: Drug Map Central; SIDER: Side Effect Resource; KSRPO: A platform for drug Repositioning; NNFIN: Network-based similarity finder; DSRV: Drug survival database; CHSP: anti-Cancer Herbs database for System Pharmacology; D2G: Drug to Gene; GSDB: Gene Set Database; SBIOS: Swiss BIOisostere; DTOM: Drug Target interactome database; DPTH: Drug Pathway database; DTW: Drug Target Web; DNET: Drug-disease Network database; SUT: SuperTarget database; DTC: Drug Target Commons; and/or KEGG: Kyoto Encyclopedia of Genes and Genomes. See, for example, Masoudi-Sobhanzadeh et al., "Drug databases and their contributions to drug repurposing," Genomics. 2020; 112 (2): 1087-1095, which is hereby incorporated herein by reference in its entirety.

In some embodiments, the first health entity is a biomarker. In some embodiments, the biomarker is a genetic marker or a genetic variant, as described in further detail elsewhere herein (see, for example, the section entitled "Definitions: Variants," above). In some embodiments, the biomarker is a pathogenic variant with therapeutic, diagnostic, and/or prognostic significance. In some embodiments, the biomarker is a non-actionable pathogenic variants or a variant of uncertain significance. In some embodiments, the biomarker is a translocation based on features of known gene fusions, relevant breakpoints, and/or biological relevance. In some embodiments, the biomarker is a germline alteration, including but not limited to genes recommended by the American College of Medical Genetics and Genomics (ACMG) and/or additional genes associated with cancer predisposition or drug resistance.

In some implementations, the relationship between the first subject and the first health entity indicates that the first subject has (e.g., expresses) or does not have (e.g., does not express) the biomarker. In some embodiments, variant analysis is performed on one or more biological samples from the first subject (e.g., sequencing and/or bioinformatics analysis) to determine whether the first subject has or does not have the biomarker.

In some embodiments, the first health entity is a disease condition. Examples of disease conditions contemplated for use in the present disclosure include, but are not limited to, disease types, disease subtypes, symptoms, diagnoses, and/or prognoses associated with one or more diseases. In some implementations, the relationship between the first subject and the first health entity indicates that the first subject has (e.g., is diagnosed with) or does not have (e.g., has not been diagnosed with) the disease condition.

In some embodiments, the disease condition is a cancer type or a cancer stage.

Examples of cancer include, but are not limited to, carcinoma, lymphoma, blastoma, glioblastoma, sarcoma, and leukemia. In some embodiments, non-limiting cancers include breast cancer, squamous cell cancer, lung cancer (including small-cell lung cancer, non-small cell lung cancer (NSCLC), adenocarcinoma of the lung, and squamous carcinoma of the lung (e.g., squamous NSCLC)), various types of head and neck cancer (e.g., HNSC), cancer of the peritoneum, hepatocellular cancer, gastric or stomach cancer (including gastrointestinal cancer), pancreatic cancer, ovarian cancer, cervical cancer, liver cancer, bladder cancer, hepatoma, colon cancer, colorectal cancer, endometrial or uterine carcinoma, salivary gland carcinoma, kidney or renal cancer, liver cancer, prostate cancer, vulval cancer, thyroid cancer, and hepatic carcinoma. In some embodiments, non-limiting cancers further include B-cell lymphoma (including low grade/follicular non-Hodgkin's lymphoma (NHL), small lymphocytic (SL) NHL, intermediate grade/follicular NHL, intermediate grade diffuse NHL, high grade immunoblastic NHL, high grade lymphoblastic NHL, high grade small non-cleaved cell NHL, bulky disease NHL, mantle cell lymphoma, AIDS-related lymphoma, and Waldenstrom's Macroglobulinemia), chronic lymphocytic leukemia (CLL), acute lymphoblastic leukemia (ALL), hairy cell leukemia, chronic myeloblastic leukemia, and post-transplant lymphoproliferative disorder (PTLD). In some embodiments, non-limiting cancers further include abnormal vascular proliferation associated with phakomatoses, edema (such as that associated with brain tumors), and/or Meigs' syndrome.

As would be well understood by one of ordinary skill, the term "cancer" for use with methods and systems of the present disclosure is not limited only to primary forms of cancer, but also involves cancer subtypes. Some such cancer subtypes are listed above but also include breast cancer subtypes such as Luminal A (hormone receptor (HR)+/human epidermal growth factor receptor (HER2)−); Luminal B (HR+/HER2+); Triple-negative or (HR−/HER2−) and HER2 positive. Other cancer subtypes include the various lung cancers listed above and prostate cancer subtypes involving changes in E26 transformation specific genes (ETS; specifically ERG, ETV1/4, and FLI1 genes) and subsets defined by mutations in FOXA1, SPOP, and IDH1 genes.

In some embodiments, the first health entity is selected from the group consisting of information about clinical trials for which the subject is eligible, therapies that are specific to the subject's disease or disorder, and/or possible therapeutic adverse effects associated with the specific characteristics of the subject's disease or disorder, e.g., the patient's genetic variations, epigenetic abnormalities, associated oncogenic pathogenic infections, and/or pathology abnormalities, or other characteristics of the subject's sample and/or clinical records.

In some embodiments, the first health entity is selected from the group consisting of subject information and analysis metrics, including diagnosis, subject demographic and/or institution, matched therapies (e.g., FDA approved and/or investigational), matched clinical trials, specimen information, details on reported variants, subject clinical history, and/or test results.

In some embodiments, the first health entity is a selection criterion for enrollment in a clinical trial.

In some embodiments, the first health entity is a particular type, species, and/or subclass of health entity in a corresponding class of health entities. For example, in some embodiments, the first health entity is a first medication (e.g., Tagrisso) in a plurality of medications (e.g., Tagrisso, Enhertu, and Lynparza). In some embodiments, the first health entity is a first disease condition (e.g., lung cancer) in a plurality of diseases conditions (e.g., lung cancer, bladder cancer, and kidney cancer).

In some embodiments, each respective health entity in a plurality of health entities is of the same class (e.g., a first medication in a plurality of medications). In some embodiments, at least a first health entity in a plurality of health entities is of a different class from at least a second health entity in the plurality of health entities (e.g., one or more medications and one or more biomarkers).

In some embodiments, the plurality of health entities includes at least 3, at least 4, at least 5, at least 10, at least 20, at least 30, at least 50, at least 80, at least 100, at least 200, at least 500, at least 1000, or at least 2000 health entities. In some embodiments, the plurality of health entities includes no more than 5000, no more than 2000, no more than 1000, no more than 500, no more than 100, no more than 50, no more than 20, no more than 10, or no more than 5 health entities. In some embodiments, the plurality of health entities consists of from 3 to 10, from 5 to 30, from 10 to 100, from 40 to 500, from 300 to 2000, or from 1000 to 5000 health entities. In some embodiments, the plurality of health entities falls within another range starting no lower than 3 health entities and ending no higher than 5000 health entities.

In some embodiments, the first subject is obtained from a plurality of subjects.

In some embodiments, the plurality of subjects includes at least 2, at least 4, at least 5, at least 10, at least 20, at least 30, at least 50, at least 80, at least 100, at least 200, at least 500, at least 1000, or at least 2000 subjects. In some embodiments, the plurality of subjects includes no more than 5000, no more than 2000, no more than 1000, no more than 500, no more than 100, no more than 50, no more than 20, no more than 10, or no more than 5 subjects. In some embodiments, the plurality of subjects consists of from 2 to 10, from 5 to 30, from 10 to 100, from 40 to 500, from 300 to 2000, or from 1000 to 5000 subjects. In some embodiments, the plurality of subjects falls within another range starting no lower than 2 subjects and ending no higher than 5000 subjects.

Preprocessing Electronic Health Records

Referring to Block 304, the method 300 includes receiving, for the first subject 122, a first electronic health record 124 comprising a plurality of sections 134, where each respective section 134 in the plurality of sections is delineated by a corresponding section header.

In some embodiments, the electronic health record (EHR) is obtained from an image of a health record, such as a scanned image of a physical (e.g., paper and/or handwritten) health record document. In some embodiments, the EHR is obtained in an image file format, such as a PDF. In some such embodiments, the method includes analyzing the EHR, using a text recognition process, to convert the image to computer readable text. For instance, in some embodiments, the method includes, prior to the receiving the first electronic health record, receiving one or more images of text corresponding to the first electronic health record and converting the one or more images of text to a computer-readable text format using text recognition. In some embodiments, the text recognition is optical character recognition (OCR). In some embodiments, the OCR converts the image to raw text.

Methods for text recognition are well known in the art, including but not limited to sliding window classification, Connected Component Analysis (CCA), bounding box regression-based methods, segmentation-based methods, and/or combinations thereof. For example, sliding window classification utilizes convolutional classifiers to detect characters in an image using a multi-scale sliding window. CCA-based methods operate by segmenting pixels in an image having consistent local characteristics such as color, edge, texture, and/or stroke width into characters. Alternatively or additionally, text-line based methods operate by initially identifying lines of text and partitioning the identified text lines into smaller components such as words and letters. Generally, bounding box and segmentation-based methods operate by detecting text at the single-word level, for instance, using bounding boxes that isolate regions of text from the local background, with optional filtering, cleaning, and recognition post-processing. See, for example, Keerthana et al., 2020, "Text Detection and Recognition: A Review," IRJET Vol 7(8), 2156-2169, which is hereby incorporated herein by reference in its entirety.

Referring to Block 306, the method includes detecting, for each respective section 134 in the plurality of sections, the corresponding section header, thereby splitting the first electronic health record into the plurality of sections.

In some embodiments, the detecting the corresponding section header is performed by identifying one or more header-body pairs in the document structure of the EHR. In some such embodiments, each corresponding body of text in a respective header-body pair is determined to be the section, and each corresponding header in the respective header-body pair is determined to be the section header.

In some embodiments, the plurality of sections comprises at least 2, at least 3, at least 4, at least 5, at least 6, at least 7, at least 8, at least 9, at least 10, at least 20, or at least 30 sections. In some embodiments, the plurality of sections comprises no more than 50, no more than 30, no more than 10, no more than 5, or no more than 3 sections. In some embodiments, the plurality of sections consists of from 2 to 8, from 3 to 10, from 5 to 20, from 10 to 40, or from 20 to 50 sections. In some embodiments, the plurality of sections falls within another range starting no lower than 2 sections and ending no higher than 50 sections.

In some embodiments, the method includes assigning a corresponding label to one or more sections in the plurality of sections, based on a natural language context of the respective section header for each respective section in the one or more sections. In some embodiments, the natural language context is a presence or absence of one or more signal terms that indicates a status (e.g., positive, negative, or null) for a respective relationship (e.g., taken, prescribed, and/or refused) between the first subject and the first health entity.

For example, referring to Block 308, in some embodiments, the method further includes, for a respective section header in the one or more section headers, assigning a corresponding label that indicates an association between the respective section header and the first health entity, based on a presence or absence of one or more signal terms in the corresponding section of the first electronic health record, where the one or more signal terms are selected from a corresponding set of signal terms for a respective relationship status in a plurality of relationship statuses. Signal terms suitable for use in the present disclosure are further disclosed elsewhere herein (see, for example, the section entitled "Obtaining and/or assigning labels" and "Active learning loop," below).

Advantageously, as described below, the splitting of the first electronic health record into a plurality of sections allows for a more robust determination of the relationship between the first subject and the first health entity, by providing additional context to one or more text spans obtained from a respective section. For example, in some embodiments, the assignment of a corresponding label to a respective section header (and thus to the corresponding section), allows the corresponding label for the respective section to be taken into account when determining a relationship between the first subject and the first health entity in a respective text span obtained from the respective section. As an illustrative example, consider the example text span "patient is on Tagrisso" that is obtained from an example section having the corresponding section header "List of Current Medications." In some such embodiments, the section and any text spans obtained by subdividing the section are contextualized by the corresponding section header, such that the assignment of relationship statuses to the text spans is further weighted by the relationship status indicated by the section header. In contrast, in some embodiments, sections that are likely to be less relevant to determining the relationship between the first subject and the first health entity are more easily identified, and thus more easily removed from preprocessing, input, and/or analysis, by the presence of corresponding section headers having irrelevant or disqualifying terms, such as "List of Refused Medications." See, for example, the section entitled "Predictions," below.

Referring to Block 310, the method further includes obtaining a plurality of text spans 136 for the first electronic health record 124 by subdividing each respective section 134, in the plurality of sections, into a corresponding one or more text spans.

In some implementations, a text span includes any length of text that is all or a portion of an EHR. For instance, in some embodiments, a text span is a document, an attachment of a document, a page, a section, a paragraph, a sentence, a portion of a sentence, a line of text, and/or a sequence of words (e.g., of predetermined length). For example, in some embodiments, a text span is a predetermined number of words (e.g., 3, 4, 5, 6, 7, or more words). In some embodiments, each respective text span in the plurality of text spans consists of a contiguous sequence of words from the first EHR. In some embodiments, one or more text spans in the plurality of text spans includes a noncontiguous sequence of words from the first EHR.

In some embodiments, the plurality of text spans includes at least 3, at least 5, at least 10, at least 20, at least 50, at least 100, at least 200, at least 500, at least 1000, at least 2000, at least 5000, at least 10,000, at least 20,000, or at least 50,000 text spans. In some embodiments, the plurality of text spans includes no more than 100,000, no more than 50,000, no more than 10,000, no more than 5000, no more than 1000, no more than 500, no more than 100, no more than 50, or no more than 20 text spans. In some embodiments, the plurality of text spans consists of from 3 to 30, from 20 to 200, from 100 to 1000, from 800 to 5000, from 3000 to 20,000, or from 10,000 to 100,000 text spans. In some embodiments, the plurality of text spans falls within another range starting no lower than 3 text spans and ending no higher than 100,000 text spans.

In some embodiments, the subdividing is performed by identifying one or more regular expressions in a corresponding section. Generally, regular expressions refer to a sequence of characters that specifies a search pattern in text. For instance, in an example embodiment, the subdividing subdivides a respective section into a plurality of sentences using language pattern recognition to search for the ends of sentences, as specified by a corresponding regular expression.

In some embodiments, the method does not include splitting the first EHR into the plurality of sections. In some embodiments, regular expression filtering is used to split the first EHR (e.g., raw text) into a plurality of text spans.

For example, in some embodiments, regular expression filtering is used to split the first EHR into a plurality of sentences. An example of regular expression syntax that can be used to split raw text into sentences is "r'\s{2}(?<!\w\.\w.)(?<! [A-Z][a-z]\.)(?<=\./\?)\s'." In some embodiments, regular expression filtering is used to subdivide each respective section, in the plurality of sections, into a corresponding plurality of text spans on either side of one or more punctuation marks. For instance, in some implementations, text spans are obtained by subdividing a string of text (e.g., a section) at a period, a question mark, an exclamation point, a comma, a colon, a semicolon, a dash, a hyphen, a bracket, a parenthesis, an apostrophe, a quotation mark, and/or an ellipsis. In some embodiments, particular punctuation marks are excluded from being identified as text span (e.g., sentence) boundaries. For example, in some implementations, the period at the end of the abbreviation 'Dr.' for doctor is excluded (e.g., "dr. XX"). Examples of regular expression syntax useful for excluding identification of particular punctuation as text span (e.g., sentence) boundaries are found, for example, in Section 3.2.2. of Rokach L. et al., Information Retrieval Journal, 11(6):499-538 (2008), the content of which is incorporated herein by reference, in its entirety, for all purposes.

In some embodiments, a machine learning model is used to split raw text into text spans. As described in Haris et al., Journal of Information Technology and Computer Science, 5(3):279-92, incorporated herein by reference in its entirety for all purposes, known NLP libraries, including Google SyntaxNet, Stanford CoreNLP, NLTK Phyton library, and spaCy implement various methods for splitting text documents into text spans.

Referring to Block 312, the method further includes filtering the plurality of text spans 136 by language pattern recognition to identify a set of text spans in the plurality of text spans, where each respective text span 136 in the set of text spans comprises a respective expression related to the first health entity.

In some embodiments, the set of text spans includes at least 3, at least 5, at least 10, at least 20, at least 50, at least 100, at least 200, at least 500, at least 1000, at least 2000, at least 5000, or at least 10,000 text spans. In some embodiments, the set of text spans includes no more than 50,000, no more than 10,000, no more than 5000, no more than 1000, no more than 500, no more than 100, no more than 50, or no more than 20 text spans. In some embodiments, the set of text spans consists of from 3 to 30, from 20 to 200, from 100 to 1000, from 800 to 5000, from 3000 to 20,000, or from 10,000 to 50,000 text spans. In some embodiments, the set of text spans falls within another range starting no lower than 3 text spans and ending no higher than 50,000 text spans.

In some embodiments, an expression related to a health entity is one or more words, medical codes, or phrases that were manually curated to be defined as such expressions. For example, in some implementations, where the health entity is a medication, a curated list of expressions includes one or more of a brand name of the medication, a generic name of the medication, a drug class in which the medication falls with, a medical code associated with prescription of the medication, a diagnosis for which the medication is commonly prescribed for, etc. As another example, in some embodiments, where the health entity is a biomarker, a curated list of expressions includes but is not limited to a gene name, an identifier or code associated with the biomarker, a variant type, a genomic position or locus of the biomarker, etc. In some implementations, where the health entity is a medical condition (e.g., a disease condition), a curated list of expressions includes but is not limited to a name of the medical condition, a cell, tissue, or organ type associated with the medical condition, a diagnosis of the medical condition, a symptom of the medical condition, a precondition or comorbidity associated with the medical condition, a medical code associated or identifying the medical condition, etc. As another example, in some embodiments, where the health entity is a clinical characteristic (e.g., a clinical trial criteria), a curated list of expressions includes, but is not limited to, a word, phrase, or portion thereof for a name of the clinical characteristic, a word, phrase, or portion thereof for a description of the clinical characteristic, a clinical code associated with or identifying the clinical characteristic, a subject demographic, a name or code associated with a clinical trial, a name or code associated with a specimen, a name or code associated with a clinical history, etc.

In some embodiments, an expression related to a health entity is one or more words, medical codes, or phrases that were, at least partially, automatically curated, e.g., using an electronic medical glossary, medical dictionary, or the like. In some embodiments, expressions related to a health entity are identified using natural language processing, e.g., by training a machine learning model to identify electronic health records for patients affected by a health entity based on structured and/or unstructured clinical data and then performing post hoc model interpretability analysis to determine words and/or phrases providing predictive power to the model, e.g., using a technique such as Local Interpretable Model-Agnostic Explanations (LIME), SHapley Additive exPlanations (SHAP), or the like. Similarly, NLP can be used to identify words and/or phrases that are significantly more prevalent in EHRs of patients affected by the health entity than in EHRs of patients that are not affected by the health entity.

In some embodiments, where an expression related to a health entity is defined as one or more curated list of words, medical codes, and/or phrases, identification of an expression is performed using a string matching algorithm. Generally, a string matching algorithm (e.g., a string-search algorithm), performs a function in which one or more sub-strings are identified within a larger string. The function further identifies the position at which the sub-string is located within the larger string. A string includes, but is not limited to, a sequence of text (e.g., an EHR, a section, a text span, or a portion thereof). String-matching is further described in Bulus et al., 2017, "Comparison of String Matching Algorithms in Web Documents," UniTech 2017, which is hereby incorporated herein by reference in its entirety. In some embodiments, the string matching algorithm includes a naïve string search, a finite-state-automaton-based search, a Rabin-Karp algorithm, a Knuth-Morris-Pratt algorithm, a Boyer-Moore string-search algorithm, a two-way string-matching algorithm, or a backward non-deterministic directed acyclic word graph matching algorithm using a computer system comprising a processor coupled to a non-transitory memory. In some embodiments, the string matching is exact string matching. That is, in some embodiments, the algorithm must find an exact match of a predefined string from the curated list of words, medical codes, and/or phrases in the text string from the EHR in order to identify an expression related to the health entity. In some embodiments, fuzzy matching logic is used in order to allow for some mismatch between an expression in the EHR and an expression in the curated list of words, medical codes, and/or phrases, e.g., by applying a threshold value for a string distance between the expression in the EHR and the expression in the curated list. Methods for determining string distance, such as Levenshtein distance, Hamming distance, Jaro-Winkler distance, and the like, are known in the art. In some embodiments, wild cards are used to account for different forms and/or conjugations of a word when matching to a curated list, e.g., where the curated list includes one or more Regular Expressions (RegEx). In some embodiments, the threshold value for the string distance is from 0 (e.g., exact match) to 1 (e.g., most permissive). For example, in some embodiments, the threshold value for the string distance is at least 0.1, at least 0.2, at least 0.3, at least 0.4, at least 0.5, at least 0.6, at least 0.7, or at least 0.8. In some embodiments, the threshold value for the string distance is no more than 0.99, no more than 0.95, no more than 0.9, no more than 0.8, no more than 0.7, no more than 0.6, no more than 0.5, no more than 0.4, no more than 0.3, or no more than 0.2. In some embodiments, the threshold value for the string distance is from 0.1 to 0.6, from 0.1 to 0.4, from 0.2 to 0.8, from 0.4 to 0.95, or from 0.3 to 0.7. In some embodiments, the threshold value for the string distance falls within another range from 0 to 1.

In some embodiments, an expression related to a health entity is represented by one or more latent variables learned by a model. For example, in some embodiments, a natural language processing model is trained to distinguish between EHRs from patients affected by a health entity and EHRs from patients not affected by the health entity. Then, rather than trying to match expressions in a text span to expressions in a curated list of words, medical codes, and/or phrases, the text spans are scored using the model to provide an indication (e.g., a probability, likelihood, score, classification, etc.) of whether the text span contains an expression related to the health entity.

In some embodiments, a respective expression related to the first health entity refers to an instance that the first health entity appears in the respective text span. Thus, in some embodiments, the method includes (i) searching, in each respective text span in the plurality of text spans, for at least a first instance (e.g., a mention) of the first health entity in the respective text span and (ii) filtering the plurality of text spans to remove text spans that do not include an instance (e.g., a mention) of the first health entity. In some such embodiments, each respective text span in the filtered set of text spans includes at least one mention of the first health entity.

In some embodiments, each respective text span in the set of text spans is a sentence or a portion of a sentence. In some embodiments, a respective text span in the set of text spans includes a predetermined number of words on either side of a corresponding expression related to the first health entity (e.g., 3 words on either side of a mention of the first health entity). In some embodiments, a respective text span in the set of text spans includes no more than one expression related to the first health entity (e.g., no more than one mention of the first health entity, for instance, "patient was prescribed Tagrisso"). In some embodiments, a respective text span in the set of text spans includes a plurality of expressions related to the first health entity (e.g., at least two mentions of the first health entity, for instance, "patient was prescribed Tagrisso and is currently taking Tagrisso"). In some embodiments, a respective text span in the set of text spans includes at least a first expression related to the first health entity and a second expression related to a second health entity (e.g., "patient was prescribed Tagrisso and is currently taking Enhertu"). In some embodiments, a respective text span in the set of text spans contains a plurality of expressions related to a corresponding plurality of health entities.

In some embodiments, the method includes splitting each respective text span that includes a plurality of expressions related to the first health entity such that each respective text span in the set of text spans contains no more than one expression related to the first health entity. In particular, in some embodiments, the method further includes searching the set of text spans for respective text spans comprising more than one respective expression related to the first health entity, and, for each respective text span in the set of text spans that includes more than one respective expression related to the first health entity, subdividing the respective text span into a corresponding plurality of subdivisions, where each respective subdivision in the corresponding plurality of subdivisions comprises exactly one respective expression in the more than one respective expression related to the first health entity. In some such embodiments, the evaluating comprises, for each respective text span in the set of text spans that comprises more than one respective expression related to the first health entity, separately evaluating the corresponding natural language context in each respective subdivision in the plurality of subdivisions.

As an illustrative example, in some such embodiments, the method includes splitting the text span "patient was prescribed Tagrisso and is currently taking Tagrisso" into two corresponding text spans "patient was prescribed Tagrisso," and "currently taking Tagrisso." In some embodiments, the method includes splitting each respective text span that includes a plurality of expressions related to a corresponding plurality of health entities such that each respective text span in the set of text spans contains no more than one expression related to any health entity in the corresponding plurality of health entities. As another illustrative example, in some such embodiments, the method includes splitting the text span "patient was prescribed Tagrisso and is currently taking Enhertu" into two corresponding text spans "patient was prescribed Tagrisso" and "currently taking Enhertu." As still another illustrative example, in some embodiments, the method includes splitting the text span "patient took Tagrisso, but patient did not take Enhertu" into two corresponding text spans "patient took Tagrisso" and "but patient did not take Enhertu."

In some embodiments, the obtaining the plurality of text spans includes, for each respective section in the plurality of sections, subdividing the respective section by language pattern recognition into a corresponding one or more sentences. In some such embodiments, the method further includes filtering the plurality of sentences by language pattern recognition. The filtering includes, for each respective sentence in the plurality of sentences, when the respective sentence comprises a respective expression related to the first health entity, retaining the respective sentence in the plurality of sentences, and when the respective sentence does not comprise a respective expression related to the first health entity, removing the respective sentence from the plurality of sentences.

In some embodiments, the filtering further includes searching the plurality of sentences for one or more sentences that comprise a corresponding plurality of expressions related to the first health entity. In some embodiments, the filtering further includes, for each respective sentence in the plurality of sentences that comprises a corresponding plurality of expressions related to the first health entity, subdividing the respective sentence about each respective expression in the plurality of expressions, thereby obtaining a corresponding plurality of subdivisions, where each respective subdivision in the corresponding plurality of subdivisions contains no more than one expression related to the first health entity.

In some embodiments, the method does not include splitting each respective text span that includes a plurality of expressions related to one or more health entities such that each respective text span in the set of text spans contains no more than one expression related to any health entity in the one or more health entities.

In some embodiments, the filtering further includes, for a first text span in the set of text spans, searching the set of text spans for a corresponding second text span comprising an overlapping portion that overlaps the first text span, where the overlapping portion is (i) at least a first threshold proportion of the first text span and (ii) at least a second threshold proportion of the second text span. In some such embodiments, the first text span and the second text span are conjoined at the overlapping portion. In other words, in some embodiments, the method includes removing redundant text spans from the set of text spans by identifying text spans having large overlapping regions and concatenating them together. In some embodiments, the first threshold proportion is at least 30%, at least 40%, at least 50%, at least 60%, at least 70%, at least 80%, or at least 90%. In some embodiments, the first threshold proportion is no more than 99%, no more than 95%, no more than 90%, no more than 80%, no more than 70%, no more than 60%, no more than 50%, or no more than 40%. In some embodiments, the first threshold proportion is from 30% to 70%, from 40% to 80%, from 50% to 90%, from 45% to 65%, from 70% to 99%, or from 80% to 95%. In some embodiments, the first threshold proportion falls within another range starting no lower than 30% and ending no higher than 100%. In some embodiments, the second threshold proportion is at least 30%, at least 40%, at least 50%, at least 60%, at least 70%, at least 80%, or at least 90%. In some embodiments, the second threshold proportion is no more than 99%, no more than 95%, no more than 90%, no more than 80%, no more than 70%, no more than 60%, no more than 50%, or no more than 40%. In some embodiments, the second threshold proportion is from 30% to 70%, from 40% to 80%, from 50% to 90%, from 45% to 65%, from 70% to 99%, or from 80% to 95%. In some embodiments, the second threshold proportion falls within another range starting no lower than 30% and ending no higher than 100%.

Referring to Block 316, in some embodiments, the method further includes, for a respective text span in the set of text spans, assigning a corresponding label that indicates an association between the respective text span and the first health entity, based on a presence or absence of one or more signal terms in the respective text span, where the one or more signal terms are selected from a corresponding set of signal terms for a respective relationship status in a plurality of relationship statuses.

In other words, in some embodiments, the method includes assigning a corresponding label to one or more text spans in the set of text spans, based on a natural language context of each respective text span in the one or more text spans. In some embodiments, the natural language context is a presence or absence of one or more signal terms that indicates a status (e.g., positive, negative, or null) for a respective relationship (e.g., taken, prescribed, and/or refused) between the first subject and the first health entity. Signal terms suitable for use in the present disclosure are further disclosed elsewhere herein (see, for example, the section entitled "Obtaining and/or assigning labels" and "Active learning loop," below).

In some embodiments, each respective text span in the set of text spans further comprises one or more identifiers. In some embodiments, a respective identifier in the one or more identifiers is selected from the group consisting of health entity codes, ontological identifiers, health entity names, and subject identifiers. In some embodiments, the one or more identifiers are used to search, sort, filter, and/or rank the set of text spans and/or any associated parameters, outputs, or predictions thereof, as will be described in further detail below.

Scoring Representations

Referring to Block 318, the method further includes, for each respective text span 136 in the set of text spans, evaluating the corresponding natural language context of the respective expression related to the first health entity, thereby obtaining a respective scoring representation 142 of the corresponding natural language context of the respective expression.

In some embodiments, for each respective text span in the set of text spans, the respective scoring representation comprises one or more N-gram counts. N-gram counts and methods of obtaining the same will now be described.

In some embodiments, referring to Block 320, for each respective text span in the set of text spans, the evaluating the corresponding natural language context of the respective expression related to the first health entity further comprises, for each respective N-gram in a plurality of N-grams, determining a corresponding count of occurrences that the respective N-gram occurs in the respective text span.

In some embodiments, each respective N-gram in the plurality of N-grams consists of a contiguous sequence of N words. In some embodiments, N is a positive integer from 2 to 10 or from 1 to 20. For instance, for N of 2, each respective N-gram in the plurality of N-grams consists of a contiguous sequence of 2 words.

In some embodiments, each respective N-gram in the plurality of N-grams consists of a contiguous sequence of n words, where n is a positive integer between K and N, and where K is a positive integer less than N. In some embodiments, K is a positive integer from 1 to 6 and N is a positive integer greater than K from 2 to 10. In some embodiments, K is a positive integer from 1 to 10 and N is a positive integer greater than K from 2 to 20. For instance, in an illustrative embodiment, each respective N-gram in the plurality of N-grams is selected from a range of [1, 3], such that each respective N-gram in the plurality of N-grams consists of a contiguous sequence of n words, for each positive integer n from 1 to 3. Thus, each respective N-gram in the plurality of N-grams has a length of 1, 2, or 3 contiguous words (e.g., "prescribed," "was prescribed," and "patient was prescribed").

In some embodiments, the plurality of N-grams is curated or uncurated. Suitable embodiments for curation of N-grams is described in further detail elsewhere herein (see, for example, the section entitled "Active learning loop," below). In some embodiments, no respective N-gram in the plurality of N-grams comprises a respective expression related to the first health entity. In other words, in some such embodiments, a respective N-gram in the plurality of N-grams excludes any mention of a respective health entity, such that "was prescribed" is acceptable while "was prescribed Tagrisso" is not.

In some embodiments, the plurality of N-grams includes at least 100, at least 1000, or at least 10,000 N-grams. In some embodiments, the plurality of N-grams includes at least 10, at least 50, at least 100, at least 500, at least 1000, at least 5000, at least 10,000, at least 100,000, at least 500,000, or at least 1,000,000 N-grams. In some embodiments, the plurality of N-grams includes no more than 5,000,000, no more than 1,000,000, no more than 500,000, no more than 100,000, no more than 50,000, no more than 10,000, no more than 1000, no more than 500, or no more than 100 N-grams. In some embodiments, the plurality of N-grams consists of from 10 to 200, from 100 to 800, from 500 to 2000, from 1000 to 10,000, from 8000 to 50,000, from 40,000 to 100,000, from 80,000 to 500,000, from 200,000 to 800,000, from 500,000 to 1,000,000, or from 1,000,000 to 5,000,000 N-grams. In some embodiments, the plurality of N-grams falls within another range starting no lower than 10 N-grams and ending no higher than 5,000,000 N-grams.

In some embodiments, the determining a corresponding count of occurrences that the respective N-gram occurs in the respective text span further includes generating, from the plurality of N-grams, a hierarchical graph structure comprising a plurality of nodes and a plurality of edges that collectively represents the plurality of N-grams. For each respective N-gram in the plurality of N-grams, the hierarchical graph structure comprises a corresponding set of nodes in the plurality of nodes and a corresponding set of edges in the plurality of edges that represents the respective N-gram, each respective word in a contiguous sequence of words in the respective N-gram is represented by a corresponding node in the plurality of nodes, each respective pair of sequential words in the contiguous sequence of words is represented by a respective parent node and a respective child node in a corresponding pair of sequential nodes in the plurality of nodes, and each respective pair of sequential nodes in the plurality of nodes is interlinked by a corresponding edge in the plurality of edges that represents a co-occurrence of the respective parent node and the respective child node in the respective N-gram. The determining further includes, for each respective text span in the set of text spans, for each respective N-gram in the plurality of N-grams, recursively searching the respective text span for each respective node in the corresponding set of nodes for the respective N-gram, using the hierarchical graph structure. When the respective N-gram is determined to be present in the respective text span, an instance of the respective N-gram is added to the corresponding count of occurrences that the respective N-gram occurs in the respective text span.

For instance, in some embodiments, N-gram counts are determined using a hierarchical N-gram tree that recursively processes each respective text span in the set of text spans and stores the counts and locations of the N-grams.

Figure 4:
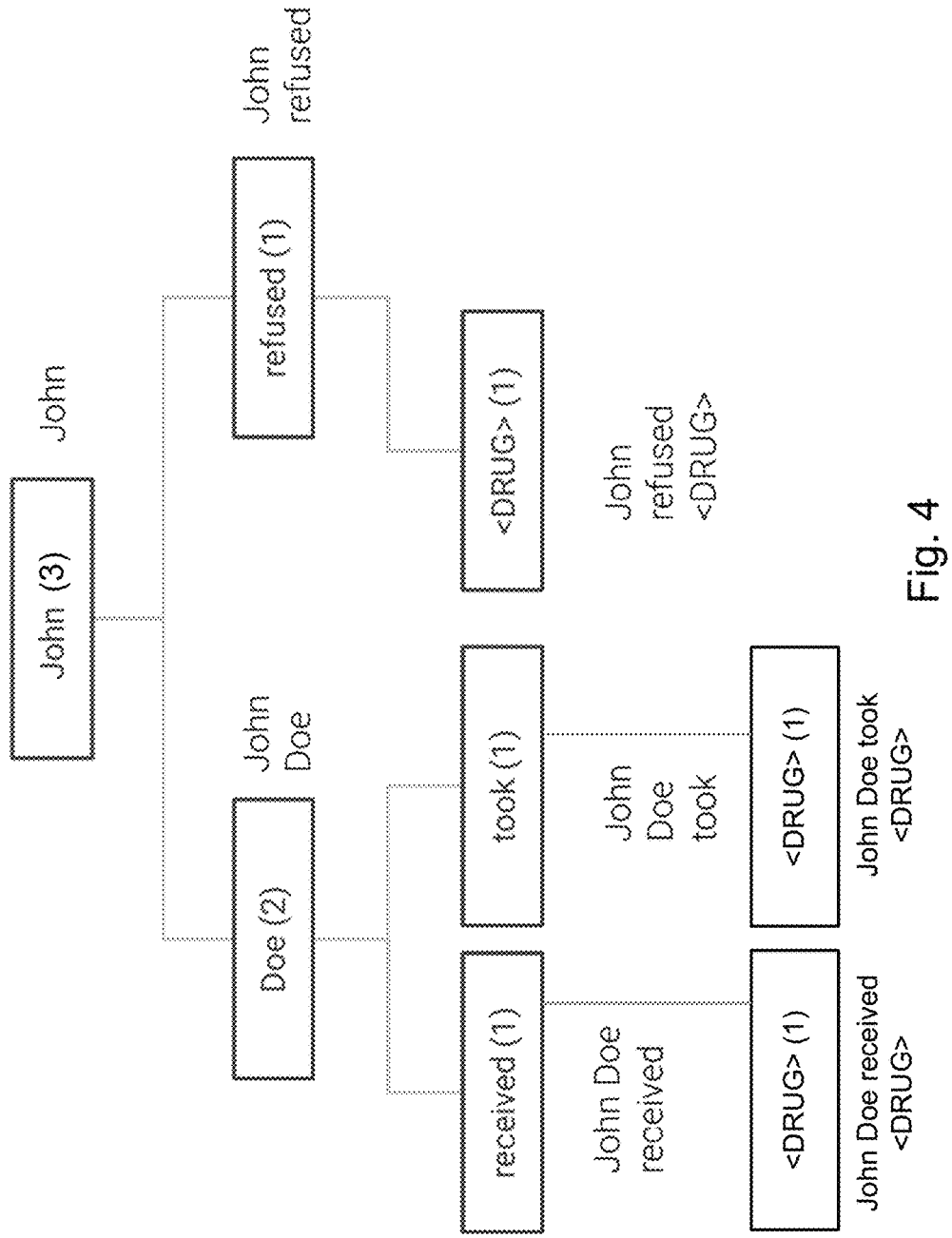
FIG. 4 illustrates an example schematic for determining N-gram counts for use in determining a relationship between a first subject and a first health entity, in accordance with some embodiments of the present disclosure.

Consider the example schematic of a hierarchical N-gram tree depicted in FIG. 4. The N-gram tree is populated such that each token (e.g., word) of each respective N-gram is represented as a node. Thus, each word in the N-gram "John Doe received Imfinzi" is represented as a node in the N-gram tree (e.g., "John," "Doe," "received," "<DRUG>"). N-gram searching and counting utilizes the tree structure to recursively process each text span by querying from parent nodes to child nodes, such that the text span is searched for "John," followed by "John Doe," "John Doe received," and "John Doe received <DRUG>." As discussed above, the recursive searching process is computationally more efficient as it reduces the need to linearly search the full length of each text span for each individual N-gram as a separate entity. The N-gram counts are tallied for each respective text span. Thus, for the example text span depicted in FIG. 4, 3 instances of "John," 2 instances of "John Doe," 1 instance of "John Doe received," and 1 instance of "John Doe received <DRUG>" are tallied.

In some embodiments, the method further includes, prior to the evaluating the corresponding natural language context of the respective expression related to the first health entity, applying a plurality of masking terms to each respective text span in the set of text spans, thereby removing, from the respective text span, each respective masking term in the plurality of masking terms that is present in the respective text span.

In some embodiments, the method includes applying the plurality of masking terms to each respective text span in the set of text spans to remove irrelevant and/or interfering terms from the respective N-gram that can interfere with N-gram ingestion. For instance, in an example text span that includes the phrase "patient was prescribed Tuesday with Tagrisso," the presence of the term "Tuesday" interferes with the ingestion of the signal-bearing N-gram "patient was prescribed with." As such, the N-gram "patient was prescribed with" will not be included counted in the set of N-gram counts for the respective text span. Masking terms suitable for use in the present disclosure are further disclosed elsewhere herein (see, for example, the sections entitled "Obtaining and/or assigning labels" and "Active learning loop," below).

Alternative methods for obtaining scoring representations are contemplated for use in the present disclosure, as will be apparent to one skilled in the art. Example alternative methods include, but are not limited to, embedding clustering, targeted masked language modeling, and/or label training with different model architectures, as described below. In some implementations, the alternative approaches disclosed below further apply to training a model, as described in more detail in the section entitled "Model training," below.

For example, in some embodiments, for each respective text span in the set of text spans, the obtaining the respective scoring representation of the corresponding natural language context of the respective expression comprises clustering the set of text spans using a clustering algorithm, thus obtaining a plurality of clusters of text spans. For each respective cluster in the plurality of clusters, a corresponding cluster score is determined that reflects a signal purity of the respective cluster relative to every other cluster in the plurality of clusters. A subset of clusters is selected from the plurality of clusters, each respective cluster in the subset of clusters having a corresponding cluster score that exceeds a threshold purity score. In some embodiments a corresponding cluster score exceeds a threshold purity score when the corresponding cluster score is greater than a certain percentage of all the cluster scores computed for the plurality of clusters. For instance, in some embodiments the corresponding cluster score exceeds a threshold purity score when the corresponding cluster score is greater than thirty, forty, fifty, sixty, seventy, eighty or ninety percent of the cluster scores computed for the plurality of clusters. In some embodiments a corresponding cluster score exceeds a threshold purity score when the corresponding cluster score is greater than a threshold scalar value between 0 and 1. For instance, in some embodiments the corresponding cluster score exceeds a threshold purity score when the corresponding cluster score is greater 0.3, 0.4, 0.5, 0.6, 0.7, 0.8, or 0.9. In some embodiments a corresponding cluster score exceeds a threshold purity score when the corresponding cluster score is within the top N cluster scores computed across the plurality of clusters. For instance, in some embodiments the corresponding cluster score exceeds a threshold purity score when the corresponding cluster score is in the top 30, 50, 50, 50, 70, 80, or 90 cluster scores computed for the plurality of clusters. For each respective cluster in the subset of clusters, for each respective text span in the respective cluster, a corresponding label is assigned to the respective text span that indicates an association between the respective text span and the first health entity. In some embodiments, the respective text span is further used to train a model.

Any one of a number of clustering techniques can be used, examples of which include, but are not limited to, hierarchical clustering, k-means clustering, and density based clustering. In some embodiments, the clustering algorithm is density-based spatial clustering of applications with noise (DBSCAN). In some embodiments, a hierarchical density based clustering algorithm is used (referred to as HDB-SCAN, see, e.g., Campello et al., 2015, "Hierarchical density estimates for data clustering, visualization, and outlier detection," *ACM Trans Knowl Disc Data*, 10(1), 5). In another embodiment, a community detection based cluster algorithm is used, such as Louvain clustering (see, e.g., Blondel et al., 2008, "Fast unfolding of communities in large networks," *J stat mech: theor exp*, 2008(10), P10008). In yet another embodiment, Leiden clustering is used. See, e.g., Traag et al., (2019), "From Louvain to Leiden: guaranteeing well-connected communities," *Sci Rep* 9:5233, doi: 10.1038/s41598-019-41695-z. In still another embodiment, a diffusion path algorithm is used. In some embodiments, the clustering algorithm comprises a pre-trained language model and/or an embedding model. In some embodiments, the clustering algorithm further comprises applying a dimensionality reduction technique to the set of text spans. In some implementations, each respective text span in the set of text spans is represented as a vector, such as a dense representation.

In some embodiments, for each respective text span in the set of text spans, the obtaining the respective scoring representation of the corresponding natural language context of the respective expression comprises using a language model to evaluate, for each respective text span in the set of text spans, the natural language context of the respective text span, thereby obtaining a corresponding evaluation metric. Thus, in some embodiments, for each respective text span in the set of text spans, the respective scoring representation comprises the corresponding evaluation metric.

In some implementations, the language model is a pre-trained language model. In some implementations, the language model is a masked language modeling (MLM) model. In some implementations, the language model is BERT. See, for example, Devlin et al., 2018, "BERT: Pre-training of Deep Bidirectional Transformers for Language Understanding," arXiv:1810.04805v2). In some embodiments, the corresponding evaluation metric is a perplexity metric. Generally, perplexity refers to a measure of how well a language model predicts a sample, such as a text span in the set of text spans that is indicative of a relationship between the first subject and the first health entity. For instance, in some embodiments, perplexity is determined as the inverse probability of the test set (e.g., the set of text spans obtained from the first electronic health record), normalized by the number of words. A lower perplexity indicates a higher probability, such that the model is better able to predict text spans that include a relationship between the first subject and the first health entity. Viewed another way, a low perplexity that is assigned to a respective text span in the set of text spans indicates that the respective text span would be predicted with high probability by the model. In some embodiments, for each respective text span in the set of text spans, the respective scoring representation is a perplexity metric, and the method further includes filtering the set of text spans to remove each respective text span that fails to satisfy an evaluation threshold (e.g., removing text spans with high perplexity scores). For example, in some embodiments, the respective scoring representation is a perplexity metric, and the evaluation threshold is no more than 200, no more than 100, no more than 90, no more than 80, no more than 70, no more than 60, no more than 50, no more than 40, no more than 30, no more than 20, no more than 10, no more than 5, no more than 3, or no more than 2, or less. In some embodiments, the respective scoring representation is a perplexity metric, and the evaluation threshold is at least 1, at least 2, at least 5, at least 10, at least 20, at least 50, or at least 100. In some embodiments, the respective scoring representation is a perplexity metric, and the evaluation threshold is from 1 to 5, from 2 to 10, from 1 to 3, from 2 to 50, from 5 to 100, or from 80 to 200. In some embodiments, the evaluation threshold falls within another range starting no lower than 1 and ending no higher than 200.

Other evaluation metrics are contemplated for use in the present disclosure, as will be apparent to one skilled in the art. For instance, example evaluation metrics suitable for use include, but are not limited to, perplexity, bits-per-character, bits-per-word, entropy, and/or cross-entropy. See, for example, Huyen, "Evaluation Metrics for Language Modeling," 2019, The Gradient, available on the Internet at thegradient.pub/understanding-evaluation-metrics-for-language-models, which is hereby incorporated herein by reference in its entirety.

In some embodiments, for each respective text span in the set of text spans, the obtaining the respective scoring representation of the corresponding natural language context of the respective expression comprises, for each respective text span in the set of text spans, assigning a corresponding label that indicates an association between the respective text span and the first health entity, based on a presence or absence of one or more signal terms in the respective text span, where the one or more signal terms are selected from a corresponding set of signal terms for a respective relationship status in a plurality of relationship statuses. In some embodiments, the set of text spans comprising corresponding labels is further used to train a model. In some implementations, the model comprises any of the model architectures disclosed herein. In some implementations, the model comprises a decision tree. In some embodiments, the method further comprises applying a dimensionality reduction technique to the set of text spans (e.g., vector representations, dense representations, bag of words, etc.).

Sparse Model Architecture

Referring to Block 322, the method further includes inputting, for each respective text span 136 in the set of text spans, the respective scoring representation 142 for the respective text span 136 into a model 150 comprising a plurality of parameters 152.

In some embodiments, the model includes any of the model architectures disclosed herein (see, for example, the section entitled "Definitions: Models," above).

In some embodiments, referring to Block 324, the model includes a first layer comprising the plurality of parameters. In some such embodiments, the first layer (i) receives, as input, a first sparse tensor comprising, for each respective text span in the set of text spans, the respective scoring representation for the respective text span, and (ii) generates, as output, a tensor dot product obtained using the first sparse tensor and the plurality of parameters. In some such embodiments, the plurality of parameters is formatted as a second sparse tensor, and the tensor dot product is formatted as a third sparse tensor. In some embodiments, the model further includes a softmax activation function that (i) receives, as input, the tensor dot product obtained using the first sparse tensor and the plurality of parameters and (ii) generates, as output, for each respective text span in the set of text spans, at least the corresponding first prediction that the respective text span is associated with the first health entity.

In some embodiments, the model includes a single layer sparse tensor architecture.

Figure 5:
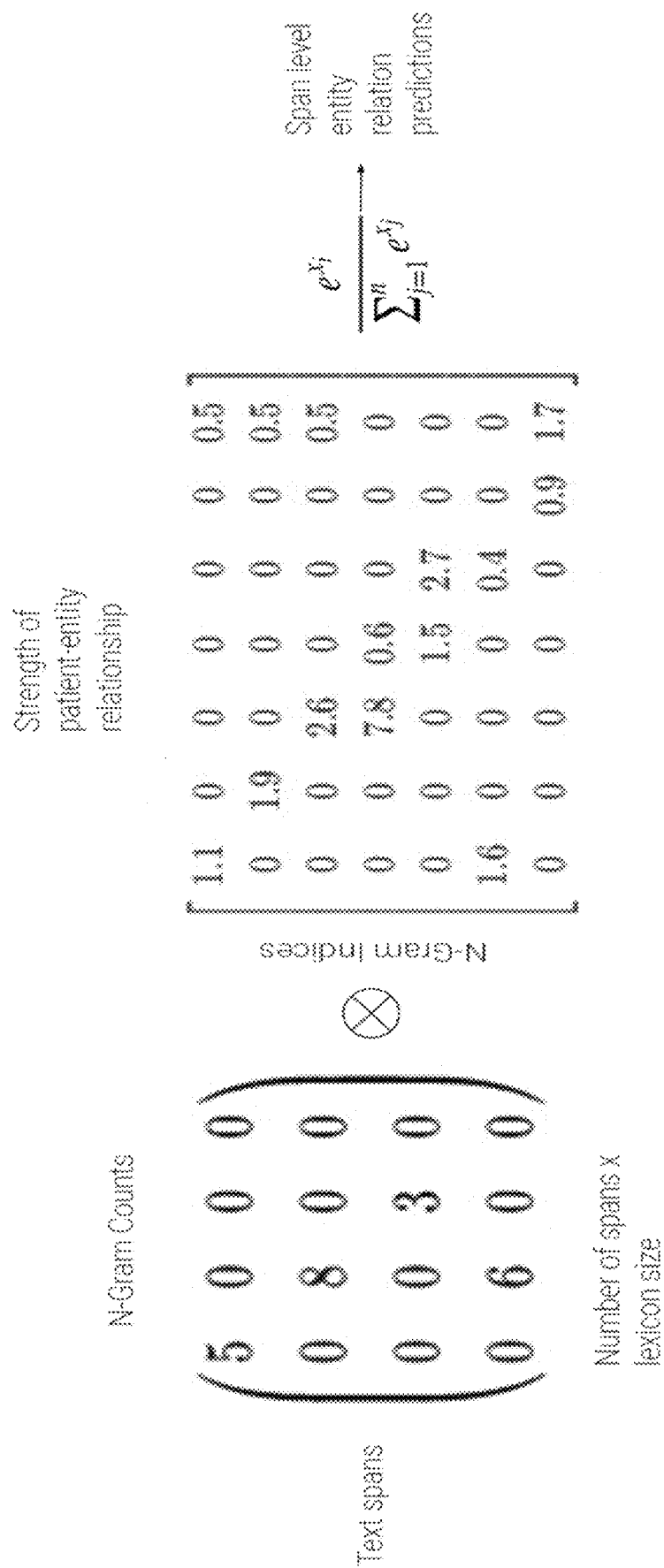
FIG. 5 illustrates an example sparse tensor model architecture for use in determining a relationship between a first subject and a first health entity, in accordance with some embodiments of the present disclosure.

An example schematic of a single layer sparse tensor model architecture is illustrated in FIG. 5. As described above, in some embodiments, the method includes, for each respective text span in the set of text spans, obtaining, for each respective N-gram in a plurality of N-grams, a corresponding count of occurrences that the respective N-gram occurs in the respective text span, thereby obtaining a corresponding set of N-gram counts for the respective text span. In some such embodiments, the text spans and N-grams counts are arranged as a first tensor (e.g., an input tensor), such that text spans are represented as rows and N-grams are represented as columns. A respective N-gram count is located at the position in the tensor that corresponds to the respective N-gram and the respective text span for which the count was tallied. N-grams that do not appear in a respective text span are nevertheless represented in the first tensor as a zero at the respective position.

In some embodiments, and without being limited to any one theory of operation, each respective text span is unlikely to contain more than a few of the N-grams in the plurality of N-grams (e.g., due to the subdivision of the EHR into sentences and subsentences containing one or more mentions of the first health entity). Thus, in some embodiments, the first tensor (e.g., the input tensor) is a sparse tensor, in which a majority of the entries in the first tensor will be zero or null. Thus, as depicted in the example schematic in FIG. 5, the example model receives, as input, the first sparse tensor that includes, for each respective text span in the set of text spans, for each respective N-gram in a plurality of N-grams, the corresponding count of occurrences that the respective N-gram occurs in the respective text span.

In some embodiments, the plurality of parameters comprises, for each respective N-gram in the plurality of N-grams, for at least a first relationship status in a plurality of relationship statuses, a corresponding parameter that indicates a strength of association between the respective N-gram and the first relationship status. In some implementations, the plurality of parameters further comprises, for each respective N-gram in the plurality of N-grams, for each respective relationship status in the plurality of relationship statuses other than the first relationship status, a corresponding parameter that indicates a strength of association between the respective N-gram and the respective relationship status.

In some embodiments, each respective N-gram in the plurality of N-grams represents a natural language context that is differentially weighted in the model according to its relevance (e.g., strength of association) to a particular relationship between the first subject and the respective health entity. For instance, in some embodiments, N-grams that are strongly indicative of a positive relationship are strongly weighted such that the presence of such N-grams in a text span containing the respective health entity will be factored more heavily towards a prediction that the respective relationship is positive.

As an illustrative example, a text span that includes the phrase "patient was on Tagrisso" contains the N-gram "patient was on," which is strongly indicative of a subject-medication relationship that the medication was "taken" by the subject. Thus, in some implementations, the corresponding parameter for the respective N-gram "patient was on" with respect to a "positive" status for the relationship "taken" is weighted to reflect this association.

In some embodiments, each respective relationship status in the plurality of relationship statuses is selected from the group consisting of positive, negative and null. In some embodiments, for a respective N-gram in the plurality of N-grams, a first respective parameter for a first corresponding relationship status is different from a second respective parameter for a second corresponding relationship status. Thus, in some implementations, a given N-gram has different parameters for different relationship statuses (e.g., is weighted differently according to its relevance to the particular relationship status.

Relationship statuses contemplated for use in the present disclosure are further detailed elsewhere herein (see, for example, the section entitled "Predictions," below).

Returning again to FIG. 5, the example model includes a second tensor (e.g., a parameter tensor) that comprises, for each respective N-gram in the plurality of N-grams, for each respective relationship status in the plurality of relationship statuses, a corresponding parameter that indicates a strength of association between the respective N-gram and the respective relationship status. In some such embodiments, N-grams are represented as rows and relationship statuses are represented as columns. A respective parameter is located at the position in the tensor that corresponds to the respective N-gram and the respective relationship status for which the parameter indicates the strength of association.

In some embodiments, a respective N-gram in the plurality of N-grams includes a zero or null value for one or more parameters corresponding to one or more relationship statuses. Thus, in some embodiments, the second tensor (e.g., the parameter tensor) is a sparse tensor, in which a majority of the entries in the second tensor are zero or null.

In some embodiments, the plurality of parameters comprises at least 500, at least 5000, or at least 50,000 parameters.

In some embodiments, the plurality of parameters includes at least 10, at least 50, at least 100, at least 500, at least 1000, at least 2000, at least 5000, at least 10,000, at least 20,000, at least 50,000, at least 100,000, at least 200,000, at least 500,000, at least 1 million, at least 2 million, at least 3 million, at least 4 million, at least 5 million, or at least 10 million parameters. In some embodiments, the plurality of parameters includes no more than 20 million, no more than 10 million, no more than 5 million, no more than 4 million, no more than 1 million, no more than 500,000, no more than 100,000, no more than 50,000, no more than 10,000, no more than 5000, no more than 1000, or no more than 500 parameters. In some embodiments, the plurality of parameters consists of from 10 to 5000, from 500 to 10,000, from 10,000 to 500,000, from 20,000 to 1 million, from 1 million to 10 million, or from 2 million to 20 million parameters. In some embodiments, the plurality of parameters falls within another range starting no lower than 10 parameters and ending no higher than 20 million parameters.

In some implementations, the method further includes applying a dimensionality reduction technique to one or more respective scoring representations for a corresponding one or more text spans in the set of text spans, thereby generating a reduced dimension scoring representation. In some embodiments, the inputting, for each respective text span in the set of text spans, the respective scoring representation for the respective text span into a model includes inputting a respective reduced dimension scoring representation for the respective text span into the model.

In some embodiments, any one or more of a variety of dimensionality reduction techniques is used. Examples include, but are not limited to, principal component analysis (PCA), non-negative matrix factorization (NMF), linear discriminant analysis (LDA), diffusion maps, or network (e.g., neural network) techniques such as an autoencoder.

In some embodiments, the dimension reduction is a principal components algorithm, a random projection algorithm, an independent component analysis algorithm, a feature selection method, a factor analysis algorithm, Sammon mapping, curvilinear components analysis, a stochastic neighbor embedding (SNE) algorithm, an Isomap algorithm, a maximum variance unfolding algorithm, a locally linear embedding algorithm, a t-SNE algorithm, a non-negative matrix factorization algorithm, a kernel principal component analysis algorithm, a graph-based kernel principal component analysis algorithm, a linear discriminant analysis algorithm, a generalized discriminant analysis algorithm, a uniform manifold approximation and projection (UMAP) algorithm, a LargeVis algorithm, a Laplacian Eigenmap algorithm, or a Fisher's linear discriminant analysis algorithm. See, for example, Fodor, 2002, "A survey of dimension reduction techniques," Center for Applied Scientific Computing, Lawrence Livermore National, Technical Report UCRL-ID-148494; Cunningham, 2007, "Dimension Reduction," University College Dublin, Technical Report UCD-CSI-2007-7, Zahorian et al., 2011, "Nonlinear Dimensionality Reduction Methods for Use with Automatic Speech Recognition," Speech Technologies. doi: 10.5772/16863. ISBN 978-953-307-996-7; and Lakshmi et al., 2016, "2016 IEEE 6th International Conference on Advanced Computing (IACC)," pp. 31-34. doi: 10.1109/IACC.2016.16, ISBN 978-1-4673-8286-1, the contents of which are hereby incorporated by reference, in their entireties, for all purposes.

In some embodiments, the dimension reduction is a principal component analysis (PCA) algorithm, and each respective extracted dimension reduction component comprises a respective principal component derived by the PCA. In such embodiments, the number of principal components in the plurality of principal components can be limited to a threshold number of principal components calculated by the PCA algorithm. In some embodiments, the threshold number of principal components is, for example, at least 2, at least 3, at least 5, at least 10, at least 20, at least 50, at least 100, at least 1000, at least 1500, or any other number. In some embodiments, the threshold number of principal components is no more than 2000, no more than 1000, no more than 100, no more than 50, or no more than 10. In some embodiments, the threshold number of principal components is from 2 to 10, from 5 to 20, from 3 to 50, from 20 to 100, or from 100 to 2000. In some embodiments, the threshold number of principal components falls within another range starting no lower than 2 and ending no higher than 2000.

In some embodiments, the dimension reduction includes manifold learning using the respective scoring representation for each respective text span in the set of text spans. Generally, manifold learning is used to describe the low-dimensional structure of high-dimensional data by determining maximal variations in a dataset. Examples include, but are not limited to, force-directed layout (see, e.g., Fruchterman, T. M., & Reingold, E. M. (1991). Graph drawing by force-directed placement. *Software: Practice and experience,* 21(11), 1129-1164) (e.g., Force Atlas 2), t-distributed stochastic neighbor embedding (t-SNE), locally linear embedding (see, e.g., Roweis, S. T., & Saul, L. K. (2000). Nonlinear dimensionality reduction by locally linear embedding. *Science,* 290(5500), 2323-2326), local linear isometric mapping (ISOMAP; see, e.g., Tenenbaum, J. B., De Silva, V., & Langford, J. C. (2000). A global geometric framework for nonlinear dimensionality reduction. *Science,* 290(5500), 2319-2323), kernel PCA, graph-based kernel PCA, Potential of Heat-Diffusion for Affinity Based Trajectory Embedding (PHATE), generalized discriminant analysis (GDA), Uniform Manifold Approximation and Projection (UMAP), and/or kernel discriminant analysis.

In some embodiments, the dimension reduction includes discriminant analysis. Generally, force-directed layouts are useful in various particular embodiments because of their ability to identify new, lower dimensions that encode non-linear aspects of the underlying data which arise from underlying relationships between data elements. In some implementations, force directed layouts use physics-based models as mechanisms for determining a reduced dimensionality that best represents the data, make few assumptions about the structure of the data, and do not impose a denoising approach. Manifold learning is further described, for example, in Wang et al., 2004, "Adaptive Manifold Learning," Advances in Neural Information Processing Systems 17, the content of which is hereby incorporated by reference, in its entirety, for all purposes.

Predictions

Referring to Block 326, the method further includes receiving, as output from the model 150, for each respective text span 136 in the set of text spans, at least a corresponding first prediction 154 that the respective text span 136 is associated with the first health entity.

In some embodiments, referring to Block 328, the receiving further comprises, for each respective text span in the set of text spans, receiving, as output from the model, for at least a first relationship status in a plurality of relationship statuses, a corresponding prediction that the respective text span is associated with the first relationship status.

In some embodiments, the plurality of relationship statuses comprises at least 2 or at least 3 relationship statuses. In some implementations, each respective relationship status in the plurality of relationship statuses is selected from the group consisting of positive, negative, and null.

In some embodiments, a respective relationship status denotes whether a respective relationship between a subject and a health entity is or is not present. For instance, in some embodiments, for a respective subject-medication relationship of "taken" (e.g., "has the subject taken Tagrisso?"), a corresponding plurality of relationship statuses includes a positive status (e.g., yes, taken), a negative status (e.g., no, not taken), or a null status (e.g., insufficient information).

In some embodiments, the plurality of relationship statuses includes at least 2, at least 3, at least 4, at least 5, at least 10, at least 15, at least 20, or at least 30 relationship statuses. In some embodiments, the plurality of relationship statuses includes no more than 50, no more than 30, no more than 20, no more than 10, or no more than 5 relationship statuses. In some embodiments, the plurality of relationship statuses consists of from 2 to 5, from 2 to 10, from 4 to 20, from 15 to 40, or from 30 to 50 relationship statuses. In some embodiments, the plurality of relationship statuses falls within another range starting no lower than 2 statuses and ending no higher than 50 statuses.

In some embodiments, the plurality of relationship statuses include, for each respective relationship in a plurality of relationships, a corresponding set of relationship statuses (e.g., taken—positive, taken—negative, taken—null, refused—positive, refused—negative, refused—null, prescribed—positive, prescribed—negative, and/or prescribed—null). In some such embodiments, the model outputs a prediction (e.g., a classification) of whether the health entity is positively or negatively associated with each relationship in a plurality of possible relationships relative to the subject.

In some embodiments, the plurality of relationship statuses include one or more classification outcomes (e.g., taken, refused, prescribed, etc.). In some such embodiments, the model outputs a class of relationship for the subject-health entity relationship (e.g., taken).

In some embodiments, the corresponding first prediction is a probability that the respective text span is associated with the first relationship status in the plurality of relationship statuses. Consider the example subject-medication relationship of "taken" described above (e.g., "has the subject taken Tagrisso?") and a first relationship status of "positive" for the respective relationship. In some such embodiments, the model outputs, for each respective text span in the set of text spans, a first corresponding probability that the respective text span is positively associated with the relationship (e.g., a predicted probability of 0.8 for a positive association with the relationship "taken").

In some embodiments, the corresponding first prediction is a binary indication (e.g., yes/no and/or 0/1) that the respective text span is associated with the first relationship status in the plurality of relationship statuses. Thus, for the example relationship of "taken," the model outputs, for each respective text span in the set of text spans, a first corresponding binary indication that the respective text span is positively associated with the relationship (e.g., predicted output of "yes" for a positive association with the relationship "taken").

In some embodiments, the receiving further comprises, for each respective text span in the set of text spans, receiving, as output from the model, for each respective relationship status in the plurality of relationship statuses other than the first relationship status, a corresponding prediction that the respective text span is associated with the respective relationship status, thereby obtaining a corresponding plurality of predictions for the respective text span. For instance, in some implementations, the model outputs, for each respective text span in the set of text spans, a first corresponding prediction that the respective text span is positively associated with the relationship (e.g., a predicted probability of 0.8 for a positive association with the relationship "taken"), a second corresponding prediction that the respective text span is negatively associated with the relationship (e.g., a predicted probability of 0.2 for a negative association with the relationship "taken"), and/or a third corresponding prediction for a null status.

In some embodiments, for each respective text span in the set of text spans, each respective prediction in the corresponding plurality of predictions is a respective probability, in a corresponding plurality of probabilities for the respective text span, that the respective text span is associated with the respective relationship status.

In some embodiments, the method further includes, for each respective text span in the set of text spans, for each respective relationship status in the plurality of relationship statuses, normalizing the respective probability to a probability distribution over the corresponding plurality of probabilities for the respective text span, where the corresponding plurality of probabilities sums to 1. In some embodiments, the normalization is performed using a softmax activation function.

In some implementations, the method further includes obtaining a set of assigned text spans by a procedure comprising, for each respective text span in the set of text spans, assigning a respective relationship status, in the plurality of relationship statuses, to the respective text span based on an evaluation of the corresponding plurality of predictions for the respective text span against one or more classification criteria.

In some implementations, the assigning comprises assigning the first relationship status to the respective text span when 1) a first classification criterion is satisfied, where i) the respective text span comprises a corresponding label that labels the respective training text span as having the first relationship status, and ii) the corresponding first prediction for the first relationship status a) satisfies a first prediction threshold or b) is undefined.

In some implementations, the assigning comprises assigning the first relationship status to the respective text span when 2) a second classification criterion is satisfied, where i) the respective text span does not comprise any signal terms in a corresponding set of signal terms for the first relationship status, and ii) the corresponding first prediction for the first relationship status satisfies a second prediction threshold.

In some implementations, the assigning comprises assigning the first relationship status to the respective text span when 3) a third criterion is satisfied, where i) the respective text span is associated with a section header that has the first relationship status, ii) the corresponding first prediction for the first relationship status satisfies a third prediction threshold, and iii) the corresponding first prediction for the first relationship status exceeds a corresponding second prediction for a second relationship status in the plurality of relationship statuses, other than the first relationship status.

In some embodiments, the respective relationship status for the section header is an assigned corresponding label that indicates an association between the respective section header and the first health entity. In some implementations, the section header is assigned the corresponding label based on a presence or absence of one or more signal terms in the corresponding section of the first electronic health record, where the one or more signal terms are selected from a corresponding set of signal terms for a respective relationship status in a plurality of relationship statuses. See, for example, the section entitled "Preprocessing electronic health records," above.

In some implementations, the assigning comprises assigning the second relationship status to the respective text span when none of the first criterion, second criterion, and third criterion are satisfied.

In some embodiments, the first prediction threshold is at least 0.05 or at least 0.1. In some embodiments, the first prediction threshold is at least 0.01, at least 0.03, at least 0.05, at least 0.08, at least 0.1, at least 0.3, at least 0.5, or at least 0.8. In some embodiments, the first prediction threshold is no more than 1, no more than 0.8, no more than 0.5, no more than 0.3, no more than 0.1, no more than 0.08, or no more than 0.05. In some embodiments, the first prediction threshold is from 0.01 to 0.08, from 0.03 to 0.1, from 0.05 to 0.3, from 0.1 to 0.8, or from 0.5 to 1. In some embodiments, the first prediction threshold falls within another range starting no lower than 0.05 and ending no higher than 1.

In some embodiments, the second prediction threshold is at least 0.3 or at least 0.5. In some embodiments, the second prediction threshold is at least 0.01, at least 0.03, at least 0.05, at least 0.08, at least 0.1, at least 0.3, at least 0.5, or at least 0.8. In some embodiments, the second prediction threshold is no more than 1, no more than 0.8, no more than 0.5, no more than 0.3, no more than 0.1, no more than 0.08, or no more than 0.05. In some embodiments, the second prediction threshold is from 0.01 to 0.08, from 0.03 to 0.1, from 0.05 to 0.3, from 0.1 to 0.8, or from 0.5 to 1. In some embodiments, the second prediction threshold falls within another range starting no lower than 0.05 and ending no higher than 1.

In some embodiments, the third prediction threshold is at least 0.2 or at least 0.4. In some embodiments, the third prediction threshold is at least 0.01, at least 0.03, at least 0.05, at least 0.08, at least 0.1, at least 0.3, at least 0.5, or at least 0.8. In some embodiments, the third prediction threshold is no more than 1, no more than 0.8, no more than 0.5, no more than 0.3, no more than 0.1, no more than 0.08, or no more than 0.05. In some embodiments, the third prediction threshold is from 0.01 to 0.08, from 0.03 to 0.1, from 0.05 to 0.3, from 0.1 to 0.8, or from 0.5 to 1. In some embodiments, the third prediction threshold falls within another range starting no lower than 0.05 and ending no higher than 1.

Obtaining assigned text spans by assigning relationship statuses to text spans according to one or more heuristic rules is further described in Example 2, below. Other methods for assigning relationship statuses to text spans are possible, as will be apparent to one skilled in the art.

In some embodiments, the method further includes filtering the set of text spans by removing each respective text span in the set of text spans that is not assigned the first relationship status. In some embodiments, unassigned text spans are not removed from the set of text spans.

In some embodiments, the assigning comprises (i) selecting, from the plurality of relationship statuses, a relationship status having the highest corresponding probability in the corresponding plurality of probabilities for the respective text span and (ii) assigning the relationship status having the highest corresponding probability to the respective text span. In other words, in some such embodiments, text spans are assigned with the relationship status having the highest outputted probabilities (e.g., the most likely relationship status).

In some embodiments, for each respective text span in the set of text spans, the corresponding first prediction is a corresponding first probability that the respective text span is associated with a first relationship status in a plurality of relationship statuses. In some such embodiments, the method further includes (i) identifying a respective text span, in the set of text spans, having a highest corresponding first probability for the first relationship status across the set of text spans and (ii) assigning, to the first subject, a respective relationship score for the first relationship status based on the highest corresponding first probability.

In other words, in some implementations, the method includes evaluating the outputted probabilities for each text span in the set of text spans to determine a relationship score for the first subject with respect to the first health entity.

In some embodiments, the relationship score is selected as the highest corresponding first probability, obtained from a subset of assigned text spans that are assigned the first relationship status (e.g., the highest probability for text spans assigned to the positive relationship status). In some embodiments, the relationship score is selected as the highest corresponding first probability, obtained from the set of text spans (e.g., the highest probability for the positive relationship status, with or without assignment of text spans). In some embodiments, the relationship score is selected as the highest respective probability in a corresponding plurality of probabilities over the set of text spans (e.g., the highest probability for any one of the positive, negative, or null score, with or without assignment of text spans).

In some implementations, referring to Block 330, the method further includes using the at least the corresponding first prediction to determine an eligibility of the first subject for enrollment in a clinical trial. In some implementations, the method includes using the relationship score for the first subject to determine an eligibility of the first subject for enrollment in a clinical trial.

In some embodiments, the method further includes repeating the filtering, evaluating, inputting, and receiving to determine a relationship between the first subject and a second health entity, other than the first health entity, in a plurality of health entities. In some embodiments, referring to Block 332, the method further includes repeating the filtering, evaluating, inputting, and receiving to determine a corresponding relationship between the first subject and each respective health entity, other than the first health entity, in a plurality of health entities.

In some embodiments, the method further includes repeating the receiving, detecting, obtaining, filtering, evaluating, inputting, and receiving, to determine a relationship between a respective subject in the first health entity, for each respective subject, other than the first subject, in a plurality of subjects. In some embodiments, the method includes receiving, for each respective subject in the plurality of subjects, a corresponding electronic health record. In some embodiments, each of the detecting, obtaining, filtering, evaluating, inputting, and receiving is repeated for each respective electronic health record in set of at least 1000 electronic health records.

Any of the embodiments disclosed herein for a first subject and/or a first health entity, including subjects, health entities, electronic health records, and methods of preprocessing and evaluating the same, are further contemplated for use with any second, third, fourth, or subsequent subject and/or health entity, as will be apparent to one skilled in the art (see, for example, the sections entitled "Subjects and health entities," "Preprocessing electronic health records," "Scoring representations," and "Sparse model architecture," above).

In some embodiments, the set of text spans is searched and/or ranked by one or more identifiers (e.g., health entity codes, ontological identifiers, health entity names, and subject identifiers). In some embodiments where the method is repeated for a plurality of subjects, the plurality of subjects is searched and/or ranked based on, for each respective subject in the plurality of subjects, for each respective text span in a corresponding set of text spans, at least the corresponding first prediction that the respective text span is associated with the first health entity. For example, in some embodiments, the plurality of subjects is searched and/or ranked based on positive prediction scores and/or relationship scores.

Model Training

Referring to Block 336, in some embodiments, the plurality of parameters reflects values from a plurality of training electronic health records, comprising, for each respective training text span in a set of training text spans for the plurality of training electronic health records, (i) for each respective N-gram in the plurality of N-grams, a corresponding count of occurrences that the respective N-gram occurs in the respective training text span, and (ii) a corresponding label, in a plurality of labels for the respective training text span, that represents a truth status for at least a first relationship status in a plurality of relationship statuses. In some such embodiments, each respective training text span in the corresponding set of training text spans comprises a respective expression related to the first health entity.

In some embodiments, the plurality of training electronic health records comprises at least 10,000, at least 100,000, at least 500,000, or at least 1 million training electronic health records.

In some embodiments, the plurality of training electronic health records includes at least 100, at least 500, at least 1000, at least 2000, at least 5000, at least 10,000, at least 20,000, at least 50,000, at least 100,000, at least 200,000, at least 500,000, at least 1 million, at least 2 million, at least 3 million, at least 4 million, at least 5 million, or at least 10 million training electronic health records. In some embodiments, the plurality of training electronic health records includes no more than 20 million, no more than 10 million, no more than 5 million, no more than 4 million, no more than 1 million, no more than 500,000, no more than 100,000, no more than 50,000, no more than 10,000, no more than 5000, no more than 1000, or no more than 500 training electronic health records. In some embodiments, the plurality of training electronic health records consists of from 100 to 5000, from 500 to 10,000, from 10,000 to 500,000, from 20,000 to 1 million, from 1 million to 10 million, or from 2 million to 20 million training electronic health records. In some embodiments, the plurality of training electronic health records falls within another range starting no lower than 100 training electronic health records and ending no higher than 20 million training electronic health records.

In some embodiments, referring to Block 334, the method further includes training the model using a training procedure. For each respective training text span in the set of training text spans, for each respective N-gram in the plurality of N-grams, the corresponding count of occurrences that the respective N-gram occurs in the respective training text span is (i) inputted into an untrained or partially trained model, thereby obtaining at least a corresponding first prediction that the respective training text span is associated with the first relationship status in the plurality of relationship statuses. A differentiable prediction performance score is (ii) determined for the untrained or partially trained model using, for each respective training text span in the set of training text spans, a comparison between at least the corresponding first prediction and the corresponding label for the respective training text span. One or more parameters in the plurality of parameters is then (iii)

adjusted, in a backpropagation, using a minimization of a loss function for the differentiable prediction performance score.

In some embodiments, the method further includes performing a preprocessing procedure for each respective training electronic health record in a plurality of training electronic health records to obtain the set of training text spans.

For example, in some embodiments, the method further includes, prior to the inputting (i), receiving a plurality of training electronic health records, each respective training electronic health record (i) corresponding to a respective training subject and (ii) comprising a corresponding plurality of sections, where each respective section in the corresponding plurality of sections is delineated by a respective section header. For each respective training electronic health record in the plurality of training electronic health records, for each respective section in the corresponding plurality of sections, the respective section header is detected, thereby splitting the respective training electronic health record into the corresponding plurality of sections.

In some such embodiments, a plurality of training text spans for the plurality of training electronic health records is obtained by, for each respective training electronic health record in the plurality of training electronic health records, subdividing each respective section in the corresponding plurality of sections into a corresponding one or more training text spans. The plurality of training text spans is filtered by language pattern recognition to identify the set of training text spans, where each respective training text span in the set of training text spans comprises a respective expression related to the first health entity.

In some such embodiments, for each respective training text span in the set of training text spans, the corresponding natural language context of the respective expression related to the first health entity is evaluated, thereby obtaining a respective scoring representation of the corresponding natural language context of the respective expression.

In some embodiments, for each respective training text span in the set of training text spans, the evaluating the corresponding natural language context of the respective expression related to the first health entity further includes, for each respective N-gram in the plurality of N-grams, determining a corresponding count of occurrences that the respective N-gram occurs in the respective training text span.

Any of the embodiments disclosed herein for preprocessing electronic health records and/or determining N-gram counts for text spans, are further contemplated for use with any training electronic health records and/or training text spans, as will be apparent to one skilled in the art (see, for example, the sections entitled "Subjects and health entities," "Preprocessing electronic health records," and "Scoring representations," above).

In some embodiments, the differentiable prediction performance score is a soft-F1 score. In some embodiments, the loss function for the differentiable prediction performance score is a soft-F1 loss function and the minimization is performed using gradient descent.

Advantageously, soft-F1 scores are convex, numerical approximations to traditional F1 scores that can be used as both an evaluation metric and a loss function, in contrast to traditional F1 scores. Particularly, in some implementations, soft-F1 scores are obtained by scaling of binary predictions to generate probabilities that can be used in the calculation of loss functions. In the context of model training, in some implementations, soft-F1 scores for each respective training text span in the set of training text spans are calculated from metrics obtained using (i) predictions generated as output from the model and (ii) labels (e.g., true positive, true negative, false positive, and/or false negative). These soft-F1 scores can then be used with gradient descent algorithms to minimize loss and update parameters. Generally, soft-F1 scores are robust against class imbalance, thus resulting in improved model performance.

In some embodiments, the method further includes repeating the inputting (i), determining (ii), and adjusting (iii) for each training iteration in a plurality of training iterations.

In some embodiments, the plurality of training iterations is at least 10, at least 100, at least 1000, or at least 10,000 iterations.

In some embodiments, the plurality of training iterations includes at least 3, at least 5, at least 10, at least 20, at least 50, at least 100, at least 200, at least 500, at least 1000, at least 2000, at least 5000, or at least 10,000 training iterations. In some embodiments, the plurality of training iterations includes no more than 50,000, no more than 10,000, no more than 5000, no more than 1000, no more than 500, no more than 100, no more than 50, or no more than 20 training iterations. In some embodiments, the plurality of training iterations consists of from 3 to 30, from 20 to 200, from 100 to 1000, from 800 to 5000, from 3000 to 20,000, or from 10,000 to 50,000 training iterations. In some embodiments, the plurality of training iterations falls within another range starting no lower than 3 training iterations and ending no higher than 50,000 training iterations.

In some embodiments, the plurality of training iterations is between 10 and 100.

In some embodiments, each respective training iteration in the plurality of training iterations is a training epoch. In some embodiments, each respective training iteration in the plurality of training iterations includes inputting, into the untrained or partially trained model, the training dataset that includes, for each respective training text span in the set of training text spans, for each respective N-gram in the plurality of N-grams, the corresponding count of occurrences that the respective N-gram occurs in the respective training text span. Generally, when the entirety of the training dataset (e.g., data for all of the training text spans in the set of training text spans) are inputted as a single batch into a single training iteration for the model, the model training is referred to as batch gradient descent.

In some embodiments, the untrained or partially trained model includes a single layer sparse tensor architecture, as described above (see, for example, the section entitled "Model training," above). In some implementations, such sparse architecture advantageously provides the ability to fit an entire training dataset into a single batch, as described above. This further increases the speed and efficacy of the model training by allowing for extremely fast epoch processing, increasing the stability of training, and facilitating a robust fit for global metrics. In some such embodiments, the model architectures disclosed herein reduce the computational resources and time needed to train an untrained or partially trained model to determine a relationship between a first subject and a first health entity for use in clinical decision-making.

In some embodiments, the method further includes repeating the inputting (i), determining (ii), and adjusting (iii) until the model satisfies a performance criterion.

In particular, in some such embodiments, the method further includes obtaining a validation data structure comprising, for each respective validation text span in a corresponding set of validation text spans for a plurality of validation electronic health records, (i) for each respective N-gram in the plurality of N-grams, a corresponding count of occurrences that the respective N-gram occurs in the respective validation text span, and (ii) a corresponding label, in the plurality of labels, that represents a truth status for at least the first relationship status in the plurality of relationship statuses. In some such embodiments, each respective validation text span in the corresponding set of validation text spans comprises a respective expression related to the first health entity.

In some implementations, the method further includes performing a validation procedure comprising: (i) inputting, into the model, for each respective validation text span in the corresponding set of validation text spans, for each respective N-gram in the plurality of N-grams, the corresponding count of occurrences that the respective N-gram occurs in the respective validation text span, thereby obtaining at least a corresponding first prediction that the respective validation text span is associated with the first relationship status in the plurality of relationship statuses; (ii) determining an evaluation metric for the model using, for each respective validation text span in the corresponding set of validation text spans, a comparison between at least the corresponding first prediction and the corresponding label for the respective validation text span; and (iii) determining whether the model satisfies the performance criterion based on a comparison of the evaluation metric to the performance criterion.

In some embodiments, the evaluation metric is selected from the group consisting of precision, recall, F1 score, and accuracy, where:

$$F1\ score=2*((Precision \times Recall)/(Precision+Recall))= TP/(TP+(FP+FN)/2),$$

$$Precision=TP/(TP+FP),$$

$$Recall=TP/(TP+FN),\ and$$

$$Accuracy=(TP+TN)/(TP+TN+FP+FN),\ where$$

TP is true positive rate, TN is true negative rate, FP is false positive rate, and FN is false negative rate.

In some embodiments, the performance criterion is at least 0.5, at least 0.6, at least 0.7, at least 0.8, at least 0.9, at least 0.95, or at least 0.99.

In some embodiments, the plurality of validation electronic health records comprises at least 1000, at least 10,000, at least 100,000, or at least 500,000 validation electronic health records.

In some embodiments, the plurality of validation electronic health records includes at least 100, at least 500, at least 1000, at least 2000, at least 5000, at least 10,000, at least 20,000, at least 50,000, at least 100,000, at least 200,000, at least 500,000, at least 1 million, at least 2 million, at least 3 million, or at least 4 million, or at least 5 million validation electronic health records. In some embodiments, the plurality of validation electronic health records includes no more than 10 million, no more than 5 million, no more than 4 million, no more than 1 million, no more than 500,000, no more than 100,000, no more than 50,000, no more than 10,000, no more than 5000, no more than 1000, or no more than 500 validation electronic health records. In some embodiments, the plurality of validation electronic health records consists of from 100 to 5000, from 500 to 10,000, from 10,000 to 500,000, from 20,000 to 1 million, from 1 million to 5 million, or from 2 million to 10 million validation electronic health records. In some embodiments, the plurality of validation electronic health records falls within another range starting no lower than 100 validation electronic health records and ending no higher than 10 million validation electronic health records.

In some embodiments, the plurality of validation electronic health records is obtained by subdividing the plurality of training electronic health records (e.g., an 80:20 split). In some embodiments, the plurality of validation electronic health records is a held-out set of the plurality of training electronic health records.

In some embodiments, the validation procedure comprises k-fold cross validation.

In some embodiments, the training procedure is performed without hyperparameter tuning.

In some embodiments, each respective training electronic health record in the plurality of training electronic health records corresponds to a respective training subject in a plurality of training subjects.

In some embodiments, the model is further trained to detect a plurality of health entities other than the first health entity. For instance, where the first health entity is a first medication (e.g., Tagrisso), in some embodiments, the model is further trained to detect at least a second medication (e.g., Enhertu).

In some embodiments, the model is trained using the corresponding set of training text spans comprising, for each respective health entity in the plurality of health entities, a respective subset of training text spans, where each respective training text span in the subset of training text spans comprises a respective expression related to the respective health entity. For example, in some such embodiments, the model is trained over all text spans that contain any mention of any health entity in the plurality of health entities. In an illustrative embodiment, the model is trained on a particular class of health entities, or "medications." Thus, each respective health entity in the plurality of health entities is a particular medication (e.g., Tagrisso, Enhertu, Imfinzi, etc.). Accordingly, in such embodiment, the model is trained using the set of training text spans for the plurality of training electronic health records, where the set of training text spans includes at least a first subset of training text spans including a respective expression related to a first health entity (e.g., a first subset of training text spans each containing a mention of Tagrisso) and a second subset of training text spans including a respective expression related to a second health entity (e.g., a second subset of training text spans each containing a mention of Enhertu). Thus, in some embodiments, the model is trained across all health entities in a plurality of health entities of a particular class (e.g., medications).

In some embodiments, the plurality of health entities is a plurality of medications selected from any of the medications described herein. For instance, in some embodiments, the plurality of health entities is a plurality of medications selected from one or more databases, including, but not limited to, the Translational Medicine Ontology (TMO), the National Cancer Institute Thesaurus (NCIt), CHM: CheMBL; DrugB: Drug-Bank; ODB: Ontario database; THIN: The Health Improvement Network; TCM: Traditional Chinese Medicine; TBDB: Tuberculosis Database; TTD: Therapeutic Target database; PDTD: Potential Drug-Target Database; TDR: Tropical Diseases Research; HIVRT: HIV Drug Resistance Database; TCMSP: Traditional Chinese Medicine Platform; SCYP: Super Cytochrome P450; DHUB: Drug Repurposing Hub; DSDB: Drug Signatures Database; PROM: Promiscuous; DRAR: Drug Repurposing Adverse Reaction; DMAP: Drug-Protein connectivity MAP; CMAP: Complement Map database; DMC: Drug Map Central; SIDER: Side Effect Resource; KSRPO: A platform for drug Repositioning; NNFIN: Network-based similarity finder; DSRV: Drug survival database; CHSP: anti-Cancer Herbs database for System Pharmacology; D2G: Drug to Gene; GSDB: Gene Set Database; SBIOS: Swiss BIOisostere; DTOM: Drug Target interactome database; DPTH: Drug Pathway database; DTW: Drug Target Web; DNET: Drug-disease Network database; SUT: SuperTarget database; DTC: Drug Target Commons; and/or KEGG: Kyoto Encyclopedia of Genes and Genomes.

In some embodiments, the plurality of health entities is a plurality of medications for one or more health conditions, such as one or more diseases or disorders. In some embodiments, the one or more health conditions includes, but is not limited to, a cancer condition.

In some embodiments, the plurality of health entities is a plurality of biomarkers. In some embodiments, the plurality of health entities is a plurality of disease conditions. In some embodiments, the plurality of health entities comprises any of the health entities disclosed herein (see, for example, the section entitled "Subjects and health entities," above).

In some embodiments, the model is further trained to detect a plurality of health entity classes other than the health entity class that corresponds to the first health entity. For instance, where the first health entity is of a first class (e.g., medications), in some embodiments, the model is further trained to detect at least a second class of health entities (e.g., biomarkers).

In some embodiments, the model is trained using the corresponding set of training text spans comprising, for each respective health entity class in the plurality of health entity classes, a respective subset of training text spans, where each respective training text span in the subset of training text spans comprises a respective expression related to a corresponding health entity in the respective health entity class. For example, in some such embodiments, the model is trained over all text spans that contain any mention of any health entity (e.g., a particular medication, a particular biomarker, and/or a particular disease condition) in the plurality of health entity classes (e.g., medications, biomarkers, and/or disease conditions).

Obtaining N-Grams

In some embodiments, the plurality of N-grams is obtained from the plurality of training electronic health records. In some embodiments, the plurality of N-grams is obtained by adding, to an initial set of N-grams, each contiguous sequence of N words in each respective training electronic health record in the plurality of training electronic health records. In some embodiments, N is a positive integer from 2 to 10 or from 1 to 20.

In some embodiments, the plurality of N-grams is obtained by adding, to an initial set of N-grams, each contiguous sequence of n words in each respective training electronic health record in the plurality of training electronic health records, for each positive integer n between K and N, where K is a positive integer less than N. In some embodiments, K is a positive integer from 1 to 6. In some embodiments, N is a positive integer greater than K from 2 to 10. In some embodiments, K is a positive integer from 1 to 10 and N is a positive integer greater than K from 2 to 20. For instance, in an illustrative embodiment, each respective N-gram in the plurality of N-grams is selected from a range of [1, 3], such that each respective N-gram in the plurality of N-grams consists of a contiguous sequence of n words, for each positive integer n from 1 to 3.

In some embodiments, the method further includes removing, from the plurality of N-grams, each respective N-gram that comprises a respective expression related to the first health entity.

In some embodiments, the method further includes applying a plurality of masking terms to each respective N-gram in the plurality of N-grams, thereby removing, from the respective N-gram, each respective masking term in the plurality of masking terms that is present in the respective N-gram.

In some embodiments, the method further includes removing, from each respective N-gram in the plurality of N-grams, each respective expression related to the first health entity that is present in the respective N-gram. In some embodiments, the method further includes removing, from each respective N-gram in the plurality of N-grams, each respective expression related to a respective health entity in a plurality of health entities that is present in the respective N-gram.

In some embodiments, the method further includes removing, from the plurality of N-grams, each respective N-gram that includes an expression related to the first health entity. In some embodiments, the method further includes removing, from the plurality of N-grams, each respective N-gram that includes an expression related to a respective health entity in a plurality of health entities. Thus, as described above, in some embodiments, the plurality of N-grams does not include any N-grams that contain a mention of a respective health entity.

Initializing Parameters

In some embodiments, the plurality of parameters further reflects values from a plurality of initialization parameters.

In some such embodiments, the method further includes, prior to the training, obtaining the plurality of initialization parameters by a procedure comprising, for at least the first relationship status in the plurality of relationship statuses, for each respective N-gram in the plurality of N-grams: tallying (i) a conditional count of occurrences that the respective N-gram co-occurs with one or more signal terms, in a respective set of signal terms associated with the first relationship status, over the plurality of training electronic health records, and (ii) a total count of occurrences that the respective N-gram occurs over the plurality of training electronic health records.

In some such embodiments, a corresponding measure of dispersion is determined between the (i) conditional count of occurrences and (ii) total count of occurrences. In some such embodiments, the corresponding measure of dispersion for each respective N-gram in the plurality of N-grams is used to populate the plurality of initialization parameters for the untrained or partially trained model.

In some embodiments, the (i) conditional N-gram count and the (ii) total N-gram count is obtained using any of the methods and embodiments disclosed elsewhere herein (see, for example, the section entitled "Scoring representations," above).

In some embodiments, a respective N-gram is determined to co-occur with the one or more signal terms when the respective N-gram and the one or more signal terms are both present within a respective training text span in the set of training text spans for the plurality of training electronic health records.

In some embodiments, the measure of dispersion for the respective N-gram is obtained using a likelihood ratio between (i) a first probability of association with the first health entity determined using the conditional count of occurrences and (ii) a second probability that is non-specific to the first health entity determined using the total count of occurrences. Likelihood ratios are further described, for example, in McGee, "Simplifying Likelihood Ratios," J Gen Intern Med. 2002 August; 17(8): 646-9, doi: 10.1046/j.1525-1497.2002.10750.x, which is hereby incorporated herein by reference in its entirety.

In some embodiments, the measure of dispersion is a log-likelihood difference. Thus, for example, in some embodiments, the model parameters are initialized with log-likelihood differences between class-based N-gram subpopulations (e.g., N-gram counts associated with relationship statuses) over the entire lexicon (e.g., total corpus N-gram counts).

In some embodiments, the measure of dispersion for the respective feature is obtained using pointwise mutual information. Generally, mutual information is based in an information theory concept. Mutual information between two sets measures how much can be known from one set if only the other set is known. Given a set of values $A=\{a_i\}$, its entropy $H(A)$ is defined by $H(A)=\Sigma_i{}''-p(a_i) \log(p(a_i))$ where $p(a_i)$ are the probabilities of the values in the set. Entropy can be interpreted as a measure of the mean uncertainty reduction that is obtained when one of the particular values is found during sampling. Given two sets $A=\{a_i\}$ and $B=\{b_i\}$, its joint entropy is given by the joint probabilities $p(a_i, b_i)$ as $H(A, B)=\Sigma_i{}''-p(a_i, b_i) \log(p(a_i+b_i))$. Mutual information is obtained by subtracting the entropy of both sets from the joint entropy, as $H(A, B)=H(A)-H(B)$, and indicates how much uncertainty about one set is reduced by the knowledge of the second set.

Obtaining and or Assigning Labels

In some embodiments, for each respective training text span in the set of training text spans for the plurality of training electronic health records, the corresponding label labels the respective training text span as having at least the first relationship status.

In some embodiments, for each respective training text span in the set of training text spans for the plurality of training electronic health records, the corresponding label labels the respective training text span as not having the first relationship status.

For instance, in some embodiments, a respective label indicates a ground truth for each respective relationship status in a plurality of relationship statuses for the respective training text span. Thus, in some instances, if a respective text span is positive for a respective relationship (e.g., medication "taken"), then the corresponding label for the positive relationship status is yes or 1 and the corresponding label for the negative relationship status is no or 0. Conversely, if a respective text span is negative for a respective relationship (e.g., medication not "taken"), then the corresponding label for the positive relationship status is no or 0 and the corresponding label for the negative relationship status is yes or 1.

In some embodiments, for each respective training text span in the set of training text spans for the plurality of training electronic health records, each respective label in the plurality of labels is a binary number (e.g., 0 or 1).

In some embodiments, the method further includes assigning the corresponding label to the respective training text span based on a presence or absence of one or more signal terms in the respective training text span, in a corresponding set of signal terms for the first relationship status.

In some embodiments, each respective training text span in the set of training text spans for the plurality of training electronic health records further comprises, for each respective relationship status in the plurality of relationship statuses other than the first relationship status, a corresponding label, in the plurality of labels for the respective training text span, that represents a respective truth status for the respective relationship status.

In some embodiments, each respective relationship status in the plurality of relationship statuses is associated with a corresponding set of signal terms in a plurality of signal terms. In some such embodiments, the method further includes, for each respective training text span in the corresponding set of training text spans, for each respective relationship status in the plurality of relationship statuses: when one or more signal terms in the corresponding set of signal terms is determined to be present in the respective training text span, assigning a respective label to the respective training text span that labels the respective training text span as having the respective relationship status. In some embodiments, when no signal term in the corresponding set of signal terms is present in the respective training text span, the method includes assigning a respective label to the respective training text span that labels the respective training text span as not having the respective relationship status.

In other words, in some implementations, labels are assigned to training text spans based on the presence or absence of signal-bearing verbiage.

In some embodiments, non-limiting signal terms for a "positive" relationship status include: "started," "go back on," "added," "decided to stop," "response," "underwent," "restarted," "did well," "held," "stopped," "showed," "placed on," "ran out of," "changed," "status post," "break from," "given," "discontinued," "received," "placed," "tolerated," "switched," "been on," "finished," "failed," "took," "improved," "was progressing," "administered," "reduced," "completed," "delivered," "was on," "been off," "treated," "had been taking," "initiated," "replaced," "is back on," "resuming," "tolerating," "continuation," "refill," "has been taking," "remains," "seems to be," "now on," "discontinue," "continue," "responding," "cont on," "discontinuing," "resume," "is on," "improving," "currently," "current," "concurrent," "continuing," "continues," "adding," "next cycle," "add," "will provide," "planning on taking," "to start," "proceed," "switch," "prescribed," "move forward," "will be changing," "is due," "will add," "will switch," "will be delivered," "plan to start," "start," "is to get," "ordered," "to add," "cleared for," "is off of," "continued to receive," "switching," "maintenance," "began," "was off," and/or "since starting."

In some embodiments, non-limiting signal terms for a "negative" relationship status include: "recommend," "recommending," "recommendations," "consider using," "suggestion," "potential treatment," "recommendation," "consider," "suggested," "potential candidate," "opportunity," "eligible," "consideration," "suggest," "may benefit," "recommended," "suggestive," "suggesting," "refused," "not a candidate," "has not," "not recommended," "would treat," "was to be," "declined," "NOT," "cannot," "never," "missed," "should be avoided," and/or "did not."

In some embodiments, each respective relationship status in the plurality of relationship statuses is associated with a corresponding set of signal terms in a plurality of signal terms. In some such embodiments, the method further includes, for each respective training text span in the corresponding set of training text spans, for each respective relationship status in the plurality of relationship statuses: when one or more signal terms in the corresponding set of signal terms is determined to be present in the respective training text span, determining a presence or absence of one or more disqualifier terms, in a plurality of disqualifier terms, in the respective training text span. In some such embodiments, when no disqualifier terms are present in the respective training text span, a respective label is assigned to the respective training text span that labels the respective training text span as having the respective relationship status, and when the one or more disqualifier terms are present in the respective training text span, a respective label is assigned to the respective training text span that labels the respective training text span as not having the respective relationship status. In some embodiments, when no signal term in the corresponding set of signal terms is present in the respective training text span, a respective label is assigned to the respective training text span that labels the respective training text span as not having the respective relationship status.

Accordingly, in some embodiments, labels are assigned to training text spans based on the presence or absence of one or more signal-bearing terms and/or one or more disqualifier terms. In some embodiments, the plurality of disqualifier terms comprises a negation term (e.g., no, not, never, etc.). Non-limiting disqualifier terms include, for example, "no," "not," "never," "may," "might," "avoided," "should," "before starting," and/or "take by."

In some embodiments, all or a portion of the plurality of disqualifier terms is manually compiled. In some embodiments, the plurality of disqualifier terms comprises one or more N-grams in the plurality of N-grams.

In some embodiments, all or a portion of the plurality of signal terms is manually compiled. In some embodiments, the plurality of signal terms comprises one or more N-grams in the plurality of N-grams.

Active Learning Loop and Curation

As described above, in some embodiments, the model includes a plurality of parameters that comprises, for each respective N-gram in the plurality of N-grams, for at least a first relationship status, a corresponding parameter that indicates a strength of association between the respective N-gram and at least the first relationship status.

Accordingly, in some such embodiments, model parameters correspond to N-gram importance, and are useful for identifying highly positively activated N-grams (e.g., signal-bearing N-grams), highly negatively activated N-grams (e.g., disqualifying N-grams), and/or irrelevant N-grams. In some embodiments, one or more parameters in the plurality of parameters that correspond to a respective N-gram in the plurality of N-grams are used to curate the plurality of N-grams.

In particular, in some embodiments, the method further includes, after the adjusting (iii) (e.g., during model training), curating the plurality of N-grams by a procedure comprising, for each respective N-gram in the plurality of N-grams, evaluating, in the plurality of parameters, a respective subset of parameters associated with the respective N-gram against one or more parameter threshold criteria. In some such embodiments, when the respective subset of parameters satisfies at least a first parameter threshold criterion in the one or more parameter threshold criteria, the respective N-gram is retained in the plurality of N-grams, and when the respective subset of parameters satisfies at least a second parameter threshold criterion in the one or more parameter threshold criteria, the respective N-gram is removed from the plurality of N-grams.

In some embodiments, a respective subset of parameters satisfies a respective parameter threshold criterion (e.g., a first, second, third, fourth, fifth, or any subsequent parameter threshold criterion) when one or more parameters in the respective subset of parameters is higher than a threshold value that represents the parameter threshold criterion. In some embodiments, a respective subset of parameters satisfies a respective parameter threshold criterion (e.g., a first, second, third, fourth, fifth, or any subsequent parameter threshold criterion) when one or more parameters in the respective subset of parameters is lower than a threshold value that represents the parameter threshold criterion. In some implementations, the threshold value delineates a target percentage of parameter values in the plurality of parameters. For instance, in some embodiments, the threshold value is selected as a minimum parameter value that falls within a target percentage of top-ranking parameter values (e.g., top-ranking parameter values ranked from highest to lowest value). In some embodiments, the threshold value is selected as a maximum parameter value that falls within a target percentage of lowest ranking parameter values (e.g., lowest ranking parameter values ranked from highest to lowest value). In some embodiments, the target percentage of parameter values (e.g., top X percent and/or bottom X percent) is at least 1%, at least 5%, at least 10%, at least 20%, at least 30%, at least 40%, at least 50%, at least 60%, or at least 70%. In some embodiments, the target percentage of parameter values (e.g., top X percent and/or bottom X percent) is no more than 80%, no more than 70%, no more than 60%, no more than 50%, no more than 40%, no more than 30%, no more than 20%, no more than 10%, or no more than 5%. In some embodiments, the target percentage of parameter values (e.g., top X percent and/or bottom X percent) is from 1% to 10%, from 5% to 20%, from 1% to 30%, from 20% to 50%, or from 30% to 80%. In some embodiments, the target percentage of parameter values (e.g., top X percent and/or bottom X percent) falls within another range starting no lower than 1% and ending no higher than 80%.

In some embodiments, a respective subset of parameters satisfies a respective parameter threshold criterion when one or more parameters in the respective subset of parameters has an absolute value that is higher than a threshold value that represents the parameter threshold criterion. In some embodiments, a respective subset of parameters satisfies a respective parameter threshold criterion when one or more parameters in the respective subset of parameters has an absolute value that is lower than a threshold value that represents the parameter threshold criterion. In some implementations, the threshold value delineates a target percentage of absolute parameter values in the plurality of parameters. For instance, in some embodiments, the threshold value is selected as a minimum absolute parameter value that falls within a target percentage of top-ranking absolute parameter values (e.g., top-ranking absolute parameter values ranked from highest to lowest value). In some embodiments, the threshold value is selected as a maximum absolute parameter value that falls within a target percentage of lowest ranking absolute parameter values (e.g., lowest ranking absolute parameter values ranked from highest to lowest value). In some embodiments, the target percentage of absolute parameter values (e.g., top X percent and/or bottom X percent) is at least 1%, at least 5%, at least 10%, at least 20%, at least 30%, at least 40%, at least 50%, at least 60%, or at least 70%. In some embodiments, the target percentage of absolute parameter values (e.g., top X percent and/or bottom X percent) is no more than 80%, no more than 70%, no more than 60%, no more than 50%, no more than 40%, no more than 30%, no more than 20%, no more than 10%, or no more than 5%. In some embodiments, the target percentage of absolute parameter values (e.g., top X percent and/or bottom X percent) is from 1% to 10%, from 5% to 20%, from 1% to 30%, from 20% to 50%, or from 30% to 80%. In some embodiments, the target percentage of absolute parameter values (e.g., top X percent and/or bottom X percent) falls within another range starting no lower than 1% and ending no higher than 80%.

In some embodiments, the evaluating the respective subset of parameters associated with the respective N-gram against the one or more parameter threshold criteria includes obtaining a measure of central tendency for the respective subset of parameters. Non-limiting examples of measures of central tendency include an arithmetic mean, weighted mean, midrange, midhinge, trimean, geometric mean, geometric median, Winsorized mean, median, and mode of the distribution of values.

Figure 6:
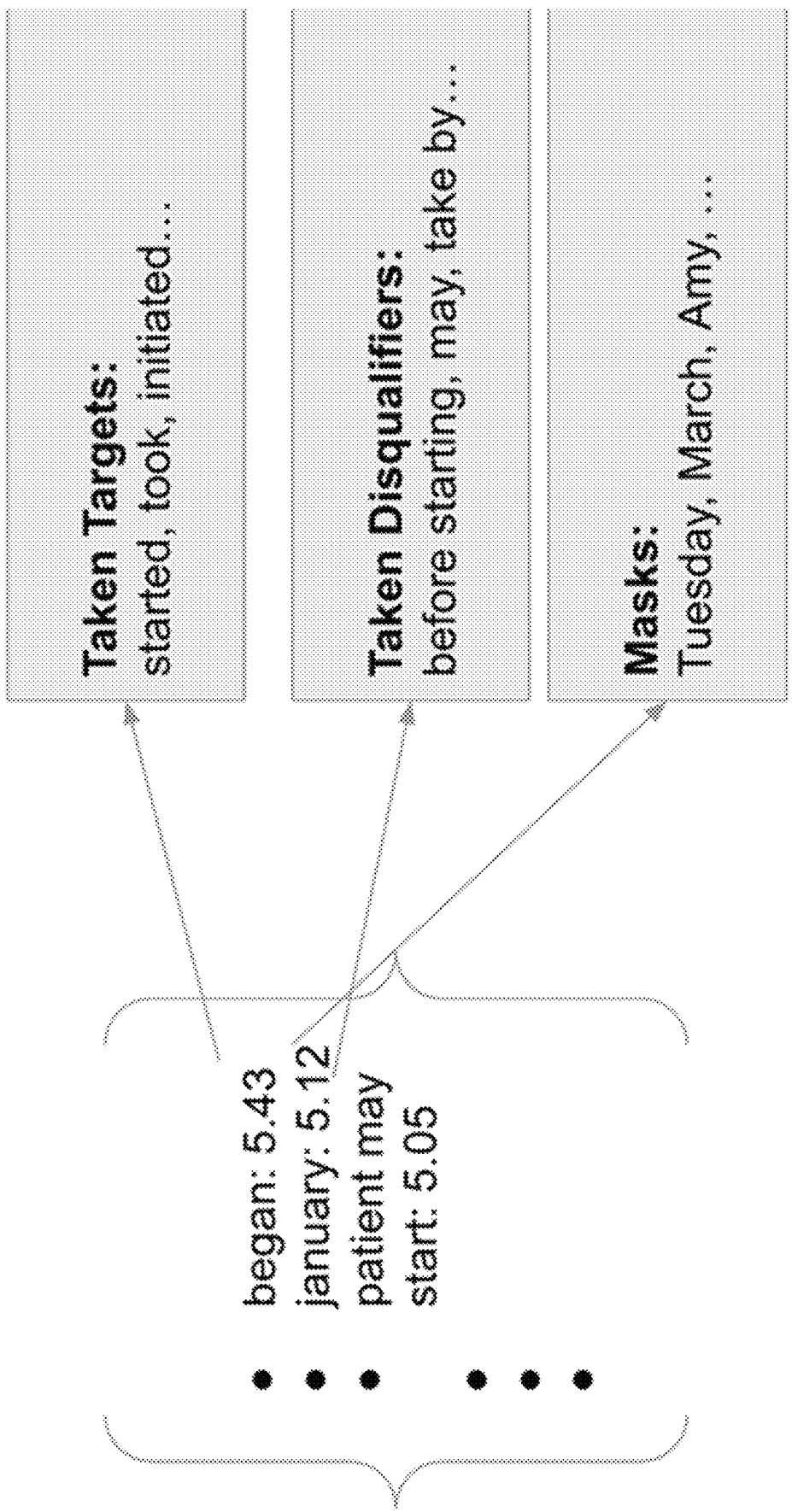
FIG. 6 illustrates an example schematic for an active learning procedure for use in determining a relationship between a first subject and a first health entity, in accordance with some embodiments of the present disclosure.

In some embodiments, one or more parameters in the plurality of parameters that correspond to a respective N-gram in the plurality of N-grams are used to curate one or more of the plurality of signal terms, the plurality of disqualifier terms, and the plurality of masking terms. An example schematic of signal term, disqualifier term, and masking term curation for active learning is depicted in FIG. 6.

In some embodiments, the method further includes, when the respective subset of parameters satisfies at least a third parameter threshold criterion, adding the respective N-gram to at least a corresponding set of signal terms for the first relationship status. For instance, in some implementations, a respective N-gram is added to the plurality of signal terms for a respective relationship status when one or more parameters in the respective subset of parameters, or one or more absolute values thereof, is higher or lower than a threshold value that represents the third parameter threshold criterion (e.g., N-grams are added to signal terms when the associated parameters are sufficiently high, indicating strong positive weighting).

In some embodiments, the method further includes, when the respective subset of parameters satisfies at least a fourth parameter threshold criterion, adding the respective N-gram to a plurality of disqualifier terms. For instance, in some implementations, a respective N-gram is added to the plurality of disqualifier terms when one or more parameters in the respective subset of parameters, or one or more absolute values thereof, is higher or lower than a threshold value that represents the fourth parameter threshold criterion (e.g., N-grams are added to disqualifier terms when the associated parameters are sufficiently low, indicating strong negative weighting).

In some embodiments, the method further includes, when the respective subset of parameters satisfies at least a fifth parameter threshold criterion in the one or more parameter threshold criteria, adding the respective N-gram to a plurality of masking terms.

For instance, in some implementations, a respective N-gram is added to the plurality of masking terms when one or more parameters in the respective subset of parameters, or one or more absolute values thereof, is higher or lower than a threshold value that represents the fifth parameter threshold criterion (e.g., N-grams are added to masking terms when the associated parameters are sufficiently low in absolute value, indicating weak weighting for both positive and negative statuses). Non-limiting masking terms include, for example, "Tuesday," "March," and/or "Amy."

In some embodiments, a respective parameter threshold criterion is applied to achieve a plurality of outcomes. For instance, in some embodiments, the first parameter threshold criterion and the third parameter threshold are the same, such that strongly weighted parameters for a respective N-gram results in the retention of the respective N-gram in the plurality of N-grams as well as the addition of the respective N-gram to a plurality of signal terms. Similarly, in some embodiments, the second parameter threshold criterion and the fourth parameter threshold criterion are the same, such that poorly weighted parameters for a respective N-gram results in the removal of the respective N-gram from the plurality of N-grams as well as the addition of the respective N-gram to the plurality of disqualifier terms.

In some embodiments, one or more initialization parameters in the plurality of initialization parameters (e.g., obtained as described in the section entitled "Initializing parameters," above) are used to curate one or more of the plurality of N-grams, the plurality of signal terms, the plurality of disqualifier terms, and the plurality of masking terms.

In some embodiments, the method further includes, prior to the inputting (i), curating the plurality of N-grams by a procedure comprising, for each respective N-gram in the plurality of N-grams, evaluating, in a plurality of initialization parameters, a respective subset of initialization parameters associated with the respective N-gram against one or more parameter threshold criteria. In some such embodiments, when the respective subset of initialization parameters satisfies at least a first parameter threshold criterion in the one or more parameter threshold criteria, the respective N-gram is retained in the plurality of N-grams, and when the respective subset of initialization parameters satisfies at least a second parameter threshold criterion in the one or more parameter threshold criteria, the respective N-gram is removed from the plurality of N-grams.

In some embodiments, the method further includes, when the respective subset of initialization parameters satisfies at least a third parameter threshold criterion, adding the respective N-gram to at least a corresponding set of signal terms for the first relationship status.

In some embodiments, the method further includes, when the respective subset of initialization parameters satisfies at least a fourth parameter threshold criterion, adding the respective N-gram to a plurality of disqualifier terms.

In some embodiments, the method further includes, when the respective subset of initialization parameters satisfies at least a fifth parameter threshold criterion in the one or more parameter threshold criteria, adding the respective N-gram to a plurality of masking terms.

In some embodiments, the curating generates a curated plurality of N-grams. In some embodiments, the method further includes using the curated plurality of N-grams to train the untrained or partially trained model. In some embodiments, the method further includes repeating the curating for each training iteration in a plurality of training iterations.

Example Applications

As described above, in some embodiments, when the corresponding first prediction indicates that the respective text span is associated with a first relationship status in a plurality of relationship statuses, the first subject is determined to have the first relationship status with respect to the first health entity.

For example, in some embodiments, when the corresponding first prediction indicates that the respective text span is associated with the "positive" relationship status, the first subject is determined to be "positively" associated with the first health entity. Consider an example embodiment where the first health entity is a medication and the relationship to be determined is "taken" (e.g., is subject taking Tagrisso?). In such an embodiment, the EHR of the subject is queried in accordance with the methods disclosed herein to determine whether one or more text spans in the EHR generates a prediction that positively associates the medication with the relationship (e.g., yes—"taken"). When such a prediction is generated, the subject is deemed to be "taking" the medication type. Thus, in some embodiments, the method further includes using at least the first prediction to determine the relationship between the first subject and the first health entity.

Figure 7:
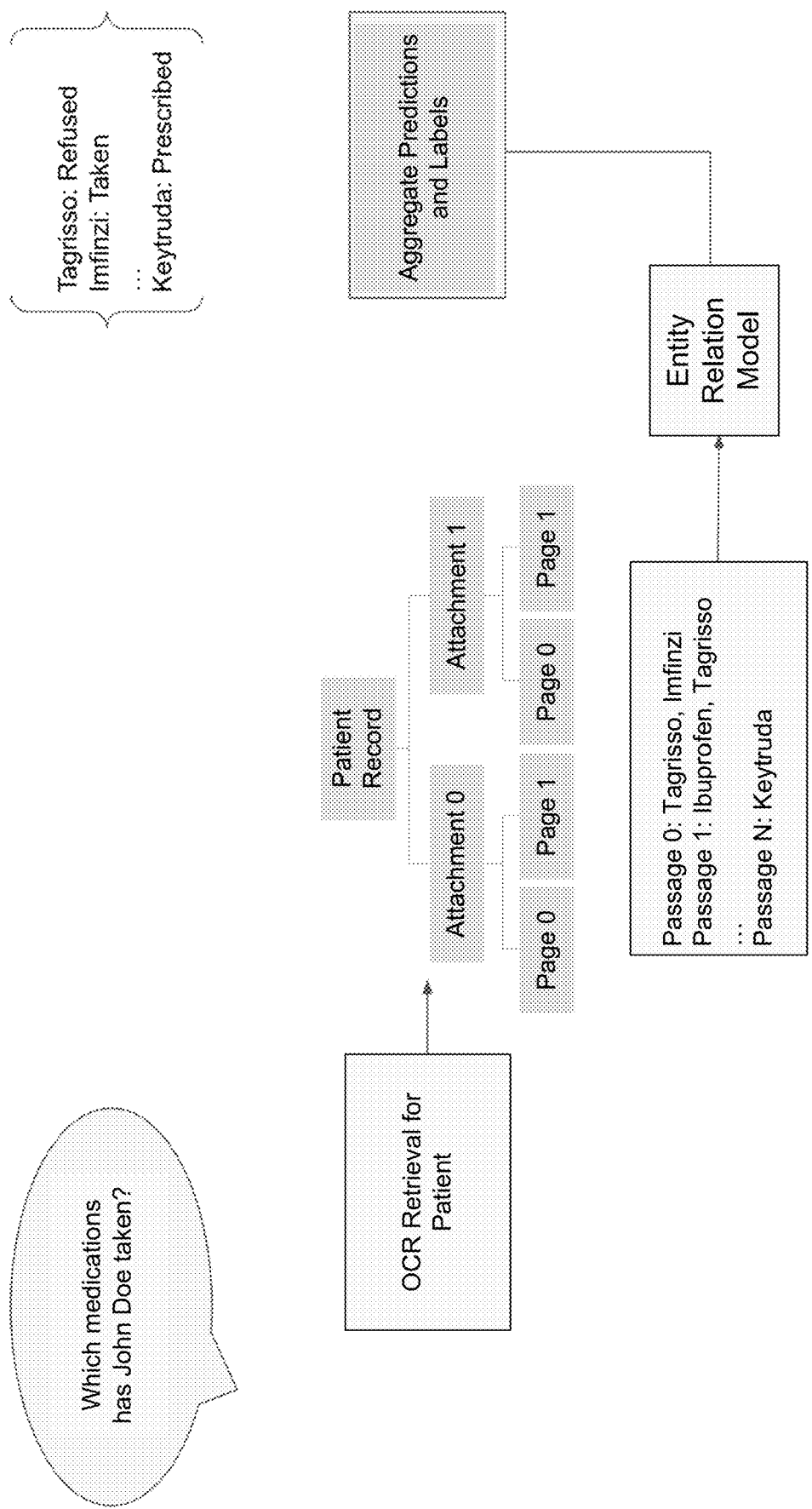
FIG. 7 illustrates an example schematic of a pipeline for subject-level prediction of health entity relationships, in accordance with some embodiments of the present disclosure.

An example schematic of a pipeline for subject-level prediction of health entity relationships is illustrated in FIG. 7. The relationship to be queried is established (e.g., "which medications has subject (John Doe) taken?"). An EHR for the patient is obtained and preprocessed, optionally by performing optical character recognition, subdivision into sections (e.g., attachments and/or pages), and/or subdivision into text spans (e.g., passages). Text spans are filtered for expressions related to one or more health entities (e.g., mentions of Tagrisso, Imfinzi, Ibuprofen, and/or Keytruda), and the set of filtered text spans is inputted into the model (e.g., entity relation model). Predictions are obtained as outputs from the model and optionally aggregated using one or more heuristic rules to assign a respective relationship status to each respective text span. Predictions are then used to determine the subject-health entity relationship (e.g., Tagrisso: refused, Imfinzi: taken, Keytruda: prescribed).

In some embodiments, a relationship between a respective subject and a respective health entity is provided in a report (e.g., to a patient, clinician, researcher, and/or medical practitioner).

In some implementations, relationships between a respective subject and a respective health entity are of use for clinical and/or research based decision-making. Advantageously, in some implementations, the relationship between a respective subject and a respective health entity provides valuable input into clinical decision-making for diseases or drug treatment side effects associated with such. In some implementations, a relationship between a respective subject and a respective health entity is used to provide a clinical or research based recommendation, such as a recommendation for clinical correlation and/or monitoring of a patient.

In some embodiments, a relationship between a respective subject and a respective health entity is used to provide a basis for decisions such as providing data surrounding health conditions (e.g., diseases, biomarkers, medications, and/or manifestations or responses thereof) that can be targeted by a therapy, drug, and/or any modification or variation in dosage or administration thereof. In some embodiments, a relationship between a respective subject and a respective health entity is used to provide a basis for prognosis and/or diagnosis. Additionally, in some embodiments, a relationship between a respective subject and a respective health entity is used to provide quantitative basis for decisions involved in research-based decision-making.

In some embodiments, the health entity is a biomarker, and the methods and systems disclosed herein further comprise developing a companion diagnostic test for a treatment method of a disease or health condition based on the positive or negative association of one or more biomarkers with a subject, as determined in an EHR for the subject. In some implementations, the development of companion diagnostic tests considers at least two factors. First, as discussed above, there are a wide range of diseases associated with particular biomarkers, and as this is an active area of research, more and more diseases are being linked to such associations. There is also an association of higher probability of adverse events with particular drug treatments in the presence of certain biomarkers. Companion diagnostics are defined by the FDA as a device that "provides information that is essential for the safe and effective use of a corresponding drug or biological product," and such companion diagnostics aim to help health care professionals determine whether the benefits of a specific therapy outweigh potential side effects or risks (see, Nalley, Oncology Times, 39(9):24-26, discussing the use of companion diagnostics in the oncology setting). Thus, in certain embodiments, the methods and systems disclosed herein are used to provide information that can be associated with the safe and effective use of a corresponding medication.

In some embodiments, the methods described herein are used to determine that a subject has a sensitivity to a therapeutic agent for a disease (e.g., cancer). For instance, in some embodiments, the methods described herein are used to determine that the subject is at risk of toxicity or adverse drug reaction in response to treatment with the therapeutic agent.

In some embodiments, the methods described herein include providing a respective recommendation for a therapy, in a plurality of recommendations, for treating a disease in the subject based on the results of the determination of a subject-health entity relationship (e.g., where the health entity is a disease). In some embodiments, the methods described herein include administering the recommended therapy for treating the disease to the subject. In some embodiments, the recommendation for a therapy is a selection of one or more therapeutic agents in a plurality of therapeutic agents. In some embodiments, the recommendation for a therapy is a change from a first therapeutic agent to a second therapeutic agent other than the first therapeutic agent. In some embodiments, the recommendation for a therapy is a change in dosage for one or more therapeutic agents. In some embodiments, the recommendation for a therapy is a cessation of treatment by a therapeutic agent.

In some embodiments, the disclosure provides methods and systems for determining the eligibility of a subject (e.g., a cancer patient) for a clinical trial (e.g., for a candidate cancer pharmaceutical agent).

In some embodiments, the methods and systems disclosed herein are incorporated into a pipeline for clinical and/or research-based decision-making. In some embodiments, any one or more of the further methods and applications disclosed herein are performed based on the determination of any number or combination of suitable health entities related to the subject, as will be apparent to one skilled in the art. For instance, in some such embodiments, the pipeline is used for one or more of preparing reports; developing companion diagnostic tests; associating treatment responses with particular treatment methods for disease; determining associations between positive treatment responses and the presence or absence of, e.g., biomarkers; identifying patients likely to benefit from particular treatment methods; diagnosing sensitivity or resistance to therapeutic agents; recommending treatments for disease; administering treatment for disease; and/or selecting patients for clinical trials.

In some embodiments, the disclosure provides methods and systems for providing a report for a subject (e.g., to a subject, clinician, researcher, and/or medical practitioner). In some such embodiments, the report includes any of the information disclosed herein. For instance, in some embodiments, the report includes information relating to companion diagnostic tests; associations of treatment responses to particular treatment methods for disease; associations between positive treatment responses and the presence or absence of, e.g., biomarkers; predicted responses of the subject to particular treatment methods; sensitivity or resistance to therapeutic agents; recommended treatments; treatment administration status; clinical trials; or a combination thereof.

Example Embodiments for Model Architectures.

Another aspect of the present disclosure provides a model for determining a relationship between a first subject and a first health entity for use in clinical decision-making. In some embodiments, the model includes a first layer comprising a plurality of parameters, where the first layer (i) receives, as input, a first sparse tensor including, for each respective text span in a set of text spans, a respective scoring representation for the respective text span, and (ii) generates, as output, a tensor dot product obtained using the first sparse tensor and the plurality of parameters. In some embodiments, the plurality of parameters is formatted as a second sparse tensor, and the tensor dot product is formatted as a third sparse tensor.

In some embodiments, the model further includes a softmax activation function that (i) receives, as input, the tensor dot product obtained using the first sparse tensor and the plurality of parameters and (ii) generates, as output, for each respective text span in the set of text spans, at least a corresponding first prediction that the respective text span is associated with the first health entity.

In some embodiments, the model is utilized with any of the embodiments for subjects, health entities, EHRs, text spans, preprocessing, outputs, scoring representations (e.g., N-grams and N-gram counts), model architectures, parameters, model training, initialization, obtaining and/or assigning labels, and/or active learning procedures disclosed herein (see, e.g., the section entitled "Example Embodiments for Determining Subject-Entity Relationships," above), or any substitutions, modifications, additions, deletions, and/or combinations thereof, as will be apparent to one skilled in the art.

Example Embodiments for Model Training.

Another aspect of the present disclosure provides a method for training a model to determine a relationship between a first subject and a first health entity in an electronic health record for use in clinical decision-making. In some embodiments, the method includes obtaining, for each respective training text span in a set of training text spans for a plurality of training electronic health records, (i) for each respective N-gram in a plurality of N-grams, a corresponding count of occurrences that the respective N-gram occurs in the respective training text span, and (ii) a corresponding label, in a plurality of labels for the respective training text span, that represents a truth status for at least a first relationship status in a plurality of relationship statuses. In some embodiments, each respective training text span in the corresponding set of training text spans comprises a respective expression related to the first health entity.

In some implementations, a training procedure is performed, including (i) inputting, into an untrained or partially trained model comprising a plurality of parameters, for each respective training text span in the set of training text spans, for each respective N-gram in the plurality of N-grams, the corresponding count of occurrences that the respective N-gram occurs in the respective training text span, thereby obtaining at least a corresponding first prediction that the respective training text span is associated with the first relationship status in the plurality of relationship statuses. The training procedure further includes (ii) determining a differentiable prediction performance score for the untrained or partially trained model using, for each respective training text span in the corresponding set of training text spans, a comparison between at least the first prediction and the corresponding label for the respective training text span. The training procedure further includes (iii) adjusting, in a back-propagation, one or more parameters in the plurality of parameters using a minimization of a loss function for the differentiable prediction performance score.

In some embodiments, the method further includes, after the adjusting (iii), curating the plurality of N-grams by a procedure including, for each respective N-gram in the plurality of N-grams, evaluating, in the plurality of parameters, a respective subset of parameters associated with the respective N-gram against one or more parameter threshold criteria. When the respective subset of parameters satisfies at least a first parameter threshold criterion in the one or more parameter threshold criteria, the respective N-gram is retained in the plurality of N-grams. When the respective subset of parameters satisfies at least a second parameter threshold criterion in the one or more parameter threshold criteria, the respective N-gram is removed from the plurality of N-grams. Non-limiting examples of suitable parameter threshold criteria are further described, for instance, in the section entitled "Active learning loop and curation," above.

In some embodiments, the method further includes, prior to the inputting (i), curating the plurality of N-grams by a procedure including, for each respective N-gram in the plurality of N-grams, evaluating, in a plurality of initialization parameters, a respective subset of initialization parameters associated with the respective N-gram against one or more parameter threshold criteria. When the respective subset of initialization parameters satisfies at least a first parameter threshold criterion in the one or more parameter threshold criteria, the respective N-gram is retained in the plurality of N-grams. When the respective subset of initialization parameters satisfies at least a second parameter threshold criterion in the one or more parameter threshold criteria, the respective N-gram is removed from the plurality of N-grams. Non-limiting examples of suitable parameter threshold criteria are further described, for instance, in the section entitled "Active learning loop and curation," above.

In some embodiments, the method for training a model is utilized with any of the embodiments for subjects, health entities, EHRs, text spans, preprocessing, outputs, scoring representations (e.g., N-grams and N-gram counts), model architectures, parameters, model training, initialization, obtaining and/or assigning labels, and/or active learning procedures disclosed herein (see, e.g., the section entitled "Example Embodiments for Determining Subject-Entity Relationships," above), or any substitutions, modifications, additions, deletions, and/or combinations thereof, as will be apparent to one skilled in the art.

Additional Aspects.

Another aspect of the present disclosure provides a computer system including one or more processors, memory, and one or more programs, where the one or more programs are stored in the memory and are configured to be executed by the one or more processors. In some embodiments, the one or more programs include instructions for a method of determining a relationship between a first subject and a first health entity for use in clinical decision-making.

In some embodiments, the method includes receiving, for the first subject, a first electronic health record comprising a plurality of sections, where each respective section in the plurality of sections is delineated by a corresponding section header. In some embodiments, the method further includes detecting, for each respective section in the plurality of sections, the corresponding section header, thereby splitting the first electronic health record into the plurality of sections.

In some embodiments, a plurality of text spans for the first electronic health record is obtained by subdividing each respective section, in the plurality of sections, into a corresponding one or more text spans. In some embodiments, the plurality of text spans is filtered by language pattern recognition to identify a set of text spans, where each respective text span in the set of text spans includes a respective expression related to the first health entity.

In some embodiments, for each respective text span in the set of text spans, the corresponding natural language context of the respective expression related to the first health entity is evaluated, thereby obtaining a respective scoring representation of the corresponding natural language context of the respective expression. In some implementations, for each respective text span in the set of text spans, the respective scoring representation for the respective text span is inputted into a model comprising a plurality of parameters. In some embodiments, the method further includes receiving, as output from the model, for each respective text span in the set of text spans, at least a corresponding first prediction that the respective text span is associated with the first health entity.

Another aspect of the present disclosure provides a computer readable storage medium storing one or more programs, the one or more programs including instructions that, when executed by an electronic device with one or more processors and a memory, cause the electronic device to perform a method for determining a relationship between a first subject and a first health entity for use in clinical decision-making.

In some embodiments, the method includes receiving, for the first subject, a first electronic health record comprising a plurality of sections, where each respective section in the plurality of sections is delineated by a corresponding section header. In some embodiments, the method further includes detecting, for each respective section in the plurality of sections, the corresponding section header, thereby splitting the first electronic health record into the plurality of sections. In some embodiments, a plurality of text spans for the first electronic health record is obtained by subdividing each respective section, in the plurality of sections, into a corresponding one or more text spans. In some embodiments, the plurality of text spans is filtered by language pattern recognition to identify a set of text spans, where each respective text span in the set of text spans includes a respective expression related to the first health entity.

In some embodiments, for each respective text span in the set of text spans, the corresponding natural language context of the respective expression related to the first health entity is evaluated, thereby obtaining a respective scoring representation of the corresponding natural language context of the respective expression. In some implementations, for each respective text span in the set of text spans, the respective scoring representation for the respective text span is inputted into a model comprising a plurality of parameters. In some embodiments, the method further includes receiving, as output from the model, for each respective text span in the set of text spans, at least a corresponding first prediction that the respective text span is associated with the first health entity.

Yet another aspect of the present disclosure provides a computer system for determining a relationship between a first subject and a first health entity for use in clinical decision-making, the computer system comprising one or more processors and memory addressable by the one or more processors, the memory storing at least one program for execution by the one or more processors, the at least one program comprising instructions for performing any of the methods disclosed above.

Still another aspect of the present disclosure provides a non-transitory computer readable storage medium, where the non-transitory computer readable storage medium stores instructions, which when executed by a computer system, cause the computer system to determine a relationship between a first subject and a first health entity for use in clinical decision-making, comprising any of the methods disclosed above.

Distributed Diagnostic and Clinical Environment

Figure 2:
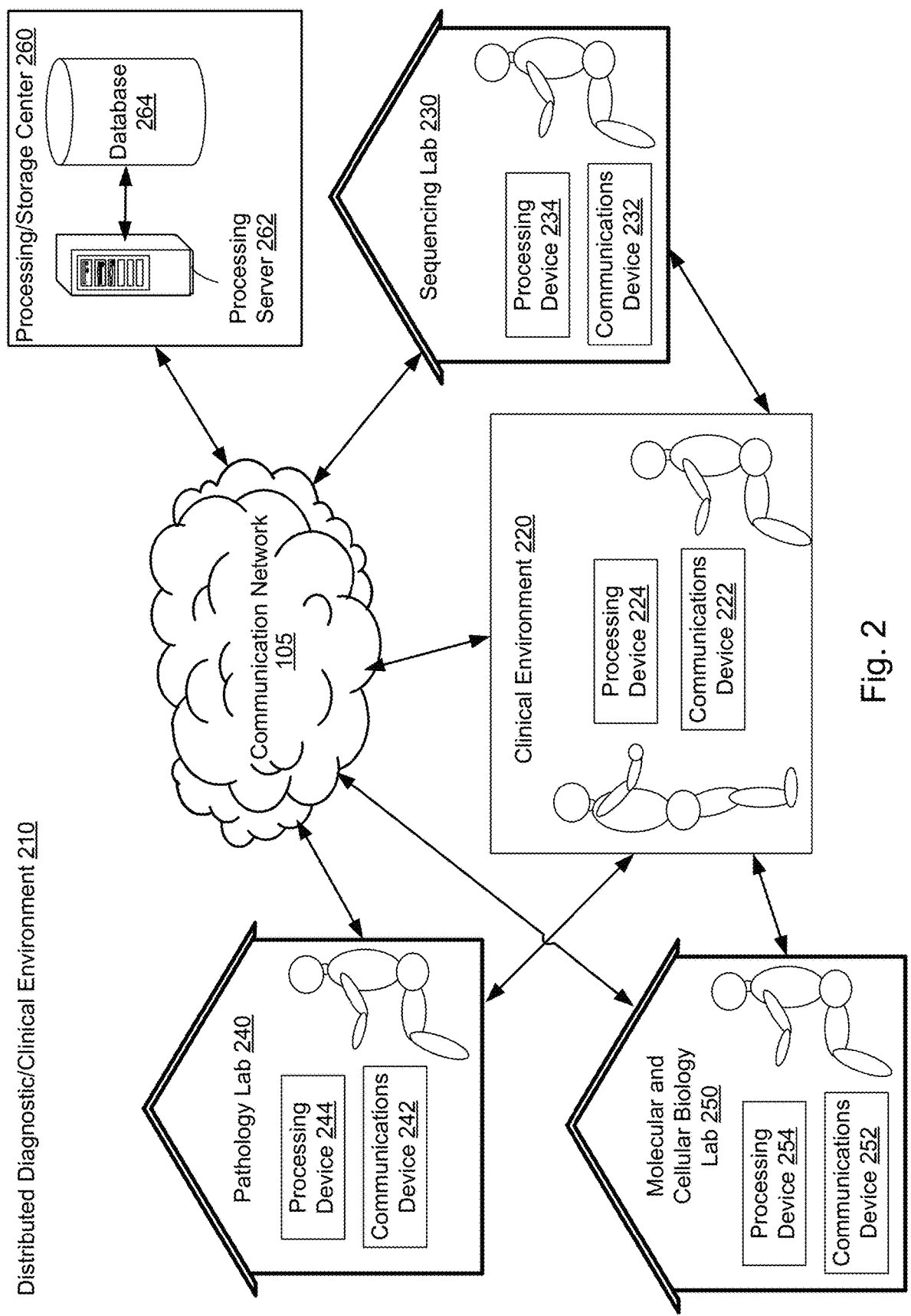
FIG. 2 illustrates an example of a distributed diagnostic environment for collecting and evaluating patient data for the purpose of precision medicine, in accordance with some embodiments of the present disclosure.
Figure 3A:
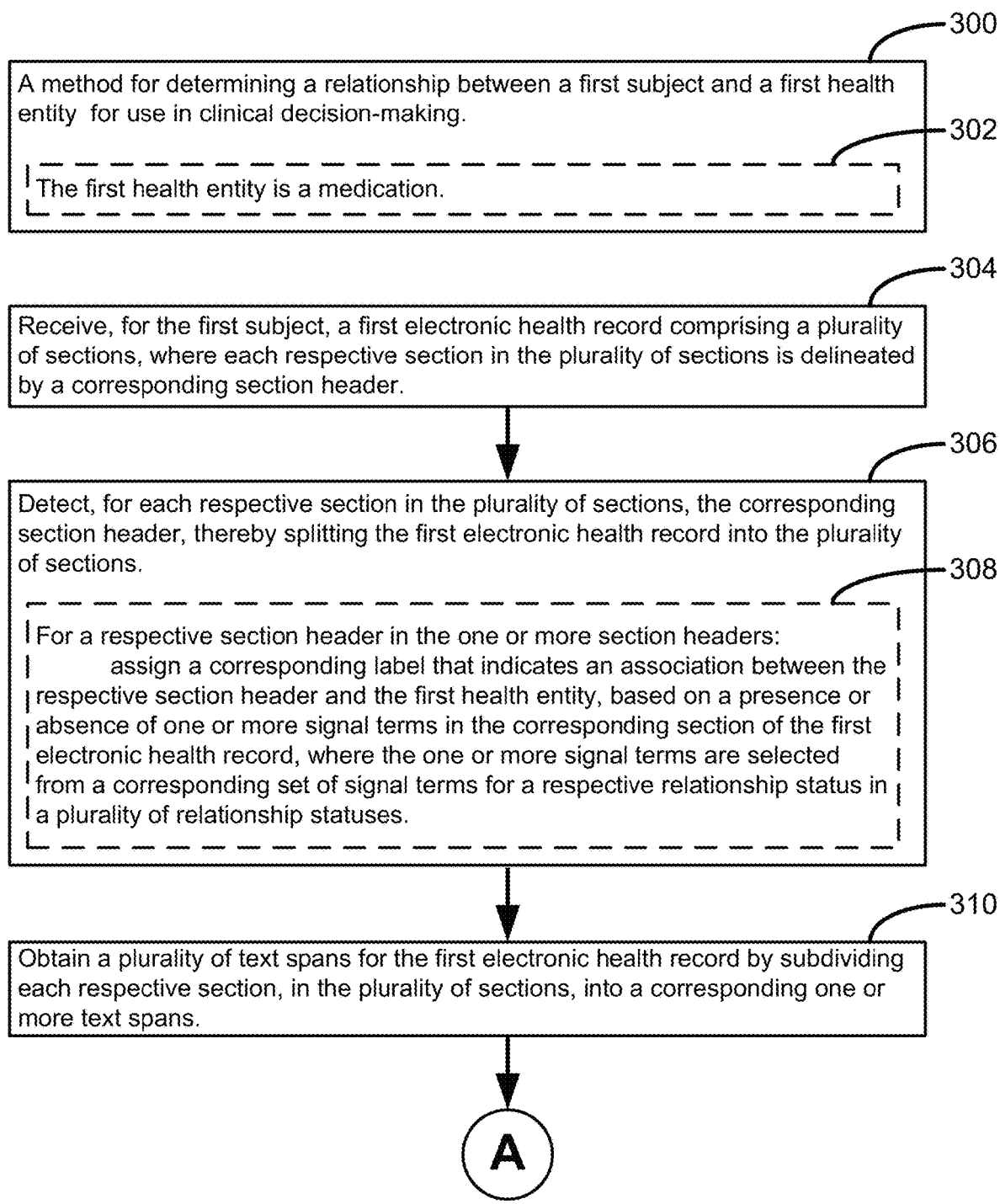
FIGS. 3A, 3B, 3C, and 3D collectively provide a flow chart of processes and features for determining a relationship between a first subject and a first health entity, in which dashed boxes represent optional portions of the method, in accordance with some embodiments of the present disclosure.
Figure 3B:
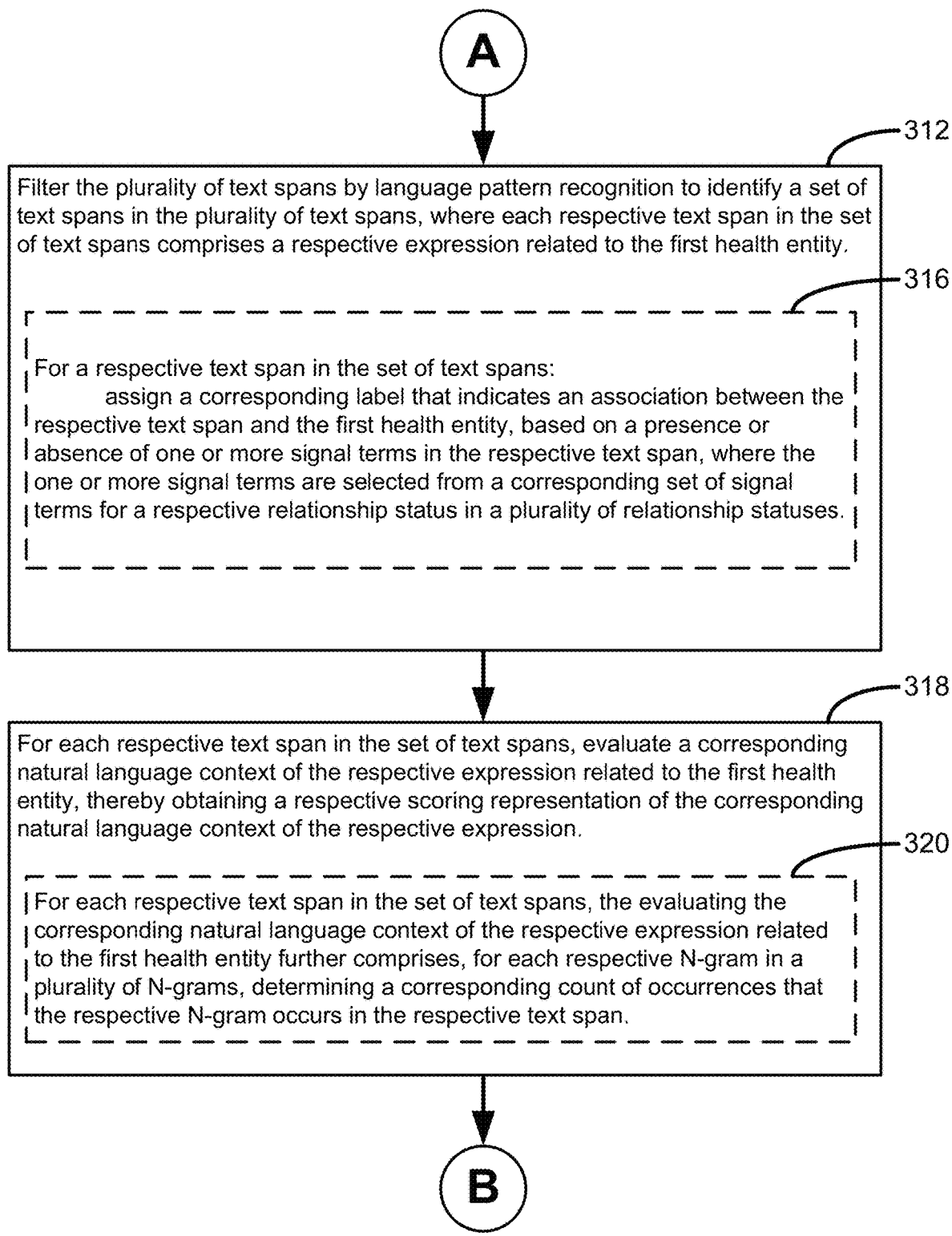
Figure 3C:
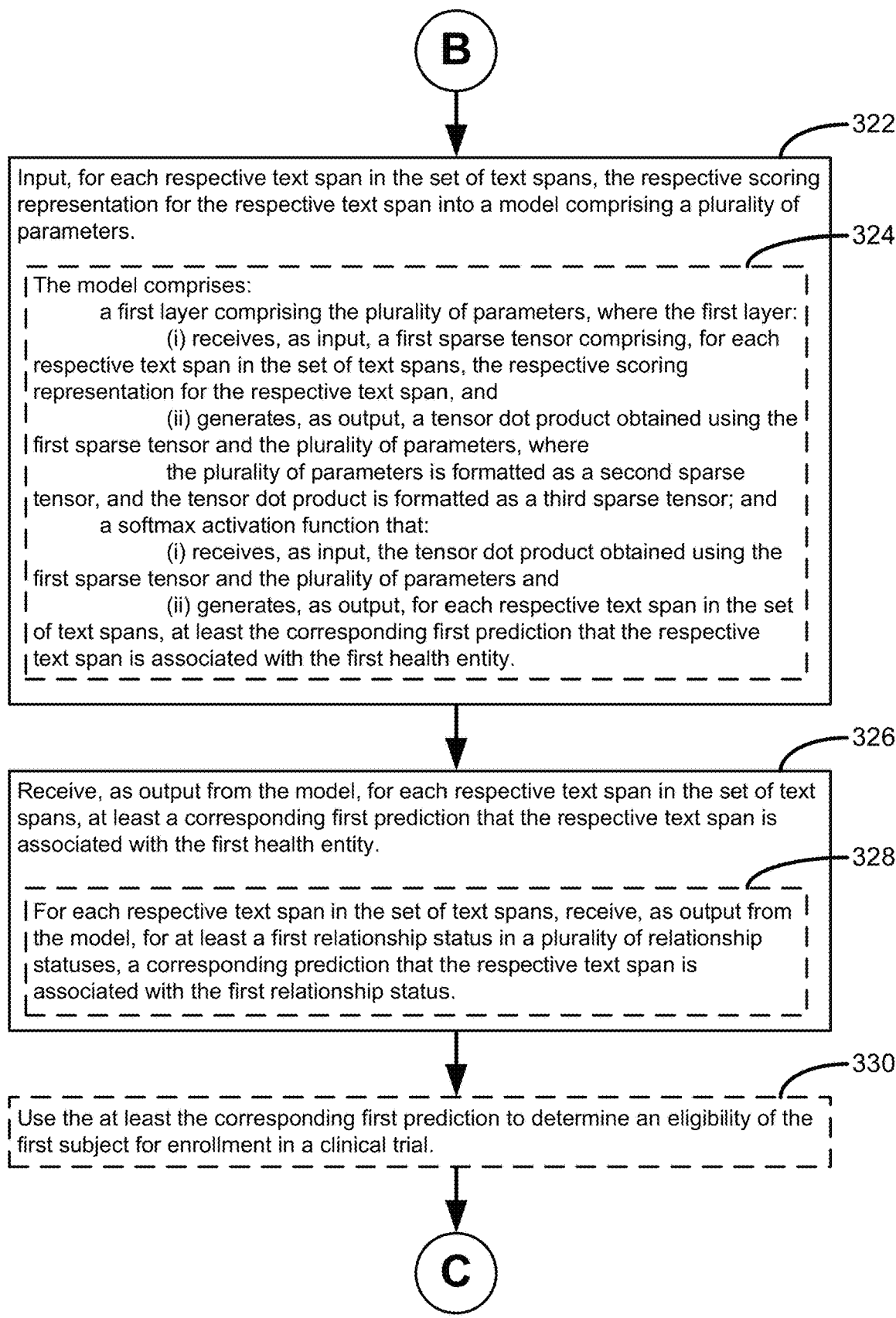
Figure 3D:
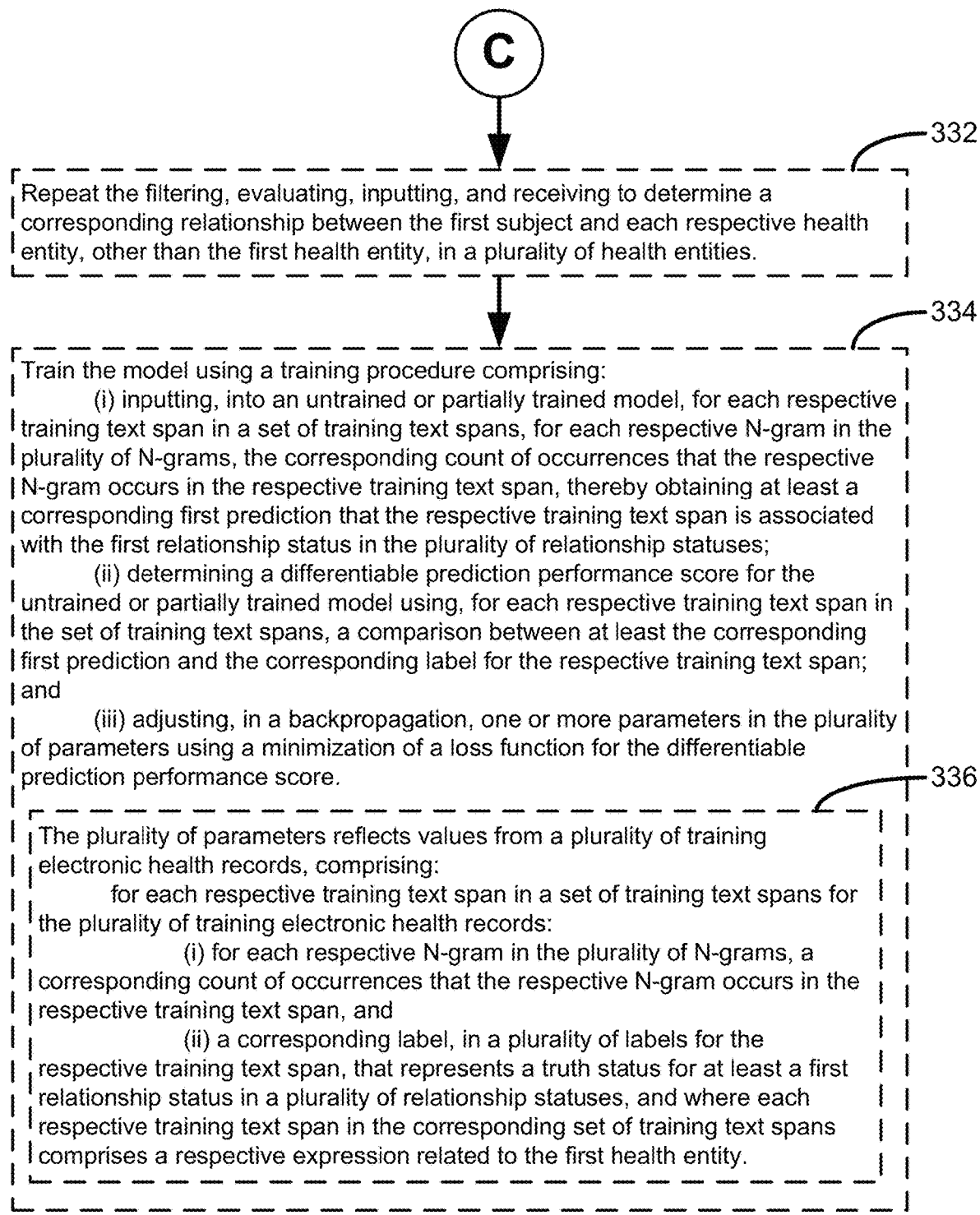

In some aspects, the methods and systems described herein for providing clinical support for a disease or disorder are performed and/or utilized across a distributed diagnostic/clinical environment, e.g., as illustrated in FIG. 2. However, in some embodiments, the improved methods and systems described herein for supporting clinical decisions in personalized medicine (e.g., by determining a relationship status of a subject with a health entity, etc.) are performed and/or utilized at a single location, e.g., at a single computing system or environment, although ancillary procedures supporting the methods described herein, and/or procedures that make further use of the results of the methods described herein, can be performed across a distributed diagnostic/clinical environment.

FIG. 2 illustrates an example of a distributed diagnostic/clinical environment 210. In some embodiments, the distributed diagnostic/clinical environment is connected via communication network 105. In some embodiments, one or more biological samples are collected from a subject in clinical environment 220, e.g., a doctor's office, hospital, or medical clinic, or at a home health care environment (not depicted). In some embodiments, one or more biological samples, or portions thereof, are processed within the clinical environment 220 where collection occurred, using a processing device 224, e.g., a nucleic acid sequencer for obtaining sequencing data, a microscope for obtaining pathology data, a mass spectrometer for obtaining proteomic data, etc. In some embodiments, one or more biological samples, or portions thereof, are sent to one or more external environments, e.g., sequencing lab 230, pathology lab 240, and/or molecular biology lab 250, each of which includes a processing device 234, 244, and 254, respectively, to generate biological or clinical data for the subject. Each environment optionally includes a communications device 222, 232, 242, and 252, respectively, for communicating biological or clinical data about the subject to a processing server 262 and/or database 264, which may be located in yet another environment, e.g., processing/storage center 260. Thus, in some embodiments, different portions of the systems and methods described herein are fulfilled by different processing devices located in different physical environments.

Accordingly, in some embodiments, methods and systems for providing clinical support for personalized therapy, e.g., with improved extraction of subject-entity relationships in electronic health records, are performed and/or utilized across one or more environments, as illustrated in FIG. 2.

Digital and Laboratory Health Care Platform

In some embodiments, the methods and systems described herein are utilized in combination with, or as part of, a digital and laboratory health care platform that is generally targeted to medical care and research. It should be understood that many uses of the methods and systems described above, in combination with such a platform, are possible. One example of such a platform is described in U.S. Patent Publication No. 2021/0090694, titled "Data Based Cancer Research and Treatment Systems and Methods," and published Mar. 25, 2021, the content of which is incorporated herein by reference, in its entirety, for all purposes.

For example, an implementation of one or more embodiments of the methods and systems as described above includes microservices constituting a digital and laboratory health care platform supporting analysis of cancer biopsy samples to provide clinical support for personalized cancer therapy. Embodiments include a single microservice for executing and delivering analysis of cancer biopsy samples to clinical support for personalized cancer therapy and/or include a plurality of microservices each having a particular role, which together implement one or more of the embodiments above. In one example, a first microservice executes sequence analysis in order to deliver genomic features to a second microservice for curating clinical support for personalized cancer therapy based on the identified features. Similarly, the second microservice executes therapeutic analysis of the curated clinical support to deliver recommended therapeutic modalities, according to various embodiments described herein.

Where embodiments above are executed in one or more micro-services with or as part of a digital and laboratory health care platform, one or more of such micro-services, in some implementations, are part of an order management system that orchestrates the sequence of events as needed at the appropriate time and in the appropriate order necessary to instantiate embodiments above. A microservices-based order management system is disclosed, for example, in U.S. Patent Publication No. 2020/80365232, titled "Adaptive Order Fulfillment and Tracking Methods and Systems," and published Nov. 19, 2020, the content of which is incorporated herein by reference, in its entirety, for all purposes.

For example, continuing with the above first and second microservices, an order management system, in some embodiments, notifies the first microservice that an order for curating clinical support for personalized cancer therapy has been received and is ready for processing. In some embodiments, the first microservice executes and notifies the order management system once the delivery of genomic features for the patient is ready for the second microservice. Furthermore, the order management system identifies that execution parameters (prerequisites) for the second microservice are satisfied, including that the first microservice has completed, and notifies the second microservice that it may continue processing the order to curate clinical support for personalized cancer therapy, according to various embodiments described herein.

Where the digital and laboratory health care platform further includes a genetic analyzer system, the genetic analyzer system, in some embodiments, includes targeted panels and/or sequencing probes. An example of a targeted panel is disclosed, for example, in U.S. Patent Publication No. 2021/0090694, titled "Data Based Cancer Research and Treatment Systems and Methods," and published Mar. 25, 2021, which is incorporated herein by reference and in its entirety for all purposes. An example of a targeted panel for sequencing cell-free (cf) DNA and determining various characteristics of a specimen based on the sequencing is disclosed, for example, in U.S. patent application Ser. No. 17/179,086, titled "Methods And Systems For Dynamic Variant Thresholding In A Liquid Biopsy Assay," and filed Feb. 18, 2021; U.S. patent application Ser. No. 17/179,267, titled "Estimation Of Circulating Tumor Fraction Using Off-Target Reads Of Targeted-Panel Sequencing," and filed Feb. 18, 2021; and U.S. patent application Ser. No. 17/179,279, titled "Methods And Systems For Refining Copy Number Variation In A Liquid Biopsy Assay," and filed Feb. 18, 2021, each of which is incorporated herein by reference and in its entirety for all purposes. In one example, targeted panels enable the delivery of next generation sequencing results for providing clinical support for personalized cancer therapy, according to various embodiments described herein. An example of the design of next-generation sequencing probes is disclosed, for example, in U.S. Patent Publication No. 2021/0115511, titled "Systems and Methods for Next Generation Sequencing Uniform Probe Design," and published Jun. 22, 2021; and U.S. patent application Ser. No. 17/323,986, titled "Systems and Methods for Next Generation Sequencing Uniform Probe Design," and filed May 18, 2021, each of which is incorporated herein by reference and in its entirety for all purposes.

Where the digital and laboratory health care platform further includes an epigenetic analyzer system, the epigenetic analyzer system, in some embodiments, analyzes specimens to determine their epigenetic characteristics and further uses that information for monitoring a patient over time. An example of an epigenetic analyzer system is disclosed, for example, in U.S. patent application Ser. No. 17/352,231, titled "Molecular Response And Progression Detection From Circulating Cell Free DNA," and filed Jun. 18, 2021, which is incorporated herein by reference and in its entirety for all purposes.

Where the digital and laboratory health care platform further includes a bioinformatics pipeline, the methods and systems described above, in some embodiments, are utilized after completion or substantial completion of the systems and methods utilized in the bioinformatics pipeline. As one example, the bioinformatics pipeline receives next-generation genetic sequencing results and returns a set of binary files, such as one or more BAM files, reflecting nucleic acid (e.g., cfDNA, DNA and/or RNA) read counts aligned to a reference genome. The methods and systems described above, in some embodiments, are utilized, for example, to ingest the cfDNA, DNA and/or RNA read counts and produce genomic features as a result.

When the digital and laboratory health care platform further includes an RNA data normalizer, in some embodiments, any RNA read counts are normalized before processing embodiments as described above. An example of an RNA data normalizer is disclosed, for example, in Publication No. 2020/0098448, titled "Methods of Normalizing and Correcting RNA Expression Data," and published Mar. 26, 2020, which is incorporated herein by reference and in its entirety for all purposes.

When the digital and laboratory health care platform further includes a genetic data deconvolver, in some embodiments, any system and method for deconvoluting is utilized for analyzing genetic data associated with a specimen having two or more biological components to determine the contribution of each component to the genetic data and/or determine what genetic data would be associated with any component of the specimen if it were purified. An example of a genetic data deconvolver is disclosed, for example, in U.S. Patent Publication No. 2020/0210852, published Jul. 2, 2020, and PCT/US19/69161, filed Dec. 31, 2019, both titled "Transcriptome Deconvolution of Metastatic Tissue Samples"; and U.S. patent application Ser. No. 17/074,984, titled "Calculating Cell-type RNA Profiles for Diagnosis and Treatment," and filed Oct. 20, 2020, the content of each of which is incorporated herein by reference, in its entirety, for all purposes.

When the digital and laboratory health care platform further includes an automated RNA expression caller, in some embodiments, RNA expression levels are adjusted to be expressed as a value relative to a reference expression level, which is often done in order to prepare multiple RNA expression data sets for analysis to avoid artifacts caused when the data sets have differences because they have not been generated by using the same methods, equipment, and/or reagents. An example of an automated RNA expression caller is disclosed, for example, in U.S. Pat. No. 11,043,283, titled "Systems and Methods for Automating RNA Expression Calls in a Cancer Prediction Pipeline," and issued Jun. 22, 2021, which is incorporated herein by reference and in its entirety for all purposes.

In some embodiments, RNA expression levels are adjusted to be expressed as a value relative to a reference expression level. Furthermore, multiple RNA expression data sets, in some embodiments, are adjusted, prepared, and/or combined for analysis and/or adjusted to avoid artifacts caused when the data sets have differences because they have not been generated by using the same methods, equipment, and/or reagents. An example of RNA data set adjustment, preparation, and/or combination is disclosed, for example, in U.S. patent application Ser. No. 17/405,025, titled "Systems and Methods for Homogenization of Disparate Datasets," and filed Aug. 18, 2021, which is hereby incorporated herein by reference in its entirety.

The digital and laboratory health care platform, in some embodiments, further includes one or more insight engines to deliver information, characteristics, or determinations related to a disease state that can be based on genetic and/or clinical data associated with a patient and/or specimen. Exemplary insight engines include, without limitation, a tumor of unknown origin engine, a human leukocyte antigen (HLA) loss of homozygosity (LOH) engine, a tumor mutational burden engine, a PD-L1 status engine, a homologous recombination deficiency engine, a cellular pathway activation report engine, an immune infiltration engine, a microsatellite instability engine, a pathogen infection status engine, a T cell receptor or B cell receptor profiling engine, a line of therapy engine, a metastatic prediction engine, and/or an IO progression risk prediction engine, and so forth. An example tumor of unknown origin engine is disclosed, for example, in U.S. patent application Ser. No. 15/930,234, titled "Systems and Methods for Multi-Label Cancer Classification," and filed May 12, 2020, which is incorporated herein by reference and in its entirety for all purposes. An example of an HLA LOH engine is disclosed, for example, in U.S. Pat. No. 11,081,210, titled "Detection of Human Leukocyte Antigen Class I Loss of Heterozygosity in Solid Tumor Types by NGS DNA Sequencing," and issued Aug. 3, 2021, which is incorporated herein by reference and in its entirety for all purposes. An additional example of an HLA LOH engine is disclosed, for example, in U.S. patent application Ser. No. 17/304,940, titled "Detection of Human Leukocyte Antigen Loss of Heterozygosity," and filed Jun. 28, 2021, which is incorporated herein by reference and in its entirety for all purposes. An example of a tumor mutational burden (TMB) engine is disclosed, for example, in U.S. Patent Publication No. 2020/0258601, titled "Targeted-Panel Tumor Mutational Burden Calculation Systems and Methods," and published Aug. 13, 2020, which is incorporated herein by reference and in its entirety for all purposes. An example of a PD-L1 status engine is disclosed, for example, in U.S. Patent Publication No. 2020/0395097, titled "A Pan-Cancer Model to Predict The PD-L1 Status of a Cancer Cell Sample Using RNA Expression Data and Other Patient Data," and published Dec. 17, 2020, which is incorporated herein by reference and in its entirety for all purposes. An additional example of a PD-L1 status engine is disclosed, for example, in U.S. Pat. No. 10,957,041, titled "Determining Biomarkers from Histopathology Slide Images," issued Mar. 23, 2021, which is incorporated herein by reference and in its entirety for all purposes. An example of a homologous recombination deficiency engine is disclosed, for example, in U.S. Pat. No. 10,975,445, titled "An Integrative Machine-Learning Framework to Predict Homologous Recombination Deficiency," and issued Apr. 13, 2021, which is incorporated herein by reference and in its entirety for all purposes. An additional example of a homologous recombination deficiency engine is disclosed, for example, in U.S. patent application Ser. No. 17/492,518, titled "Systems and Methods for Predicting Homologous Recombination Deficiency Status of a Specimen," filed Oct. 1, 2021, which is incorporated herein by reference and in its entirety for all purposes. An example of a cellular pathway activation report engine is disclosed, for example, in U.S. Patent Publication No. 2021/0057042, titled "Systems And Methods For Detecting Cellular Pathway Dysregulation In Cancer Specimens," and published Feb. 25, 2021, which is incorporated herein by reference and in its entirety for all purposes. An example of an immune infiltration engine is disclosed, for example, in U.S. Patent Publication No. 2020/0075169, titled "A Multi-Modal Approach to Predicting Immune Infiltration Based on Integrated RNA Expression and Imaging Features," and published Mar. 5, 2020, which is incorporated herein by reference and in its entirety for all purposes. An example of an MSI engine is disclosed, for example, in U.S. Patent Publication No. 2020/0118644, titled "Microsatellite Instability Determination System and Related Methods," and published Apr. 16, 2020, which is incorporated herein by reference and in its entirety for all purposes. An additional example of an MSI engine is disclosed, for example, in U.S. Patent Publication No. 2021/0098078, titled "Systems and Methods for Detecting Microsatellite Instability of a Cancer Using a Liquid Biopsy," and published Apr. 1, 2021, which is incorporated herein by reference and in its entirety for all purposes. An example of a pathogen infection status engine is disclosed, for example, in U.S. Pat. No. 11,043,304, titled "Systems And Methods For Using Sequencing Data For Pathogen Detection," and issued Jun. 22, 2021, which is incorporated herein by reference and in its entirety for all purposes. Another example of a pathogen infection status engine is disclosed, for example, in PCT/US21/18619, titled "Systems And Methods For Detecting Viral DNA From Sequencing," and filed Feb. 18, 2021, which is incorporated herein by reference and in its entirety for all purposes. An example of a T cell receptor or B cell receptor profiling engine is disclosed, for example, in U.S. patent application Ser. No. 17/302,030, titled "TCR/BCR Profiling Using Enrichment with Pools of Capture Probes," and filed Apr. 21, 2021, which is incorporated herein by reference and in its entirety for all purposes. An example of a line of therapy engine is disclosed, for example, in U.S. Patent Publication No. 2021/0057071, titled "Unsupervised Learning And Prediction Of Lines Of Therapy From High-Dimensional Longitudinal Medications Data," and published Feb. 25, 2021, which is incorporated herein by reference and in its entirety for all purposes. An example of a metastatic prediction engine is disclosed, for example, in U.S. Pat. No. 11,145,416, titled "Predicting likelihood and site of metastasis from patient records," and issued Oct. 12, 2021, which is incorporated herein by reference and in its entirety for all purposes. An example of an IO progression risk prediction engine is disclosed, for example, in U.S. patent application Ser. No. 17/455,876, titled "Determination of Cytotoxic Gene Signature and Associated Systems and Methods For Response Prediction and Treatment," and filed Nov. 19, 2021, which is incorporated herein by reference and in its entirety for all purposes.

In some embodiments, any data generated by the systems and methods and/or the digital and laboratory health care platform is downloadable by the user. In one example, the data is downloaded as a CSV file comprising clinical and/or molecular data associated with tests, data structuring, and/or other services ordered by the user. In various embodiments, this is accomplished by aggregating clinical data in a system backend, and making it available via a portal. This data, in some embodiments, includes not only variants and RNA expression data, but also data associated with immunotherapy markers such as MSI and TMB, as well as RNA fusions.

When the digital and laboratory health care platform further includes a device comprising a microphone and speaker for receiving audible queries or instructions from a user and delivering answers or other information, in some embodiments, the methods and systems described above are utilized to add data to a database the device can access. An example of such a device is disclosed, for example, in U.S. Patent Publication No. 2020/0335102, titled "Collaborative Artificial Intelligence Method And System," and published Oct. 22, 2020, which is incorporated herein by reference and in its entirety for all purposes.

In some embodiments, when the digital and laboratory health care platform further includes a mobile application for ingesting patient records, including genomic sequencing records and/or results even if they were not generated by the same digital and laboratory health care platform, the methods and systems described above are utilized to receive ingested patient records. An example of such a mobile application is disclosed, for example, in U.S. Pat. No. 10,395,772, titled "Mobile Supplementation, Extraction, And Analysis Of Health Records," and issued Aug. 27, 2019, which is incorporated herein by reference and in its entirety for all purposes. Another example of such a mobile application is disclosed, for example, in U.S. Pat. No. 10,902,952, titled "Mobile Supplementation, Extraction, And Analysis Of Health Records," and issued Jan. 26, 2021, which is incorporated herein by reference and in its entirety for all purposes. Another example of such a mobile application is disclosed, for example, in U.S. Patent Publication No. 2021/0151192, titled "Mobile Supplementation, Extraction, And Analysis Of Health Records," and filed May 20, 2021, which is incorporated herein by reference and in its entirety for all purposes.

When the digital and laboratory health care platform further includes a report generation engine, in some embodiments, the methods and systems described above are utilized to create a summary report of a patient's genetic profile and the results of one or more insight engines for presentation to a physician. For instance, in some embodiments, the report provides, to the physician, information about the extent to which the specimen that was sequenced contained tumor or normal tissue from a first organ, a second organ, a third organ, and so forth. For example, the report provides, in some implementations, a genetic profile for each of the tissue types, tumors, or organs in the specimen. In some embodiments, the genetic profile represents genetic sequences present in the tissue type, tumor, or organ and includes variants, expression levels, information about gene products, or other information that could be derived from genetic analysis of a tissue, tumor, or organ.

In some embodiments, the report includes therapies and/or clinical trials matched based on a portion or all of the genetic profile or insight engine findings and summaries. For example, in some embodiments, the therapies are matched according to the systems and methods disclosed in U.S. patent application Ser. No. 17/546,049, titled "Artificial Intelligence Driven Therapy Curation and Prioritization," filed Dec. 9, 2021, which is incorporated herein by reference and in its entirety for all purposes. For example, the clinical trials are matched, in some embodiments, according to the systems and methods disclosed in U.S. Patent Publication No. 2020/0381087, titled "Systems and Methods of Clinical Trial Evaluation," published Dec. 3, 2020, which is incorporated herein by reference and in its entirety for all purposes.

In some embodiments, the report includes a comparison of the results (for example, molecular and/or clinical patient data) to a database of results from many specimens. Example methods and systems for comparing results to a database of results are disclosed in U.S. Patent Publication No. 2020/0135303 titled "User Interface, System, And Method For Cohort Analysis" and published Apr. 30, 2020, and U.S. Patent Publication No. 2020/0211716 titled "A Method and Process for Predicting and Analyzing Patient Cohort Response, Progression and Survival," and published Jul. 2, 2020, each of which is incorporated herein by reference and in its entirety for all purposes. The information, in some embodiments, is used, sometimes in conjunction with similar information from additional specimens and/or clinical response information, to match therapies likely to be successful in treating a patient, discover biomarkers or design a clinical trial.

When the digital and laboratory health care platform further includes organoids developed in connection with the platform (for example, from the patient specimen), in some embodiments, the methods and systems are used to further evaluate genetic sequencing data derived from an organoid and/or the organoid sensitivity, especially to therapies matched based on a portion or all of the information determined by the systems and methods, including predicted cancer type(s), likely tumor origin(s), etc. In some embodiments, these therapies are tested on the organoid, derivatives of that organoid, and/or similar organoids to determine an organoid's sensitivity to those therapies. In some embodiments, any of the results are included in a report. If the organoid is associated with a patient specimen, in some embodiments, any of the results are included in a report associated with that patient and/or delivered to the patient or patient's physician or clinician. In various examples, organoids are cultured and tested according to the systems and methods disclosed in U.S. Patent Publication No. 2021/0155989, titled "Tumor Organoid Culture Compositions, Systems, and Methods," published May 27, 2021; PCT/US20/56930, titled "Systems and Methods for Predicting Therapeutic Sensitivity," filed Oct. 22, 2020; U.S. Patent Publication No. 2021/0172931, titled "Large Scale Organoid Analysis," published Jun. 10, 2021; PCT/US2020/063619, titled "Systems and Methods for High Throughput Drug Screening," filed Dec. 7, 2020 and U.S. patent application Ser. No. 17/301,975, titled "Artificial Fluorescent Image Systems and Methods," filed Apr. 20, 2021, each of which are incorporated herein by reference and in their entirety for all purposes. In one example, the drug sensitivity assays are especially informative if the systems and methods return results that match with a variety of therapies, or multiple results (for example, multiple equally or similarly likely cancer types or tumor origins), each matching with at least one therapy.

When the digital and laboratory health care platform further includes application of one or more of the above in combination with or as part of a medical device or a laboratory developed test that is generally targeted to medical care and research, in some embodiments, such laboratory developed test or medical device results are enhanced and personalized through the use of artificial intelligence. An example of laboratory developed tests, especially those that can be enhanced by artificial intelligence, is disclosed, for example, in U.S. Patent Publication No. 2021/0118559, titled "Artificial Intelligence Assisted Precision Medicine Enhancements to Standardized Laboratory Diagnostic Testing," and published Apr. 22, 2021, which is incorporated herein by reference and in its entirety for all purposes.

It should be understood that the examples given above are illustrative and do not limit the uses of the systems and methods described herein in combination with a digital and laboratory health care platform.

In some embodiments, the results of the bioinformatics pipeline are provided for report generation. Report generation includes, in some embodiments, variant science analysis, including the interpretation of variants (including somatic and germline variants as applicable) for pathogenic and biological significance. In some embodiments, the variant science analysis also estimates microsatellite instability (MSI) or tumor mutational burden. Targeted treatments are, in some embodiments, identified based on gene, variant, and cancer type, for further consideration and review by the ordering physician. In some aspects, clinical trials are, in some embodiments, identified for which the patient may be eligible, based on mutations, cancer type, and/or clinical history. In some embodiments, subsequent validation occurs, after which the report may be finalized for sign-out and delivery. In some embodiments, a first or second report includes additional data provided through a clinical dataflow 202, such as patient progress notes, pathology reports, imaging reports, and other relevant documents. Such clinical data is ingested, reviewed, and abstracted based on a predefined set of curation rules. The clinical data is then populated into the patient's clinical history timeline for report generation.

Further details on clinical report generation are disclosed in U.S. patent application Ser. No. 16/789,363 (PCT/US20/180002), filed Feb. 12, 2020, the content of which is incorporated herein by reference, in its entirety, for all purposes.

EXAMPLES

Example 1—Example Comparison of Patient-Entity Relation Extraction Using Sparse N-Gram Modeling Versus Conventional Methods Extraction of relationships between patients and health entities was performed in a comparative assay between the systems and methods disclosed herein and a conventional method using named entity recognition (NER).

A trained model was obtained, having a sparse single-layer model architecture in accordance with an embodiment of the present disclosure. In particular, the model included a first layer having a plurality of parameters in sparse tensor format, where the plurality of parameters included, for each respective N-gram in a plurality of N-grams, for each respective relationship status in a plurality of relationship statuses (positive, negative, and null), a strength of association between the respective N-gram and the respective relationship status. The first layer received, as input, a data structure in sparse tensor format, where the data structure included, for each respective text span in a set of text spans, for each respective N-gram in the plurality of N-grams, a corresponding count of occurrences of the respective N-gram in the respective text span. The first layer further generated, as output, a tensor dot product between the parameters tensor and the input tensor, where the tensor dot product included a corresponding entry for each respective text span in the set of text spans, for each respective relationship status in the plurality of relationship statuses. See, for example, FIG. 5 for a representative illustration of the sparse single-layer model architecture used in the assay.

The model further included a softmax activation function that accepted, as input, the tensor dot product outputted by the first layer and determined, as output, for each respective text span in the set of text spans, for each respective relationship status in the plurality of relationship statuses, a corresponding prediction that the respective text span was associated with the respective relationship status (e.g., positive, negative, or null).

Prior to obtaining the trained model, the model was initialized with a plurality of initialization parameters obtained as the log-likelihood differences of conditional N-gram counts and total N-gram counts in a plurality of training electronic health records (EHRs), in accordance with an embodiment of the present disclosure. In particular, conditional N-gram counts were obtained by determining the number of times that a given N-gram appeared in the same text span as an indication of a given relationship status, such as a signal term that can be used to label the respective text span as being positively associated with the respective relationship status. Total N-gram counts were obtained by determining the number of times that the given N-gram appeared across all of the training EHRs in the plurality of training EHRs. Then, the plurality of initialization parameters was populated as, for each respective N-gram in the plurality of N-grams, for each respective relationship indicator in the plurality of relationship indicators, the difference between the log probability of observing respective N-gram coinciding with the respective relationship status and the log probability of observing the respective N-gram in the training corpus.

The model was trained to detect subject-medication relationships in EHRs, such that the plurality of relationship statuses referred to positive or negative association with one or more medications. A third relationship status, null, indicated a lack of sufficient information to determine a positive or negative status. An active learning loop was employed to further strengthen the model's performance by curating signal terms, disqualifier terms, and masking terms to better obtain and/or assign labels and remove uninformative N-grams. During training, N-grams were further curated by removing N-grams that contained a mention of medication names.

Test inputs to the trained model included test text spans from test patient EHRs, where test text spans were obtained by preprocessing the test patient EHRs into sentences or portions of sentences that contained mentions of medications, in accordance with an embodiment of the present disclosure. For instance, for a respective medication, text spans were obtained that contained a mention of the respective medication name, and the determination of N-gram counts within each of these text spans was performed to obtain a test input tensor. Accordingly, the analysis was performed for four medication types: Tagrisso, Imfinzi, Lynparza, and Enhertu. For Tagrisso, Imfinzi, and Lynparza, 25 individual EHRs were used as test samples for data preprocessing and input. For Enhertu, 23 individual EHRs were used. An input tensor was prepared for each respective test sample including, for each respective text span in the EHR that included a mention of the respective medication, for each respective N-gram in the plurality of N-grams, a corresponding count of occurrences of the respective N-gram in the respective text span. Performance of the model's ability to predict whether a text span was positively or negatively associated with the respective medication was measured using precision, recall, F1, and accuracy metrics. For instance, as described above, precision is calculated as TP/(TP+FP); recall is calculated as TP/(TP+FN); accuracy is calculated as (TP+TN)/(TP+TN+FP+FN); and F1 is calculated as 2*((Precision*Recall)/(Precision+Recall)) or TP/(TP+((FP+FN)/2)), where TP, TN, FP, and FN refer to counts of true positives, true negatives, false positives, and false negatives, respectively. Determination of TP, TN, FP, and FN were further based on labels obtained for each text span used in the test input tensors in accordance with an embodiment of the present disclosure. Performance metrics for the sparse single-layer model are shown in Table 1 below:

TABLE 1

Performance metrics for sparse single-layer model architecture

|  | Precision | Recall | F1 | Accuracy |
| --- | --- | --- | --- | --- |
| Tagrisso | 0.92 | 1.0 | 0.96 | 0.92 |
| Imfinzi | 0.83 | 1.0 | 0.91 | 0.83 |
| Enhertu | 1.0 | 1.0 | 1.0 | 1.0 |
| Lynparza | 0.72 | 1.0 | 0.84 | 0.72 |

For comparison, named entity recognition was also performed on test samples for Imfinzi and Tagrisso using a publicly available NLP tool with a patient relation heuristic for NER (see, e.g., Google Cloud Natural Language API, available on the Internet at cloud.google.com/natural-language and Devlin et al., 2018, "BERT: Pre-training of Deep Bidirectional Transformers for Language Understanding," arXiv: 1810.04805v2). Performance metrics, as measured using precision, recall, and F1 of the NLP tool are shown in Table 2 below. For statistical support, 261 test EHRs were used for data preprocessing and input into the NLP tool for Imfinzi, and 279 test EHRs were used for data preprocessing and input for Tagrisso (e.g., "Support").

TABLE 2

Performance metrics for NLP with patient relation heuristic

|  | Precision | Recall | F1 | Support |
| --- | --- | --- | --- | --- |
| Imfinzi | 0.87 | 0.85 | 0.86 | 261 |
| Tagrisso | 0.93 | 0.93 | 0.93 | 279 |

A comparison of the performance metrics using the sparse single-layer model and the commercially available NLP tool reveals that the sparse single-layer model achieved better performance in recall and F1 score for medications Imfinzi and Tagrisso. These results show that, in some embodiments, the systems and methods provided herein yield strong performance for medication relation extraction, beyond the ability of conventional approaches.

Example 2—Example Heuristic Rules for Predicting Relationship Statuses of Text Spans An example set of heuristic rules was established to assess the ability of a model to assign positive, negative, or null relationship statuses to text spans. A trained model for determining subject-medication relationships was obtained as described in Example 1, and a set of text spans was obtained by preprocessing a set of test patient EHRs, in accordance with an embodiment of the present disclosure. After inputting the set of text spans into the model, the trained model generated, for each respective text span in the set of text spans, for each respective relationship status in the plurality of relationship statuses, a corresponding probability that the respective text span is associated with the respective relationship status.

The example set of heuristic rules establishes that, for each respective text span in the set of text spans, the positive relationship status is assigned to the respective text span when one or more criteria are satisfied.

First criterion. In a first criterion, the respective text span is assigned the positive relationship status when i) the respective text span includes a corresponding label that labels the respective text span as having the positive relationship status, and ii) the corresponding probability for the positive relationship status a) satisfies a first prediction threshold or b) is undefined. In some embodiments, the probability for the positive relationship status satisfies the first prediction threshold when it is greater than the threshold. In some embodiments, the probability for the positive relationship status is determined to be undefined when the respective text span has insufficient length to be modeled or lacks sufficient information to determine a positive or negative status (e.g., "patient on").

Second criterion. In a second criterion, the respective text span is assigned the positive relationship status when i) the respective text span does include a corresponding label that labels the respective text span as having the positive relationship status, and ii) the corresponding probability for the positive relationship status satisfies a second prediction threshold. In some embodiments, the probability for the positive relationship status satisfies the second prediction threshold when it is greater than the threshold.

Third criterion. In a third criterion, the respective text span is assigned the positive relationship status when i) the respective text span is associated with a section header having a corresponding label that labels the section header as having the positive relationship status, ii) the corresponding probability for the positive relationship status satisfies a third prediction threshold, and iii) the corresponding probability for the positive relationship status exceeds the corresponding probability for the negative relationship status. In some embodiments, the probability for the positive relationship status satisfies the third prediction threshold when it is greater than the threshold.

The example set of heuristic rules further establishes that, for each respective text span in the set of text spans, the negative relationship status is assigned to the respective text span when neither the first, second, or third criteria are satisfied. The example set of heuristic rules further establishes that, for each respective text span in the set of text spans, the null status is assigned to the respective text span when the respective text span has insufficient length or lacks sufficient information to determine a positive or negative status.

Example elements, including text spans, outputs and labels, to which the example set of heuristic rules can be applied are shown in Table 3 below. "Entity" refers to a medication that is mentioned in the corresponding text span; "Text Span" refers to the text span obtained from preprocessing the EHRs and used for determining input features; "Label (Span)" refers to the label assigned to the respective text span; "Label (Head)" refers to the label assigned to an associated section header, if applicable; "Pos" refers to the probability for the positive relationship status outputted by the model; "Neg" refers to the probability for the negative relationship status outputted by the model; and "Null" refers to the probability for the null relationship status outputted by the model. If no section header was associated with the respective text span, or if no label could be determined for the associated section header, the entry for Label (Head) was "Null." These heuristic rules demonstrate an embodiment of using the predictions generated by the trained model to determine a relationship between a subject and a health entity in an EHR. Various other methods for determining relationships (e.g., assigning positive, negative, or null relationship statuses to text spans) are possible, as will be apparent to one skilled in the art.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

Another aspect of the present disclosure provides a computer system comprising one or more processors, and a non-transitory computer-readable medium including computer-executable instructions that, when executed by the one or more processors, cause the processors to perform a method according to any one of the embodiments disclosed herein, and/or any combinations, modifications, substitutions, additions, or deletions thereof as will be apparent to one skilled in the art.

Another aspect of the present disclosure provides a non-transitory computer-readable storage medium having stored thereon program code instructions that, when executed by a processor, cause the processor to perform the method according to any one of the embodiments disclosed herein, and/or any combinations, modifications, substitutions, additions, or deletions thereof as will be apparent to one skilled in the art.

TABLE 3

Example elements for application of heuristic rules.

| Entity | Text Span | Label (Span) | Label (Head) | Pos | Neg | Null |
|---|---|---|---|---|---|---|
| isovue | isovue-300 was administered IV | Negative | Null | 0.99950 | 1.06E−07 | 0.00049 |
| mucinex | will start mucinex | Positive | Null | 0.99986 | 6.59E−05 | 6.59E−05 |
| prednisone | dyspnea improving with current regimen of prednisone nebulizer treatment | Positive | Null | 0.99999 | 1.47E−08 | 9.35E−06 |
| coumadin | 2 post operative afib after lobectomy june completed 4 mo coumadin stopped April | Positive | Positive | 1 | 4.32E−13 | 1.76E−10 |
| eliquis | started on eliquis | Positive | Positive | 0.99989 | 1.05E−06 | 0.00010 |
| folfirinox | pt started on folfirinox | Positive | Positive | 0.99652 | 1.56E−08 | 0.00347 |
| folfirinox | folfirinox dose reduced | Positive | Positive | 0.98236 | 0.00029 | 0.01734 |
| folfirinox | tolerated dose modified folfirinox very poorly | Positive | Null | 0.90549 | 0.08467 | 0.00983 |
| zithromax | pt has completed zithromax and ceftin for pneumonia | Positive | Null | 0.99635 | 2.52E−05 | 0.00362 |
| cefuroxime | cefazolin or cefuroxime ordered for prophylaxis | Positive | Null | 0.99869 | 0.00086 | 0.00043 |
| hydroxyzine | pt is on pravastatin as well as hydroxyzine | Positive | Positive | 0.99759 | 2.46E−05 | 0.00238 |
| neupogen | the patient is on neupogen 480 mcg sub-q daily start PT OT nnutritional support | Positive | Null | 0.99999 | 2.15E−13 | 1.58E−06 |
| hydroxyzine | pt is on pravastatin as well as hydroxyzine | Positive | Positive | 0.99759 | 2.46E−05 | 0.00238 |
| lasix | lasix 40 mg niv push was administered on <date> | Positive | Null | 0.94912 | 1.41E−10 | 0.05087 |
| neupogen | neupogen was discontinued on <date> | Positive | Null | 0.99481 | 7.67E−08 | 0.00518 |

The present invention can be implemented as a computer program product that comprises a computer program mechanism embedded in a non-transitory computer readable storage medium. For instance, the computer program product could contain the program modules shown in any combination in FIG. 1 and/or as described elsewhere within the application. These program modules can be stored on a CD-ROM, DVD, magnetic disk storage product, USB key, or any other non-transitory computer readable data or program storage product.

Many modifications and variations of this disclosure can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The disclosure is to be limited only by the terms of the appended claims, along with the full scope of equivalents to which such claims are entitled.

What is claimed is:

1. A method for determining a relationship between a first subject and a first health entity for use in clinical decision-making, the method comprising:
at a computer system comprising at least one processor and a memory storing at least one program for execution by the at least one processor, the at least one program comprising instructions for:
receiving, for the first subject, a first electronic health record comprising a plurality of sections, wherein each respective section in the plurality of sections is delineated by a corresponding section header;
detecting, for each respective section in the plurality of sections, the corresponding section header, thereby splitting the first electronic health record into the plurality of sections;
obtaining a plurality of text spans for the first electronic health record by subdividing each respective section, in the plurality of sections, into a corresponding one or more text spans;
filtering the plurality of text spans by language pattern recognition to identify a set of text spans in the plurality of text spans, wherein each respective text span in the set of text spans comprises a respective expression related to the first health entity;
for each of the respective text spans in the set of text spans, evaluating a corresponding natural language context of the respective expression related to the first health entity by determining, for each respective N-gram in a plurality of N-grams, a corresponding count of occurrences that the respective N-gram occurs in the respective text span, thereby obtaining a respective scoring representation of the corresponding natural language context of the respective expression;
inputting, for each of the respective text spans in the set of text spans, the respective scoring representation for the respective text span into a model comprising a plurality of parameters; and
receiving, as output from the model, for each of the respective text spans in the set of text spans, at least a corresponding first prediction that the respective text span is associated with the first health entity, wherein the model comprises:
a first layer comprising the plurality of parameters, wherein:
the first layer (i) receives, as input, a first sparse tensor comprising, for each of the respective text spans in the set of text spans, the respective scoring representation for the respective text span, and (ii) generates, as output, a tensor dot product obtained using the first sparse tensor and the plurality of parameters, wherein
the plurality of parameters is formatted as a second sparse tensor, and
the tensor dot product is formatted as a third sparse tensor; and
a softmax activation function that (i) receives, as input, the tensor dot product obtained using the first sparse tensor and the plurality of parameters and (ii) generates, as output, for each of the respective text spans in the set of text spans, at least the corresponding first prediction that the respective text span is associated with the first health entity, and
wherein the plurality of parameters reflects values from a plurality of training electronic health records, comprising:
for each respective training text span in a set of training text spans for the plurality of training electronic health records:
(i) for each of the respective N-grams in the plurality of N-grams, a corresponding count of occurrences that the respective N-gram occurs in the respective training text span, and
(ii) a corresponding label, in a plurality of labels for the respective training text span, that represents a truth status for at least a first relationship status in a plurality of relationship statuses, and wherein
each respective training text span in the corresponding set of training text spans comprises the respective expression related to the first health entity.

2. The method of claim 1, wherein the first health entity is a medication, a biomarker, or a disease condition.

3. The method of claim 1, wherein:
the method further comprises:
searching the set of text spans for the respective text spans comprising more than one respective expression related to the first health entity, and
for each of the respective text spans in the set of text spans that comprises more than one respective expression related to the first health entity, subdividing the respective text span into a corresponding plurality of subdivisions, wherein each respective subdivision in the corresponding plurality of subdivisions comprises exactly one respective expression in the more than one respective expression related to the first health entity; and
the evaluating comprises, for each of the respective text spans in the set of text spans that comprises more than one respective expression related to the first health entity, separately evaluating the corresponding natural language context in each respective subdivision in the corresponding plurality of subdivisions.

4. The method of claim 1, wherein the receiving further comprises, for each of the respective text spans in the set of text spans:
receiving, as output from the model, for each respective relationship status in a plurality of relationship statuses, a corresponding prediction that the respective text span is associated with the respective relationship status, thereby obtaining a corresponding plurality of predictions for the respective text span.

5. The method of claim 1, wherein, for each of the respective text spans in the set of text spans, the corresponding first prediction is a corresponding first probability that the respective text span is associated with a first relationship status in a plurality of relationship statuses, further comprising:
identifying the respective text span, in the set of text spans, having a highest corresponding first probability for the first relationship status across the set of text spans;
assigning, to the first subject, a respective relationship score for the first relationship status based on the highest corresponding first probability, and
using at least the corresponding first prediction to determine an eligibility of the first subject for enrollment in a clinical trial.

6. The method of claim 1, wherein the determining a corresponding count of occurrences that the respective N-gram occurs in the respective text span further comprises:
generating, from the plurality of N-grams, a hierarchical graph structure comprising a plurality of nodes and a plurality of edges that collectively represents the plurality of N-grams, wherein, for each respective N-gram in the plurality of N-grams:
the hierarchical graph structure comprises a corresponding set of nodes in the plurality of nodes and a corresponding set of edges in the plurality of edges that represents the respective N-gram,
each respective word in a contiguous sequence of words in the respective N-gram is represented by a corresponding node in the plurality of nodes,
each respective pair of sequential words in the contiguous sequence of words is represented by a respective parent node and a respective child node in a corresponding pair of sequential nodes in the plurality of nodes, and
each respective pair of sequential nodes in the plurality of nodes is interlinked by a corresponding edge in the plurality of edges that represents a co-occurrence of the respective parent node and the respective child node in the respective N-gram; and
for each of the respective text spans in the set of text spans, for each of the respective N-grams in the plurality of N-grams:
recursively searching the respective text span for each respective node in the corresponding set of nodes for the respective N-gram, using the hierarchical graph structure, wherein
when the respective N-gram is determined to be present in the respective text span, adding an instance of the respective N-gram to the corresponding count of occurrences that the respective N-gram occurs in the respective text span.

7. The method of claim 1, wherein the plurality of parameters comprises, for each of the respective N-grams in the plurality of N-grams, for at least a first relationship status in a plurality of relationship statuses, a corresponding parameter that indicates a strength of association between the respective N-gram and the first relationship status.

8. The method of claim 1, further comprising training the model using a training procedure comprising:
(i) inputting, into an untrained or partially trained model, for each of the respective training text spans in the set of training text spans:
for each of the respective N-grams in the plurality of N-grams, the corresponding count of occurrences that the respective N-gram occurs in the respective training text span, thereby obtaining at least a corresponding first prediction that the respective training text span is associated with the first relationship status in the plurality of relationship statuses;
(ii) determining a differentiable prediction performance score for the untrained or partially trained model using, for each of the respective training text spans in the set of training text spans, a comparison between the at least the corresponding first prediction and the corresponding label for the respective training text span; and
(iii) adjusting, in a backpropagation, one or more parameters in the plurality of parameters using a minimization of a loss function for the differentiable prediction performance score.

9. The method of claim 8, wherein the plurality of N-grams is obtained from the plurality of training electronic health records.

10. The method of claim 8, wherein the plurality of parameters further reflects values from a plurality of initialization parameters, further comprising, prior to the training procedure, obtaining the plurality of initialization parameters by a procedure comprising, for at least the first relationship status in the plurality of relationship statuses:
for each of the respective N-grams in the plurality of N-grams:
tallying (i) a conditional count of occurrences that the respective N-gram co-occurs with one or more signal terms, in a respective set of signal terms associated with the first relationship status, over the plurality of training electronic health records, and (ii) a total count of occurrences that the respective N-gram occurs over the plurality of training electronic health records, and
determining a corresponding measure of dispersion between the (i) conditional count of occurrences and (ii) the total count of occurrences; and
using the corresponding measure of dispersion for each of the respective N-grams in the plurality of N-grams to populate the plurality of initialization parameters for the untrained or partially trained model.

11. The method of claim 10, wherein the respective N-gram is determined to co-occur with the one or more signal terms when the respective N-gram and the one or more signal terms are both present within the respective training text span in the set of training text spans for the plurality of training electronic health records, and
a measure of dispersion for the respective N-gram is obtained using a likelihood ratio between (i) a first probability of association with the first health entity determined using the conditional count of occurrences and (ii) a second probability that is non-specific to the first health entity determined using the total count of occurrences.

12. The method of claim 8, further comprising, for each of the respective training text spans in the set of training text spans for the plurality of training electronic health records, assigning the corresponding label to the respective training text span based on a presence or absence of one or more signal terms in the respective training text span, in a corresponding set of signal terms for the first relationship status, wherein
the corresponding label labels the respective training text span as having or not having at least the first relationship status.

13. The method of claim 8, wherein each respective relationship status in the plurality of relationship statuses is associated with a corresponding set of signal terms in a plurality of signal terms, further comprising:
for each of the respective training text spans in the corresponding set of training text spans:
for each of the respective relationship statuses in the plurality of relationship statuses:
when one or more signal terms in the corresponding set of signal terms is determined to be present in the respective training text span, assigning a respective label to the respective training text span that labels the respective training text span as having the respective relationship status; and
when no signal term in the corresponding set of signal terms is present in the respective training text span, assigning a respective label to the respective training text span that labels the respective training text span as not having the respective relationship status, or
for each of the respective training text spans in the corresponding set of training text spans:
for each of the respective relationship statuses in the plurality of relationship statuses:
when the one or more signal terms in the corresponding set of signal terms is determined to be present in the respective training text span, determining a presence or absence of one or more disqualifier terms, in a plurality of disqualifier terms, in the respective training text span, wherein:
when no disqualifier terms are present in the respective training text span, assigning a respective label to the respective training text span that labels the respective training text span as having the respective relationship status; and
when the one or more disqualifier terms are present in the respective training text span, assigning a respective label to the respective training text span that labels the respective training text span as not having the respective relationship status; and
when no signal term in the corresponding set of signal terms is present in the respective training text span, assigning a respective label to the respective training text span that labels the respective training text span as not having the respective relationship status.

14. The method of claim 8, further comprising, after the adjusting (iii), curating the plurality of N-grams by a procedure comprising, for each of the respective N-grams in the plurality of N-grams:
evaluating, in the plurality of parameters, a respective subset of parameters associated with the respective N-gram against one or more parameter threshold criteria; and
when the respective subset of parameters satisfies at least a first parameter threshold criterion in the one or more parameter threshold criteria, retaining the respective N-gram in the plurality of N-grams,
when the respective subset of parameters satisfies at least a second parameter threshold criterion in the one or more parameter threshold criteria, removing the respective N-gram from the plurality of N-grams,
when the respective subset of parameters satisfies at least a third parameter threshold criterion, adding the respective N-gram to at least a corresponding set of signal terms for the first relationship status,
when the respective subset of parameters satisfies at least a fourth parameter threshold criterion, adding the respective N-gram to a plurality of disqualifier terms, and
when the respective subset of parameters satisfies at least a fifth parameter threshold criterion in the one or more parameter threshold criteria, adding the respective N-gram to a plurality of masking terms.

15. The method of claim 14, wherein the curating generates a curated plurality of N-grams, further comprising:
using the curated plurality of N-grams to train the untrained or partially trained model.

16. A computer system comprising:
one or more processors;
memory; and
one or more programs, wherein the one or more programs are stored in the memory and are configured to be executed by the one or more processors, the one or more programs including instructions for determining a relationship between a first subject and a first health entity for use in clinical decision-making, by a method comprising:
receiving, for the first subject, a first electronic health record comprising a plurality of sections, wherein each respective section in the plurality of sections is delineated by a corresponding section header;
detecting, for each respective section in the plurality of sections, the corresponding section header, thereby splitting the first electronic health record into the plurality of sections;
obtaining a plurality of text spans for the first electronic health record by subdividing each respective section, in the plurality of sections, into a corresponding one or more text spans;
filtering the plurality of text spans by language pattern recognition to identify a set of text spans in the plurality of text spans, wherein each respective text span in the set of text spans comprises a respective expression related to the first health entity;
for each of the respective text spans in the set of text spans, evaluating a corresponding natural language context of the respective expression related to the first health entity by determining, for each respective N-gram in a plurality of N-grams, a corresponding count of occurrences that the respective N-gram occurs in the respective text span, thereby obtaining a respective scoring representation of the corresponding natural language context of the respective expression;
inputting, for each of the respective text spans in the set of text spans, the respective scoring representation for the respective text span into a model comprising a plurality of parameters; and
receiving, as output from the model, for each of the respective text spans in the set of text spans, at least a corresponding first prediction that the respective text span is associated with the first health entity,
wherein the model comprises:
a first layer comprising the plurality of parameters, wherein:
the first layer (i) receives, as input, a first sparse tensor comprising, for each of the respective text spans in the set of text spans, the respective scoring representation for the respective text span, and (ii) generates, as output, a tensor dot product obtained using the first sparse tensor and the plurality of parameters, wherein the plurality of parameters is formatted as a second sparse tensor, and the tensor dot product is formatted as a third sparse tensor; and a softmax activation function that (i) receives, as input, the tensor dot product obtained using the first sparse tensor and the plurality of parameters and (ii) generates, as output, for each of the respective text spans in the set of text spans, at least the corresponding first prediction that the respective text span is associated with the first health entity, and wherein the plurality of parameters reflects values from a plurality of training electronic health records, comprising:

for each respective training text span in a set of training text spans for the plurality of training electronic health records:

(i) for each of the respective N-grams in the plurality of N-grams, a corresponding count of occurrences that the respective N-gram occurs in the respective training text span, and (ii) a corresponding label, in a plurality of labels for the respective training text span, that represents a truth status for at least a first relationship status in a plurality of relationship statuses, and wherein each respective training text span in the corresponding set of training text spans comprises the respective expression related to the first health entity.

17. A non-transitory computer readable storage medium storing one or more programs, the one or more programs comprising instructions that, when executed by an electronic device with one or more processors and a memory, cause the electronic device to perform a method for determining a relationship between a first subject and a first health entity for use in clinical decision-making, comprising:

receiving, for the first subject, a first electronic health record comprising a plurality of sections, wherein each respective section in the plurality of sections is delineated by a corresponding section header;

detecting, for each respective section in the plurality of sections, the corresponding section header, thereby splitting the first electronic health record into the plurality of sections;

obtaining a plurality of text spans for the first electronic health record by subdividing each respective section, in the plurality of sections, into a corresponding one or more text spans;

filtering the plurality of text spans by language pattern recognition to identify a set of text spans in the plurality of text spans, wherein each respective text span in the set of text spans comprises a respective expression related to the first health entity;

for each of the respective text spans in the set of text spans, evaluating a corresponding natural language context of the respective expression related to the first health entity by determining, for each respective N-gram in a plurality of N-grams, a corresponding count of occurrences that the respective N-gram occurs in the respective text span, thereby obtaining a respective scoring representation of the corresponding natural language context of the respective expression;

inputting, for each of the respective text spans in the set of text spans, the respective scoring representation for the respective text span into a model comprising a plurality of parameters; and receiving, as output from the model, for each of the respective text spans in the set of text spans, at least a corresponding first prediction that the respective text span is associated with the first health entity, wherein the model comprises:

a first layer comprising the plurality of parameters, wherein:

the first layer (i) receives, as input, a first sparse tensor comprising, for each of the respective text spans in the set of text spans, the respective scoring representation for the respective text span, and (ii) generates, as output, a tensor dot product obtained using the first sparse tensor and the plurality of parameters, wherein the plurality of parameters is formatted as a second sparse tensor, and the tensor dot product is formatted as a third sparse tensor; and a softmax activation function that (i) receives, as input, the tensor dot product obtained using the first sparse tensor and the plurality of parameters and (ii) generates, as output, for each of the respective text spans in the set of text spans, at least the corresponding first prediction that the respective text span is associated with the first health entity, and wherein the plurality of parameters reflects values from a plurality of training electronic health records, comprising:

for each respective training text span in a set of training text spans for the plurality of training electronic health records:

(i) for each of the respective N-grams in the plurality of N-grams, a corresponding count of occurrences that the respective N-gram occurs in the respective training text span, and (ii) a corresponding label, in a plurality of labels for the respective training text span, that represents a truth status for at least a first relationship status in a plurality of relationship statuses, and wherein each respective training text span in the corresponding set of training text spans comprises the respective expression related to the first health entity.

\* \* \* \* \*